US011729794B2

(12) United States Patent
Sevindik

(10) Patent No.: US 11,729,794 B2
(45) Date of Patent: *Aug. 15, 2023

(54) METHODS AND APPARATUS FOR MANAGING UPLINK RESOURCE GRANTS IN WIRELESS NETWORKS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,973

(22) Filed: Jul. 11, 2022

(65) Prior Publication Data
US 2022/0346136 A1 Oct. 27, 2022

Related U.S. Application Data

(63) Continuation of application No. 17/134,123, filed on Dec. 24, 2020, now Pat. No. 11,445,541.

(51) Int. Cl.
H04W 72/23 (2023.01)
H04W 72/1263 (2023.01)
(Continued)

(52) U.S. Cl.
CPC ....... H04W 72/23 (2023.01); H04W 52/0235 (2013.01); H04W 52/0274 (2013.01);
(Continued)

(58) Field of Classification Search
CPC . H04W 72/00; H04W 72/12; H04W 72/1205; H04W 72/1257; H04W 72/1263; H04W 72/1268; H04W 72/1278; H04W 72/1284; H04W 72/1289; H04W 72/1294; H04W 72/14; H04W 52/0235;
(Continued)

(56) References Cited

U.S. PATENT DOCUMENTS

2013/0265981 A1* 10/2013 Yang ................... H04L 25/0226
370/329
2020/0053669 A1* 2/2020 Hannan ................ H04L 5/1469
(Continued)

Primary Examiner — Robert C Scheibel
(74) Attorney, Agent, or Firm — Straub & Straub; Stephen T. Straub; Michael P. Straub

(57) ABSTRACT

The present invention relates to methods and apparatus for managing uplink resource grants in wireless networks. An exemplary method embodiment includes the steps of: operating a first wireless base station in a first mode of operation, the first mode of operation including managing uplink resource grant schedules for a plurality of wireless devices connected to the wireless base station; receiving, by the first wireless base station operating in the first mode of operation, a transmission power down command from a resource management system; and determining in response to receiving the transmission power down command, by the first wireless base station, whether to switch from operating in the first mode of operation to operating in a second mode of operation, said operating in the second mode of operation including ceasing managing uplink resource grant schedules for said plurality of wireless devices connected to the wireless base station.

20 Claims, 22 Drawing Sheets

(51) Int. Cl.
*H04W 52/02* (2009.01)
*H04W 72/50* (2023.01)
*H04W 84/04* (2009.01)

(52) U.S. Cl.
CPC ..... *H04W 72/1263* (2013.01); *H04W 72/535* (2023.01); *H04W 84/042* (2013.01)

(58) Field of Classification Search
CPC ........... H04W 52/0274; H04W 84/042; H04W 72/23; H04W 72/535
See application file for complete search history.

(56) References Cited

U.S. PATENT DOCUMENTS

| | | | |
|---|---|---|---|
| 2020/0329521 A1* | 10/2020 | Chang | H04L 25/0226 |
| 2020/0343984 A1* | 10/2020 | Zhao | H04B 17/373 |
| 2021/0084658 A1* | 3/2021 | Sheriff | H04W 16/18 |
| 2021/0235484 A1* | 7/2021 | Yang | H04W 72/042 |
| 2021/0360418 A1* | 11/2021 | Khawer | H04L 12/1407 |
| 2021/0368349 A1* | 11/2021 | Bandyopadhyay | H04W 72/0453 |

* cited by examiner

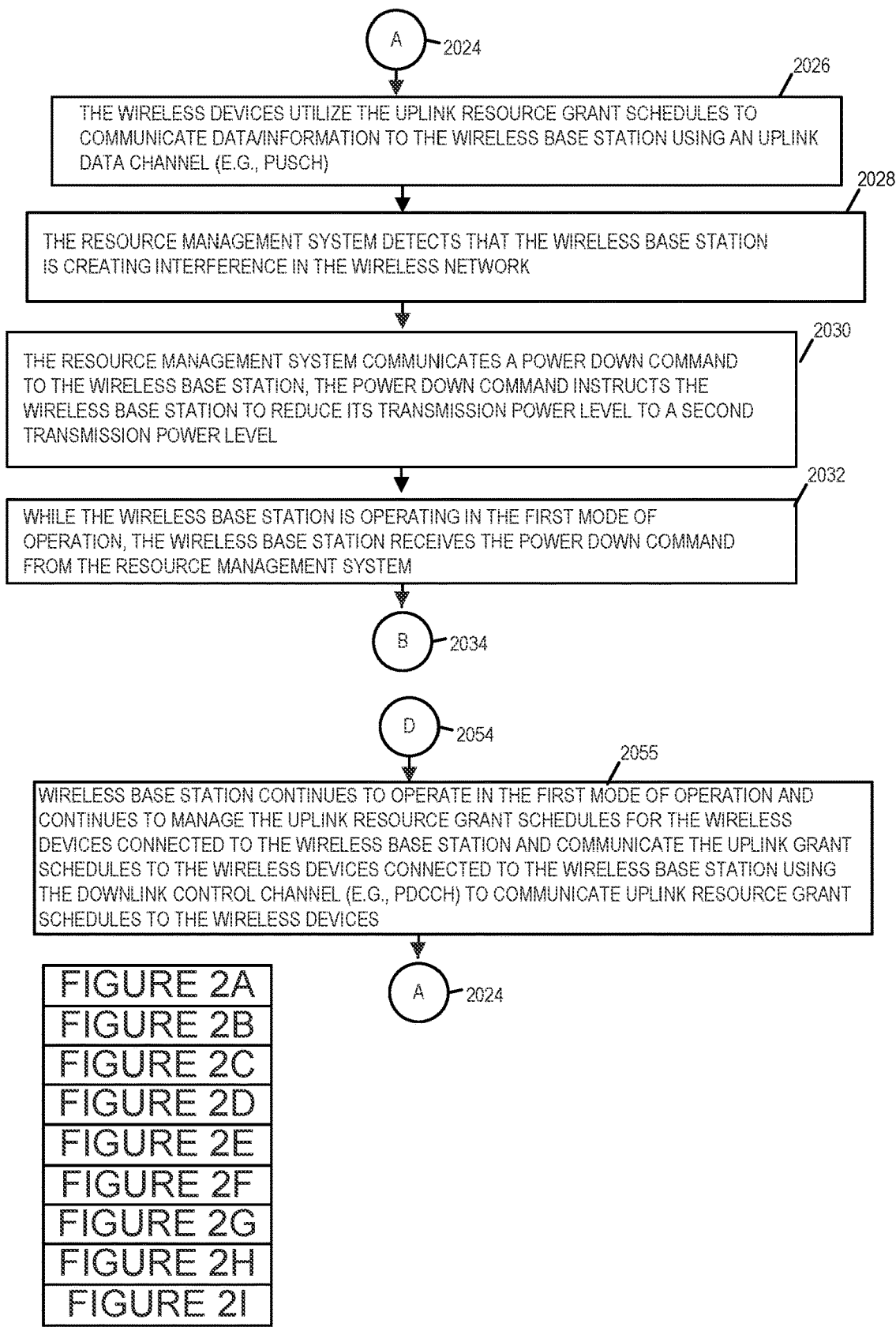

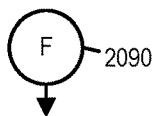

```
┌─────────────────────────────────────────────────────────────────────────────┐
│ SUBSEQUENT TO COMMUNICATING SAID MESSAGE INDICATING THAT EACH WIRELESS DEVICE IS │
│ RESPONSIBLE FOR MANAGING ITS UPLINK RESOURCE GRANT SCHEDULE TO EACH WIRELESS DEVICE │
│ CONNECTED TO THE WIRELESS BASE STATION, THE WIRELESS BASE STATION RECEIVES FROM SAID │
│ WIRELESS DEVICES UPLINK RESOURCE GRANT SCHEDULE INFORMATION FOR THE WIRELESS DEVICES, │
│ SAID UPLINK RESOURCE GRANT SCHEDULE INFORMATION INCLUDING UPLINK GRANT SCHEDULES FOR │
│ THE WIRELESS DEVICES WHICH COMMUNICATED THEM TO THE WIRELESS BASE STATION │
│  ┌─────────────────────────────────────────────────────────────────────── │
│  │ SUBSEQUENT TO COMMUNICATING SAID MESSAGE INDICATING THAT EACH WIRELESS DEVICE │
│  │ IS RESPONSIBLE FOR MANAGING ITS UPLINK RESOURCE GRANT SCHEDULE TO EACH │
│  │ WIRELESS DEVICE CONNECTED TO THE WIRELESS BASE STATION, RECEIVING AT THE │
│  │ WIRELESS BASE STATION FIRST UPLINK RESOURCE GRANT SCHEDULE INFORMATION, E.G., │
│  │ CONTAINED IN A FIRST UPLINK GRANT SCHEDULE MESSAGE, FROM THE FIRST WIRELESS │
│  │ DEVICE, SAID FIRST UPLINK RESOURCE GRANT SCHEDULE INFORMATION INCLUDING THE FIRST │
│  │ UPLINK RESOURCE GRANT THAT THE FIRST WIRELESS DEVICE WILL BE USING FOR │
│  │ COMMUNICATING UPLINK DATA TO THE WIRELESS BASE STATION, THE FIRST UPLINK │
│  │ RESOURCE GRANT IDENTIFYING A FIRST SET OF RESOURCE BLOCKS THAT WILL IS TO BE │
│  │ RESERVED FOR USE BY THE FIRST WIRELESS DEVICE ON A RECURRING BASIS │
└─────────────────────────────────────────────────────────────────────────────┘

┌─────────────────────────────────────────────────────────────────────────────┐
│ WIRELESS BASE STATION IN RESPONSE TO RECEIVING UPLINK RESOURCE GRANT SCHEDULE │
│ INFORMATION, E.G., AN UPLINK GRANT SCHEDULE MESSAGE, FROM A WIRELESS DEVICE │
│ CONNECTED TO THE WIRELESS BASE STATION STORES IN MEMORY AN INDICATION THAT THE SET │
│ OF RESOURCE BLOCKS IDENTIFIED IN THE UPLINK GRANT SCHEDULE INFORMATION IS RESERVED, │
│ BLOCKED OR ALLOCATED FOR THE WIRELESS DEVICE FROM WHICH THE UPLINK RESOURCE GRANT │
│ SCHEDULE INFORMATION WAS RECEIVED UNLESS ONE OR MORE OF THE RESOURCE BLOCKS ARE │
│ ALREADY RESERVED OR ALLOCATED FOR ANOTHER WIRELESS DEVICE │
│  ┌─────────────────────────────────────────────────────────────────────── │
│  │ IN RESPONSE TO RECEIVING SAID FIRST UPLINK RESOURCE GRANT SCHEDULE INFORMATION │
│  │ FROM SAID FIRST WIRELESS DEVICE, DETERMINING BY THE WIRELESS BASE STATION │
│  │ WHETHER SAID FIRST SET OF RESOURCE BLOCKS OF SAID FIRST UPLINK RESOURCE GRANT │
│  │ ARE CURRENTLY ALLOCATED TO ANOTHER WIRELESS DEVICE │
│  ├─────────────────────────────────────────────────────────────────────── │
│  │ WHEN SAID FIRST SET OF RESOURCE BLOCKS ARE DETERMINED NOT TO BE ALLOCATED TO │
│  │ ANOTHER WIRELESS DEVICE STORING IN MEMORY AN INDICATION THAT THE FIRST SET OF │
│  │ RESOURCE BLOCKS ARE ALLOCATED TO THE FIRST WIRELESS DEVICE AND THAT ANY │
│  │ TRANSMISSION, E.G., DATA/INFORMATION TRANSMISSION, SUCCESSFULLY RECEIVED FROM │
│  │ THE FIRST WIRELESS DEVICE USING THE FIRST SET OF RESOURCE BLOCKS IN ACCORDANCE │
│  │ WITH THE FIRST UPLINK GRANT SCHEDULE INFORMATION IS TO BE RESPONDED TO WITH AN │
│  │ ACK MESSAGE INDICATING SUCCESSFUL RECEIPT OF THE TRANSMISSION BY THE WIRELESS │
│  │ BASE STATION │
│  ├─────────────────────────────────────────────────────────────────────── │
│  │ WHEN SAID FIRST SET OF RESOURCE BLOCKS ARE DETERMINED TO BE ALLOCATED TO │
│  │ ANOTHER WIRELESS DEVICE STORING IN MEMORY AN INDICATION THAT ANY TRANSMISSION │
│  │ RECEIVED FROM THE FIRST WIRELESS DEVICE USING THE FIRST SET OF RESOURCE BLOCKS │
│  │ IS TO BE RESPONDED TO WITH A NACK MESSAGE INDICATING A FAILURE OF THE │
│  │ TRANSMISSION │
└─────────────────────────────────────────────────────────────────────────────┘
```

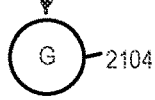

FIGURE 2F

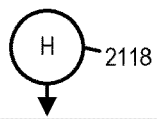

2120 — EACH INDIVIDUAL WIRELESS DEVICE CHECKS IF THERE ARE NACKs AND/OR ACKs REPORTED FOR UPLINK DATA/INFORMATION TRANSMITTED IN THE SET OF RESOURCE BLOCKS OF THE UPLINK RESOURCE GRANT SCHEDULE COMMUNICATED TO THE WIRELESS BASE STATION FROM THE INDIVIDUAL WIRELESS DEVICE:

WHEN AN ACK IS REPORTED THE INDIVIDUAL WIRELESS BASE STATION DETERMINES THAT THE UPLINK RESOURCE GRANT SCHEDULE HAS BEEN ALLOCATED, RESERVED, OR BLOCKED FOR USE BY THE INDIVIDUAL WIRELESS DEVICE AND CONTINUES TO USE THE UPLINK RESOURCE GRANT SCHEDULE; AND

WHEN THERE ARE A THRESHOLD NUMBER OF NACKs REPORTED THE INDIVIDUAL WIRELESS DEVICE SELECTS OR DETERMINES ANOTHER UPLINK RESOURCE GRANT SCHEDULE WITH A DIFFERENT SET OF RESOURCE BLOCKS THAN THE SET OF RESOURCE BLOCKS IN THE UPLINK GRANT SCHEDULE PREVIOUSLY COMMUNICATED TO THE WIRELESS BASE STATION FROM THE INDIVIDUAL WIRELESS DEVICE AND REPEAT THIS PROCESS UNTIL A SELECTED/DETERMINED UPLINK GRANT SCHEDULE NO LONGER RESULTS IN NACKs REPORTED WHEN USED

2124 — WHEN SAID FIRST WIRELESS DEVICE RECEIVES AN ACK MESSAGE IN RESPONSE TO UPLINK DATA TRANSMITTED USING THE FIRST SET OF RESOURCE BLOCKS IN THE FIRST UPLINK RESOURCE GRANT SCHEDULE, THE FIRST WIRELESS DEVICE DETERMINES THAT THE FIRST UPLINK RESOURCE GRANT SCHEDULE HAS BEEN ALLOCATED TO THE FIRST WIRELESS DEVICE AND SAID FIRST WIRELESS DEVICE CONTINUES TO USE THE FIRST UPLINK RESOURCE GRANT SCHEDULE TO TRANSMIT DATA/INFORMATION TO THE WIRELESS BASE STATION UNTIL THE FIRST WIRELESS DEVICE UPLINK RESOURCE NEEDS CHANGE AND IT GENERATES AND COMMUNICATES A NEW UPLINK RESOURCE GRANT SCHEDULE TO THE WIRELESS BASE STATION

2126 — WHEN SAID FIRST WIRELESS DEVICE RECEIVES A THRESHOLD NUMBER OF NACK MESSAGES IN RESPONSE TO UPLINK DATA TRANSMITTED USING THE FIRST SET OF RESOURCE BLOCKS IN THE FIRST UPLINK GRANT SCHEDULE, THE FIRST WIRELESS DEVICE DETERMINES THAT THE FIRST UPLINK GRANT SCHEDULE HAS NOT BEEN ALLOCATED TO THE FIRST WIRELESS DEVICE

2128 — IN RESPONSE TO DETERMINING THAT THE FIRST WIRELESS DEVICE HAS NOT BEEN ALLOCATED THE FIRST UPLINK RESOURCE GRANT SCHEDULE, THE FIRST WIRELESS DEVICE DETERMINES ANOTHER UPLINK GRANT SCHEDULE INCLUDING ANOTHER SET OF RESOURCE BLOCKS AND COMMUNICATES THE ANOTHER UPLINK RESOURCE GRANT SCHEDULE INFORMATION TO THE WIRELESS BASE STATION, E.G., USING AN UPLINK GRANT SCHEDULE MESSAGE, SAID ANOTHER SET OF RESOURCE BLOCKS BEING DIFFERENT THAN SAID FIRST SET OF RESOURCE BLOCKS

2130 — EACH INDIVIDUAL WIRELESS DEVICE CONTINUES TO MANAGE ITS UPLINK RESOURCE GRANT SCHEDULE UNTIL IT RECEIVE A MESSAGE FROM THE WIRELESS BASE STATION INCLUDING AN UPLINK RESOURCE GRANT SCHEDULE FOR THE WIRELESS DEVICE OR A MESSAGE INDICATING THE UPLINK RESOURCE GRANT SCHEDULE IS TO BE MANAGED BY THE WIRELESS BASE STATION

FIGURE 2H

METHODS AND APPARATUS FOR MANAGING UPLINK RESOURCE GRANTS IN WIRELESS NETWORKS

RELATED APPLICATIONS

The present application is a continuation of U.S. patent application Ser. No. 17/134,123 (now U.S. Pat. No. 11,445, 541) which was filed on Dec. 24, 2020 and published as U.S. Patent Application Publication No. US 2022-0210819 A1 on Jun. 30, 2022 and which is hereby expressly incorporated by reference in its entirety.

FIELD OF INVENTION

The present invention relates to methods and apparatus for managing uplink resource grants, e.g., uplink data transmission grants, in wireless networks. More particularly, the present invention relates to methods and apparatus for managing and/or scheduling uplink data transmission grants for wireless devices, e.g., customer premises equipment devices, user terminals and/or user equipment devices when a wireless base station is unable to communicate uplink control information to wireless devices connected to the wireless base station. The present invention further relates to methods and apparatus for uplink resource grant management in new radio 5G Fixed Citizens Broadband Radio Service (CBRS) Wireless Networks.

BACKGROUND OF THE INVENTION

Proactive grants, i.e., semi-permanent grants, are used in uplink (UL) communications to dedicate uplink resources to user equipment devices in various wireless network systems including wireless systems that implement 5G standards and Citizens Broadband Radio Service Wireless Networks. In such systems, the wireless base station typically manages the uplink resource grant schedule for the UE devices which are connected to the wireless base station. This includes a determination of the amount of resource blocks and timing of when the resources blocks will be available for each user equipment device connected to the wireless base station. These uplink resource grants can be changed at anytime by the wireless base station based on wireless network conditions including for example, the number of user equipment devices being serviced, the amount of uplink resources requested by user equipment devices at any one time, service contracts requirements, quality of the uplink channel, the spectrum granted to the wireless base station, and the transmission power level of the wireless base station. The uplink resource grant remains in effect for the user equipment device until the wireless base station determines a new uplink grant schedule for the UE and communicates it to the user equipment device. Whenever a change is made to the uplink resources granted by the wireless base station to user equipment device it is communicated to the user equipment device using a downlink control channel, e.g., a Physical Downlink Control Channel (PDCCH). In typical wireless networks, e.g., 5G networks, the downlink control channel, e.g., PDCCH, coverage is usually greater than the uplink control channel, e.g., Physical Uplink Control Channel (PUCCH), coverage. However, in some wireless networks, such as for example CBRS networks, the transmission power level of the wireless base station is managed by a resource management device or system, e.g., a Spectrum Access System in a CBRS network. And, the resource management system can instruct the wireless base station to reduce its transmission power level at anytime for example in response to the resource management system determining that the wireless base station's transmissions are causing interference in the wireless network. As a result, when the wireless base station reduces or decreases its transmission power level in response to instructions from the resource management system, the wireless base station's downlink control channel coverage, e.g., PDCCH coverage, is reduced and can become smaller than the uplink control channel coverage, e.g., PUCCH coverage. If the downlink control channel coverage, e.g., PDCCH coverage, is smaller than the uplink control channel coverage, the wireless base station cannot pre-configure uplink resource grant schedules for the user equipment devices connected to the wireless base station for the UE devices out of the downlink control channel coverage area and this becomes a big problem since the uplink grant schedule should be changed frequently depending on the network conditions.

This technological problem of a wireless base station not being able to communicate an uplink resource grant schedule to one or more wireless devices to which they are providing services because the downlink control channel coverage area is smaller than the uplink control channel coverage area occurs in Citizens Broadband Radio Service networks.

In a Citizens Broadband Radio Service (CBRS) network, Citizens Broadband Radio Service Devices (CBSDs) serve as access points which can support wireless communications with user equipment devices (UEs).

A CBRS network includes a plurality of CBSD devices. The CBSD devices provide wireless services to subscribers' user equipment devices. Spectrum is granted to each of the CBSDs using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network. The SAS also manages the CBSDs transmission power levels by sending power level instructions to the CBSDs. For example, when a CBSD's transmissions cause interference in neighboring CBSD cells, the SAS can command/instruct the CBSD causing the interference to lower or reduce their transmission power levels. The CBSD is required to follow the SAS's transmission power level commands/instructions which result in the situation discussed above wherein the downlink control channel coverage area is less than the uplink control channel coverage area. The CBSD maximum transmission power is determined as an EIRP (Equivalent Isotropically Radiated Power) level.

Many customer premises, e.g. homes do not have landline connections or landline connections which can support broadband services. For example, in various geographical areas, e.g., rural areas of the country with sparse populations, it is not economical or practical to connect landlines to all customer premises. In such areas, there is a need for providing services, e.g., broadband services, to the customer premises which do not have landline connections or do not have landline connections which can provide broadband services. Additionally, in urban areas where landline connections can provide broadband services customers may still desire to have services provided via wireless connections in place of or in addition to landline connections. For example, universities, businesses, hospitals, hotels, etc. may desire to provide broadband or other types of wireless services throughout their customer premises and/or buildings using Wi-FI wireless connections through which users can connect therein being in a position to manage the wireless services provided.

In some CBRS systems the wireless services are provided to a plurality of devices at the customer premises, e.g., user equipment devices, using a customer premise equipment device that provides services at the customer premises, the customer premises equipment devices then communicating to a wireless base station, e.g., CBSD. The customer premises equipment devices are located at fixed network locations and attached to or include antennas. The antennas are typically mounted at an elevated fixed location such as on the top of a building or attached to pole on the customer premises so as to avoid obstacles that may inhibit the ability of the customer premises equipment device to be able to communicate with its wireless base station, e.g., CBSD device.

In the new radio 5G standard, uplink (UL) resources, e.g., resource blocks, are assigned to user equipment devices at fixed intervals and this is referred to as "proactive grants". In fixed wireless access networks, a user terminal is a customer premises equipment (CPE) device which acts the same as a user equipment device, e.g., mobile phone, does. The new radio 5G base station, e.g., a CBSD in a CBRS fixed wireless network, assigns uplink resources periodically to each CPE device which is attached or connected to it. If a CPE device connected to the wireless base station does not have data to send in the uplink, the CPE device skips this data transmission opportunity. With respect to CPE devices they typically transmit 6-8 Wi-Fi user's traffic in the uplink while CBRS UE devices which are for example mobile terminals, e.g., smartphones, typically send uplink data for a single user. While mobile devices may move in and out of a coverage area, the CPE devices are fixed and do not move so that when a downlink control channel coverage area shrinks or is reduced in size so it no longer covers one or CPE devices, the CPE devices can no longer receive uplink resource grant schedules from the CBSD. This may occur even though the CPE device may still be able communicate uplink control information and data to the wireless base station because the wireless base station's uplink coverage area includes the CPE device. The wireless base station is also still able to communicate data to the CPE device it just not able to communicate control information, e.g., uplink resource grant schedule information.

From the above it should be appreciated that there is a need for new and/or improved methods and apparatus for managing uplink resources in wireless networks. There is a further need for new and/or improved methods of managing uplink resources by wireless base stations which provide wireless services, e.g., wireless broadband services, to customer premises equipment devices such as those serving a plurality of devices at a customer premises in fixed wireless access networks, e.g., new radio 5G/CBRS fixed wireless access networks. There is a further need for new and/or improved methods and apparatus for more effectively and efficiently managing uplink resource grants for data transmission from wireless devices, e.g., customer premise equipment devices which are responsible for providing uplink services to a plurality of users, user equipment devices, and user terminals when the uplink control channel coverage area is greater than the downlink control channel coverage area for a cell or wireless base station in the cell. In wireless systems, e.g., 5G and CBRS wireless networks, wherein the frequency spectrum and power level of transmissions are controlled by a spectrum management entity such as for example a spectrum access system to minimize interference and maximum frequency spectrum usage/efficiency, there is a need for new and/or improved methods and apparatus to solve the technological problem of how to efficiently manage uplink data transmission grants for customer premises equipment devices from fixed locations, user terminals and user equipment devices when the reduction in the transmission power level of a wireless base station results in a uplink control channel coverage area larger than a downlink control channel coverage area. There is also a need for new and/or improved methods and apparatus to solve the technological problem of how to prioritize by a wireless base station uplink resource grants to the different wireless types of wireless devices being supported by wireless base station. There is a further need for new and/or improved methods and apparatus that take into account a device's properties, attributes and/or past uplink resource usage history when determining and/or managing uplink resource grants for a device.

SUMMARY OF THE INVENTION

The present invention provides a technological solution of how to efficiently manage uplink resources in a wireless network. The present invention provides technological solutions that increase and/or improve the uplink resource utilization in wireless networks. The present invention provides new and/or improved methods and apparatus that solve the technological problem of how to efficiently manage uplink data transmission grants for customer premises equipment devices from fixed locations, user terminals and user equipment devices when the reduction in the transmission power level of a wireless base station results in a uplink control channel coverage area larger than a downlink control channel coverage area. The present invention further provides a technological solution of how a wireless base station can take into account various attributes, characteristics, proprieties and/or historical uplink resource utilization of one or more devices, e.g., CPE devices to which the wireless base station is providing wireless services in a wireless network, e.g., a fixed wireless access network when managing uplink resource grant schedules for wireless devices. Various embodiments of the present invention include novel methods and apparatus to solve one or more of the problems identified above.

By using one or more of the techniques described herein uplink resource grants for wireless devices, e.g., customer premises equipment devices, user terminals and user equipment devices, attached/connected to a wireless base station can be efficiently and effectively managed when the wireless base station downlink control channel coverage area is larger than the uplink control channel coverage area as well as when the downlink control channel coverage area is smaller than the uplink control channel coverage area. Customer premises equipment devices being devices located at a fixed position at a customer's premises which provides services for one or more user equipment devices, e.g., via a Wi-Fi network at the customer premises at which the customer premises equipment device is located. The present invention also provides new and/or improved techniques for uplink resource grant scheduling and implementation for customer premises equipment devices in fixed wireless access networks, user equipment devices and user terminals that cannot receive uplink resource grant schedules from wireless base stations but can communicate uplink resource grant schedules to wireless base stations and can receive ACK and NACK messages from a wireless base station in response to data transmissions to the wireless base station.

An exemplary method embodiment in accordance with the present invention includes the following steps: operating a first wireless base station in a first mode of operation, said first mode of operation including managing uplink resource grant schedules for a plurality of wireless devices connected to the first wireless base station; receiving, by the first wireless base station operating in said first mode of operation, a transmission power down command from a resource management system; determining in response to receiving said transmission power down command, by the first wireless base station, whether to switch from operating in said first mode of operation to operating in a second mode of operation, said operating in said second mode of operation including ceasing managing uplink resource grant schedules for said plurality of wireless devices connected to the first wireless base station. In some embodiments, each of said wireless devices is a user equipment device or a customer premises equipment device.

In some embodiments, the method further includes prior to receiving the transmission power down command, registering the first wireless base station (e.g., CBSD) with the resource management system, said resource management system managing transmission power levels of a plurality of wireless base stations in a first wireless network, said first wireless base station being one of said plurality of wireless base stations.

In some embodiments, the method further includes the step of establishing a plurality of wireless connections between the first wireless base station and said plurality of wireless devices.

In some embodiments, the wireless devices are user terminals. In some such embodiments, each of said user terminals is a user equipment device or a customer premises equipment device.

In some embodiments, the first wireless base station is part of first wireless communications network which is a new radio 5G wireless network.

In some embodiments, the step of determining whether to switch from operating in said first mode of operation to operating in a second mode of operation includes determining whether the implementation of the transmission power down command by the first wireless base station will result in a downlink control channel coverage area of the first wireless base station being less than an uplink control channel coverage area of the first wireless base station.

In some embodiments, the method includes the step of determining to switch from operating in said first mode of operation to operating in said second mode of operation when said determination is that the implementation of the transmission power down command by the first wireless base station will result in the downlink control channel coverage area of the first wireless base station being less than the uplink control channel coverage area of the first wireless base station.

In some embodiments, the method includes the step of determining not to switch from operating in said first mode of operation to operating in said second mode of operation when said determination is that the implementation of the transmission power down command by the first wireless base station will not result in the downlink control channel coverage area of the first wireless base station being less than the uplink control channel coverage area of the first wireless base station.

In some embodiments, the step of determining whether to switch from operating in said first mode of operation to operating in a second mode of operation includes determining whether the implementation of the transmission power down command by the first wireless base station will result in an transmission power level for a downlink control channel used for communicating uplink resource grants to the wireless devices being less than a first threshold value. In some embodiments, the first threshold value is a power transmission level value equal to or based on the maximum power transmission level of a wireless device connected to the first wireless base station. In some embodiments, the maximum power transmission level of a wireless device is a maximum uplink channel power transmission level of a wireless device connected to the first wireless base station. In some embodiments, the first threshold value is 23 dBm.

In some embodiments, the first wireless base station is a Citizens Broadband Radio Service Device (CBSD). In some embodiments, the first wireless base base is part of a wireless network. In some embodiments, the wireless network is a Citizen Broadband Radio Service (CBRS) network. In some embodiments, the wireless network is a 5G New Radio wireless network. In some embodiments, the each of said wireless devices connected to the wireless base station is a CBRS user equipment device, CBRS Customer Premises Equipment (CPE) device, CBRS user terminal or a device emulating a CBRS user equipment device or CBRS CPE device.

In some embodiments of the invention, the step of managing uplink resource grant schedules for said plurality of wireless devices connected to the first wireless base station includes generating an uplink resource grant schedule for each individual wireless device connected to the first wireless base station.

In some embodiments of the invention, each uplink resource grant schedule includes an uplink resource grant giving a wireless device the right to use a set of resource blocks on a recurring basis. In some embodiments, the uplink resource grants are proactive grants.

In some embodiments, the step of operating said first wireless base station in a first mode of operation further includes communicating each of said generated uplink resource grant schedules to the individual wireless device for which the uplink grant schedule was generated. In some embodiments, the step of operating in said second mode of operation includes communicating a message to each wireless device connected to the first wireless base station prior to ceasing managing said uplink grant schedule for said plurality of wireless devices, said message indicating that each wireless device is responsible for managing its uplink resource grant schedule.

In some embodiments of the invention, the method further includes that subsequent to communicating said message indicating that each wireless device is responsible for managing its uplink resource grant schedule to each wireless device connected to the first wireless base station, the first wireless base station reducing said transmission power level as instructed in the power down command received from the resource management system. In some embodiments, the step of reducing said transmission power level as instructed in the power down command received from the resource management system includes ceasing transmissions of uplink resource grant schedules for wireless devices on the downlink control channel (e.g., PDCCH).

In some embodiments of the invention, the method further includes: subsequent to communicating said message indicating that each wireless device is responsible for managing its uplink resource grant schedule to each wireless device connected to the first wireless base station, receiving first uplink resource grant schedule information from a first wireless device connected to the first wireless base station, said first uplink resource grant schedule information including a first uplink resource grant that the first wireless device will be using for communicating uplink data to the first wireless base station, the uplink resource grant identifying a first set of resource blocks that will be reserved for use by the first wireless device on a recurring basis and timing information identifying when the first set of resource blocks will recur.

In some embodiments of the invention, the first uplink resource grant schedule information is received by the first wireless base station from the first wireless device via an uplink control channel (e.g., PUCCH).

In some embodiments, in response to receiving said uplink resource grant schedule information from said first wireless device the method further includes: determining if said first set of resource blocks are currently allocated to another wireless device; and when said first set of resource blocks are determined not be allocated to another wireless device storing in memory an indication that the first set of resource blocks are allocated to the first wireless device and that any transmission successfully received from the first wireless device using the first set of resource blocks in accordance with the first uplink grant schedule information is to be responded to with a ACK message indicating successful receipt of the transmission by the first wireless base station; and when said first set of resource blocks are determined to be allocated to another wireless device storing in memory an indication that any transmission received from the first wireless device using the first set of resource blocks is to be responded to with a NACK message indicating the failure of the transmission.

In some embodiments, when said first wireless device receives a threshold number of NACK messages in response to uplink data transmission using the first uplink resource grant schedule the first wireless device will determine that the first uplink resource grant schedule has not been allocated to the first wireless device; and in response to determining the first wireless device has not been allocated the first uplink resource grant schedule determining by the first wireless device a second uplink resource grant schedule including a second set of resource blocks and communicating the second uplink resource grant schedule information to the first wireless base station, said second set of resource blocks being different than said first set of resource blocks.

In some embodiments, a CBRS protocol HARQ (Hybrid Automatic Repeat reQuest) process is used by the first wireless base station to communicate ACK and NACK messages. In some embodiments, a 5G New Radio HARQ (Hybrid Automatic Repeat reQuest) process is used by the first wireless base station to send ACK and NACK messages to the wireless devices which are connected to the first wireless base station.

In some embodiments, a Physical HARQ (Hybrid Automatic Repeat reQuest) channel is used to communicate said ACK (acknowledgement) and NACK (negative acknowledgement) message from said first wireless base station to said first wireless device. In some embodiments, the Physical HARQ channel is a Physical HARQ Indicator Channel. In some embodiments, the Physical HARQ channel has a larger coverage area than said uplink control channel used by said wireless devices to communicate with said first wireless base station.

The present invention is also applicable to and includes apparatus and systems such as for example, apparatus and systems that implement one or more of the steps of the method embodiments. Some such embodiment include an apparatus including a processor and memory, the memory including instructions which when executed by the processor cause the apparatus to implement one or more of the steps of the method embodiments. An exemplary communications system in accordance with the present invention includes a first wireless base station including: memory; and a processor included in the first wireless base station which controls the operation of the first wireless base station to perform the following operations: (i) operating a first wireless base station in a first mode of operation, said first mode of operation including managing uplink resource grant schedules for a plurality of wireless devices connected to the first wireless base station; receiving, by the first wireless base station operating in said first mode of operation, a transmission power down command from a resource management system; and (ii) determining in response to receiving said transmission power down command, by the first wireless base station, whether to switch from operating in said first mode of operation to operating in a second mode of operation, said operating in said second mode of operation including ceasing managing uplink resource grant schedules for said plurality of wireless devices connected to the first wireless base station. In some embodiments, each of said wireless devices is a user equipment device or a customer premises equipment device.

In some system embodiments the operation of determining whether to switch from operating in said first mode of operation to operating in a second mode of operation includes determining, by the first wireless base station, whether the implementation of the transmission power down command by the first wireless base station will result in a downlink control channel coverage area of the first wireless base station being less than an uplink control channel coverage area of the first wireless base station.

In some system embodiments, the processor further controls the first wireless base station to determine to switch from operating in said first mode of operation to operating in said second mode of operation when said determination is that the implementation of the transmission power down command by the first wireless base station will result in the downlink control channel coverage area of the first wireless base station being less than the uplink control channel coverage area of the first wireless base station.

In some system embodiments, the processor further controls the first wireless base station to determine not to switch from operating in said first mode of operation to operating in said second mode of operation when said determination is that the implementation of the transmission power down command by the first wireless base station will not result in the downlink control channel coverage area of the first wireless base station being less than the uplink control channel coverage area of the first wireless base station.

In some system embodiments, the operation of determining whether to switch from operating in said first mode of operation to operating in a second mode of operation includes determining whether the implementation of the transmission power down command by the first wireless base station will result in a transmission power level for a downlink control channel used for communicating uplink resource grants to the wireless devices being less than a first threshold value.

In some system embodiments, the first threshold value is 23 dBm.

In some system embodiments, the threshold value is a power transmission level value equal to or based on the maximum power transmission level of a wireless device connected to the first wireless base station.

In some system embodiments, the maximum power transmission level of a wireless device is a maximum uplink channel power transmission level of a wireless device connected to the first wireless base station.

In various embodiments, the first wireless base station is a Citizens Broadband Radio Service Device (CBSD) or a 5G wireless base station. In some embodiments, the system includes a wireless network which is a Citizen Broadband Radio Service (CBRS) network or a 5G wireless network. In some embodiments, each of said wireless devices connected to the first wireless base station is a CBRS user equipment device, CBRS Customer Premises Equipment (CPE) device, CBRS user terminal or a device emulating a CBRS user equipment device or CBRS CPE device. In some embodiments, each of said wireless devices connected to the first wireless base station is a new radio 5G enabled user equipment device, new radio 5G enabled (CPE) device, new radio 5G user terminal or a device emulating a new radio 5G user equipment device or new radio 5G CPE device.

In some embodiments, the customer premises equipment devices provide services to one or more user equipment devices via Wi-Fi connections.

In various embodiments, the uplink resource grants are proactive resource grants or semi-persistent resource grants.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 illustrates the combination of FIGS. 2A, 2B, 2C, 2D, 2E, 2F, 2G, 2H, and 2I.

FIG. 2B illustrates the steps of the second part of an exemplary method in accordance with one embodiment of the present invention.

FIG. 2F illustrates the steps of the sixth part of an exemplary method in accordance with one embodiment of the present invention.

FIG. 2H illustrates the steps of the eighth part of an exemplary method in accordance with one embodiment of the present invention.

DETAILED DESCRIPTION

The current invention is applicable to wireless networks, e.g., new radio 5G wireless networks and Citizens Broadband Radio Service (CBRS) networks, that provide wireless communications services, e.g., broadband services to wireless devices. The wireless devices may be, and in some embodiments are, mobile terminals, user equipment devices, or fixed location user equipment devices such as wireless customer premises equipment devices. The present invention is useful for wireless base stations operating in fixed and non-fixed wireless access networks. The present invention is particularly useful in fixed wireless access networks in which the network environment is a relatively controlled environment since the customer premises equipment devices are fixed at certain locations, i.e., at customer premises, in the network and will have known power level signal requirements for uplink and downlink communications, i.e., control and data signals, between the wireless base station and the customer premises equipment devices.

The present invention provides new and/or improved methods and apparatus for managing uplink resource grants for wireless devices, e.g., mobile terminals, user equipment and customer premises equipment devices, connected and/or attached to wireless base stations. Various embodiments of the present invention are directed to new apparatus and methods for managing uplink resource grants, e.g., proactive grants or assignments of resource blocks to use for uplink data transmission by wireless devices, after a wireless base station has received power down instructions which will result in the wireless base station's uplink coverage, e.g., Physical Uplink Shared Channel (PUSCH) and Physical Uplink Control Channel (PUCCH), being greater than its downlink control channel coverage e.g., Physical Downlink Control Channel.

In each of the various embodiments of the invention, the responsibility for the management of the uplink grant schedule for the wireless devices i.e., user terminals, user equipment devices, and customer premises equipment devices, connected to the wireless base station is switched from the wireless base station to the wireless devices upon the uplink control channel coverage area becoming greater than the downlink control channel coverage area for the cell in which the wireless base station is operating.

While the invention is explained using an exemplary Citizens Broadband Radio Service network, it should be understood that the invention is not limited to Citizens Broadband Radio Service networks.

Figure 14:
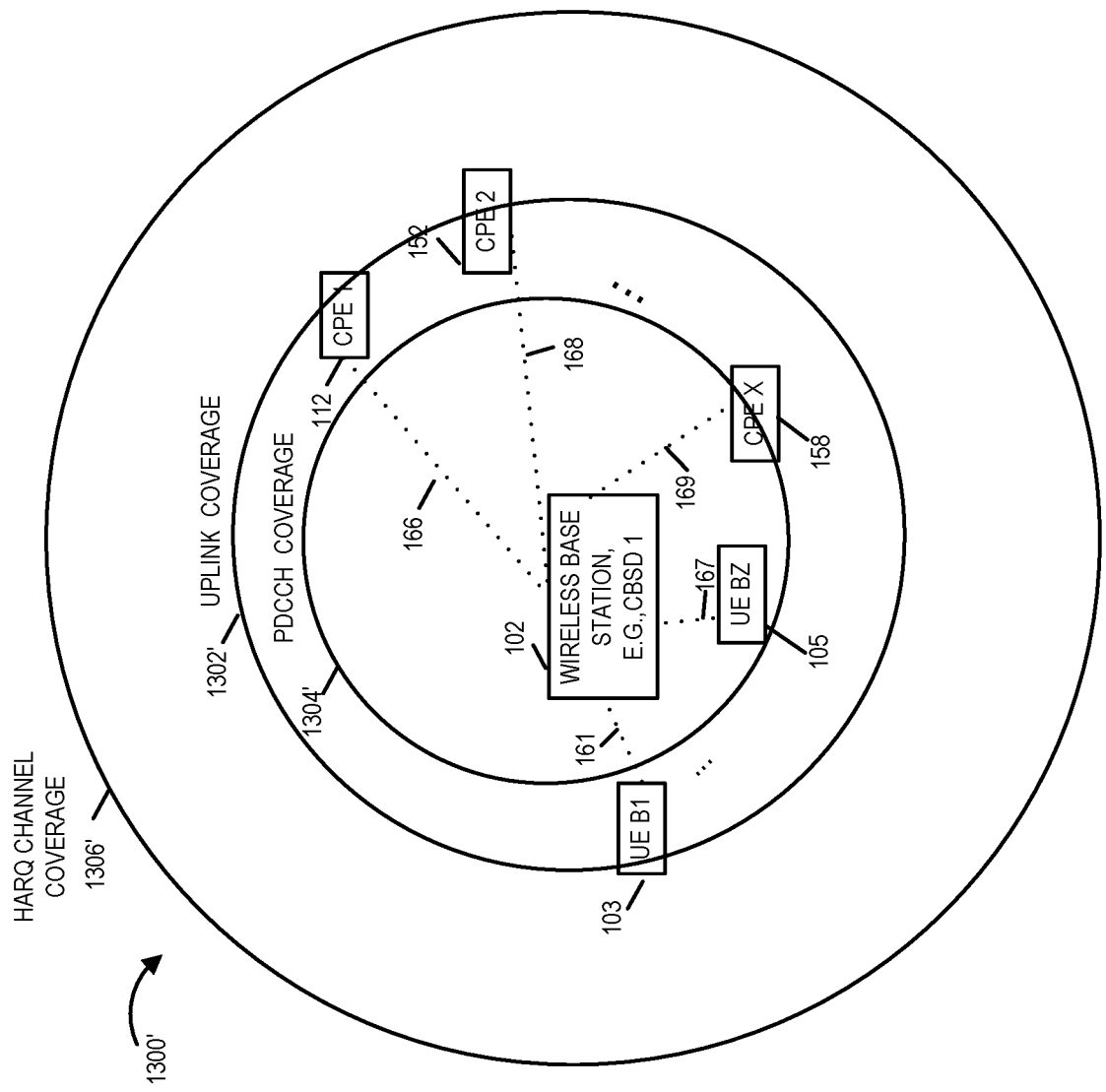
FIG. 14 illustrates an exemplary downlink control channel coverage area, uplink control channel coverage area, and an indicator channel coverage area of a wireless base station in which the indicator channel coverage area is greater than and encompasses the uplink control channel coverage area which in turn is greater than and encompasses the downlink control channel coverage area.

In an exemplary method embodiment of the present invention, the method includes the following steps/operations. In the first step, a wireless base station, e.g., CBSD, registers with a resource management system, e.g., spectrum access system (SAS), which manages the spectrum allocated to the wireless base station and the transmission power levels of the wireless base station. In the second step, the wireless base station, e.g., CBSD, receives a transmission level power down instructions from the resource management system, e.g., SAS instructing the wireless base station to reduce its transmission power level. This may occur for example when the resource management system, e.g., SAS, determines that the wireless base station's transmission are causing interference issues in the wireless network. In the third step, the wireless base station determines whether the power down instruction/command from the resource management system will result in a downlink control channel transmission power level less than a first threshold value. The first threshold value being a transmission power level value equal to or based on the maximum uplink control channel transmission power level of a wireless device. For example, if the maximum uplink transmission power level for the uplink control channel (e.g., the PUCCH) is 23 dBm then the first threshold may be, and in some embodiments is, set to 23 dBm. In such a scenario, the wireless base station will determine if the power down instruction from the resource management system will result in a transmission power level for the downlink control channel (e.g., the PDCCH) being less than 23 dBm. FIG. 14 which will be discussed in detail below shows an example of a downlink control channel (PDCCH) coverage area 1304' (i.e., area within circle 1304') which is less than the uplink control channel (PUCCH) coverage area 1302' (i.e., area within circle 1302'). In the situation shown in diagram 1300' of FIG. 14, while the wireless base station can receive uplink control messages from each of the wireless devices connected to it (CPE 1 112, CPE 2 152, ... , CPE X 159, UE B1 103, ... , UE BZ 167, the wireless base station can not communicate control messages to various wireless devices connected to it (e.g., CPE device 1 112, CPE 2 152, UE B1 103) because the wireless devices are outside the PDCCH coverage area 1304'.

Figure 13:
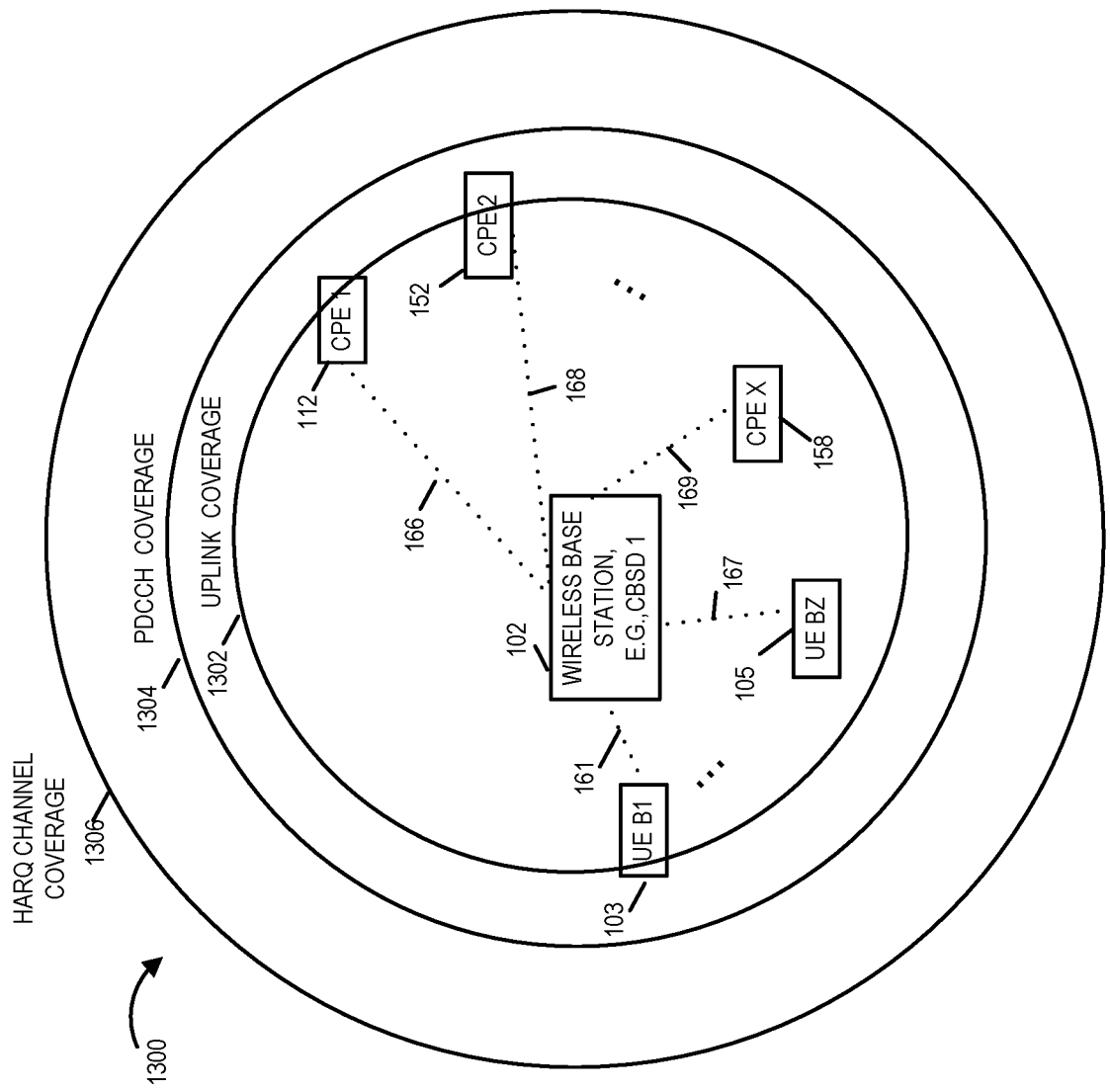
FIG. 13 illustrates an exemplary downlink control channel coverage area, uplink control channel coverage area, and an indicator channel coverage area of a wireless base station in which the indicator channel coverage area is greater than and encompasses the downlink control channel coverage area which in turn is greater than and encompasses the uplink control channel coverage area.

When the determination in the third step is that the downlink control channel transmission power level (e.g., PDCCH transmission power level) will be equal to or greater than the first threshold value, then in the fourth step the wireless base station reduces its transmission power level as instructed to by the resource management system, e.g., SAS. The wireless base station continues to manage the uplink resource grants after the transmission power reduction as the downlink control channel coverage area will be the same as or greater than the uplink control channel coverage area. This means that the wireless base station will be able to communicate the uplink resource grant schedule to each of the wireless devices that can communicate with the wireless base station. FIG. 13 which will be discussed in detail below shows an example of a downlink control channel (PDCCH) coverage area 1304 (i.e., area within circle 1304) which is greater then the uplink control channel (PUCCH) coverage area 1302 (i.e., area within circle 1302). All of the wireless devices connected to the wireless base station (e.g., CPE 1 112, CPE 2 152, ... , CPE 3 158, UE B1 103, ... , UE BZ 105) can receive downlink control messages, e.g., uplink resource grant schedules, as they are within the PDCCH coverage area 1304.

When the determination in the third step is that the downlink control channel transmission power level (e.g., PDCCH transmission power level) will be less than the first threshold value, then in the fifth step the wireless base station then generates a new uplink resource grant schedule and/or uplink grant schedule information for each wireless device connected to the wireless base station. In some embodiments, the resources in the uplink resource grant schedule are allocated based on ensuring that each of the wireless devices currently connected to the wireless base station has a minimum number of resource blocks to use for communications based on the current wireless network conditions. In some embodiments, once the resources in the uplink resource grant schedule are allocated to ensure that each of the wireless devices currently connected to the wireless base station have a minimum number of resource blocks to use for communications based on the current wireless network conditions, the remaining resource blocks are granted to wireless devices connected to the wireless base station based on maximizing the utilization of the uplink resources available based on current or historical usage by the connected wireless devices. For example, CPE devices connected to the wireless network will have larger uplink resource usage as they are typically supporting more than a single subscriber as the CPE device is handling traffic for 5 or 6 users/subscribers located a customer's premises and thus will be allocated a larger number of uplink resource blocks than mobile devices, e.g., smart phones, that are providing services for a single subscriber/user.

In the sixth step, the wireless base station generates a message indicating that the uplink grant schedule is to be managed by the wireless devices until it receives an instruction on the downlink control channel (PDCCH) that indicates the wireless base station is once again resuming management of the uplink resource grant schedule.

In the seventh step, the wireless base station, e.g., CBSD, communicates the generated new uplink resource schedule for each of the wireless devices connected to the wireless base station to the wireless devices via the downlink control channel, e.g., PDCCH.

In the eighth step, the wireless base station, e.g., CBSD, communicates the generated message indicating that the uplink resource grant schedule is to be managed by the wireless devices until it receives an instruction on the downlink control channel (PDCCH) that indicates the wireless base station is once again resuming management of the uplink resource grant schedule. This message is communicated to each of the wireless devices connected to the wireless base station that the wireless base station is providing services to.

In the ninth step, the wireless base station, e.g., CBSD, reduces its transmission power level as instructed to by the resource management system, e.g., SAS.

In the tenth step, the wireless devices will take over management of the uplink grant schedule and the wireless base station will cease sending PDCCH information. When a wireless device needs to change its uplink resource grant schedule it will send its requested uplink resource grant schedule information to the wireless base station, e.g., CBSD, via the uplink control channel (e.g., PUCCH) and will start transmitting its uplink data using the requested uplink resource grant schedule communicated to the wireless base station by the wireless device.

In the eleventh step, once the wireless base station receives the requested uplink resource grant schedule information from the wireless device, the wireless base station will allocate these uplink resource grants included in the requested uplink resource grant schedule information for that wireless device, e.g., by saving to memory the uplink resource grant schedule to memory indicating they are being used by the wireless device. This assumes that the requested uplink resource grants are available and have not been requested and already allocated to another wireless device. In response to data/information sent from the wireless device to the wireless base using the requested resource grant schedule, the wireless base station will send ACKs to the wireless base station indicating successful reception of the transmitted data/information using the requested uplink resource grant schedule. This will confirm that the wireless base station has allocated the requested uplink resource grant schedule to the wireless device. The process implemented for sending ACKs and NACKs to the wireless devices connected to the wireless base station allows for greater distance in communicating with wireless devices connected to the wireless base station than the downlink control channel, e.g., PDCCH. The ACKs and NACKs are typically sent using a HARQ process.

The ACKs in some embodiments are sent in a Physical HARQ Channel (e.g., a Physical HARQ Indicator Channel (PHICH)), which carries ACK/NACKs in response to uplink transmission. The Physical HARQ Channel, e.g., a PHICH channel, is a smaller channel than the downlink control channel as the information sent is limited, e.g., ACK/NACks. The Physical HARQ Channel has a larger coverage area than either the PDCCH or the PUCCH due to one or more of the following items: higher transmission power level than the downlink control channel, e.g., PDCCH, or the uplink control channel, e.g., PUCCH, encoding scheme utilized allows for better error correction than the downlink control channel, e.g., PDCCH, and modulation scheme, e.g., B-PSK modulation scheme allows for greater distance in communications than the PDCCH.

If the resources of the requested uplink resource grant schedule are not available because the resources have already been allocated to another wireless device, the wireless base station, e.g., CBSD, will send NACKs to all data/information sent from the wireless device to the wireless base station in the already scheduled uplink resource grant. In some embodiments, as described above the NACKs are sent using a HARQ process which provides greater coverage area than the downlink control channel coverage area. In some embodiments, the NACKs are sent in the Physical HARQ channel, e.g., Physical HARQ Indicator channel, and are received by the wireless device. The NACKs indicate a failure of the wireless base station to receive the data transmitted from the wireless device. After the wireless device receives a threshold number of NACKs from the wireless base station in response to data/information transmitted using the requested resource grant schedule, the wireless device will make the determination that the resources of the requested uplink grant schedule are being used by another wireless device. The wireless device will then generate and send a new request with a revised/different uplink resource grant schedule and begin transmitting data/information using the revised/different uplink resource grant schedule to the wireless base station. If the wireless device receives ACKs in response to the transmitted data/information then it will determine that the wireless base station has allocated the revised/different grant schedule to the wireless device and it will continue to use it to transmit data. If however, the wireless device receives NACKs a threshold number of NACKs in response to the transmitted data/information using the revised/different uplink resource grant schedule, the wireless device will determine that it has not been allocated the revised/different uplink resource grant schedule for use and will repeat the process until ACKs are received in response to a requested uplink resource grant schedule. The above process of requesting and an uplink resource grant schedule and determining whether the request has been accepted or rejected based on the receipt of ACKs or NACKs in response to attempts to transmit data/information to the wireless base station is used by each wireless device to manage its own uplink resource grant schedule.

Once the wireless base station receives an instruction from the resource management device that it may increase its transmission power level above the first threshold value, e.g., 23 dBm, the wireless base station will generate a message indicating that the wireless base station is once again resuming management of the uplink resource grant schedule. The wireless base station will then communicate the generated message indicating it is resuming management of the uplink resource grant schedule to the wireless devices connected to the wireless base via the downlink control channel, e.g., PDCCH. The wireless base stations will be able to receive this communication as the downlink control channel coverage area will once again be equal to or larger than the uplink control channel coverage area which is required for the wireless devices to communicate with the wireless base station. The wireless base station will then generate and send a new uplink resource grant schedule to each of the wireless devices connected to the wireless base station using the downlink control channel, e.g., PDCCH. The wireless devices upon receipt of the message indicating the wireless base station is resuming management of the uplink resource grant schedule will cease sending requests with uplink resource grant schedule information. Upon receipt of the new uplink resource grant schedule sent to the wireless devices, the wireless devices will once again resume sending data/information to the wireless base station using the new uplink resource grant schedule.

In some embodiments, the wireless base stations have two mode of operation. In the first mode of operation, the wireless base station's transmission power level grant from the resource management device, e.g., SAS, is at a level which when implemented by the wireless base station results in the downlink control channel coverage range or area being greater than the uplink control channel coverage range or area. In such instances the wireless base station can communication control information, e.g., uplink resource grant schedule information to the wireless devices connected to the wireless base station. In the first mode of operation, the wireless base station manages the uplink resource grant schedules for the wireless devices connected to the wireless base station. The wireless base station switches from operating in the first mode of operation to operating in the second mode of operation upon determining that a power down command received from the resource management system will result in an indicator channel on which ACKs and NACKs are sent to wireless devices will have a greater coverage range or area then the uplink control channel coverage range or area which is greater than the downlink control channel range or coverage area and that various wireless devices connected to the wireless base station will no longer be able to receive downlink control signals, e.g., uplink resource grant schedules, from the wireless base station. In the second mode of operation, the wireless base station's transmission power level notifies the wireless devices connected to the wireless base station that they are responsible for managing their own uplink resource grant schedule and then subsequently reduces its transmission power level in accordance with the power down command. In this second mode of operation, the wireless base station ceases to manage the uplink resource grant schedule for the wireless devices connected to the wireless base station. In the second mode of operation, the wireless base station receives uplink resource grant schedule information from each of the wireless devices and allocates the set of uplink resources blocks identified in an uplink grant schedule information to the wireless devices on a first come first served basis. When two or more wireless devices transmit data using one or more of the same uplink resource blocks, the wireless base station sends ACK messages to the wireless device to which the resource blocks were allocated and NACK messages to the wireless devices to which the resource blocks were not allocated. When the wireless base station is operating in the second mode of operation and receives a transmission power level increase command from the resource management device it will determine if implementing the change will result in the downlink control channel coverage area or range being greater than the uplink control channel coverage range or area and if it will then the wireless base station increases its transmission power level and switches back to operating in the first mode of operation. If it will not, then the wireless base increases it power level but remains in the second mode of operation. Once the wireless base station switches back to operating in the first mode of operation it notifies the wireless devices connected to the wireless base station that it is once again managing the wireless devices uplink resource grant schedules. In some embodiments, the notification is actually sending newly generated uplink resource grant schedules to each of the wireless devices connected to the wireless base station.

The wireless devices in some embodiments also have two modes of operation. A first mode of operation and a second mode of operation. In the first mode of operation the wireless devices do not manage their uplink resource grant schedules but instead receive their uplink resource grant schedules from the wireless base station to which they are connected. In the second mode of operation the wireless devices manage their own uplink resource grant schedules by generating an uplink resource grant schedule and transmitting the generated uplink resource grant schedule to the wireless base station using an uplink control channel and then transmitting data to the wireless base station using the resource blocks identified in the uplink grant schedule using an uplink data channel. When an ACK message is received the wireless base station continues to use the uplink resource grant schedule resource blocks to transmit data to the wireless base station. When NACK messages are received, e.g., a threshold number of NACK messages, then the wireless devices generates a new uplink resource grant schedule and repeats the process until ACK messages are received when data is sent on the uplink resource blocks of the newly generated uplink resource grant schedule. The wireless device switches from operating in the second mode of operation to operating in the first mode of operation when it receives a message from the wireless base station including a uplink resource grant schedule for the wireless device or an indication that the wireless base station is once again managing the uplink resource grant schedule for the wireless device.

Citizens Broadband Radio Service networks are networks that include user equipment devices, e.g., mobile or wireless devices such as for example cell phones, smart phones, laptops, tablets, smart TVs, Citizens Broadband Radio Service Devices (CBSDs) which serve as access points/base stations, and Spectrum Access Systems which provides spectrum assignments and manage frequency interference through power management of the CBSDs transmission power. The Citizens Broadband Radio Service network utilizes the 150 megahertz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs transmission power levels in a geographical area the SAS manages the radio interference in the geographical area.

Various embodiments of the present invention describe methods, apparatus, systems and techniques for managing and/or utilizing uplink resource grants and/or assignments for user terminals, e.g., customer premises equipment devices, in wireless networks therein providing wireless services in an efficient and effective manner. In some embodiments of the present invention, Citizen Broadband Radio Service spectrum, 3.5 GHz frequency spectrum band, is used to serve nomadic and stationary users. In some embodiments, a CBSD base station is dedicated to serving only stationary users, while in other embodiments the CBSD serves both nomadic and stationary users. The invention is useful to provide broadband services to geographically isolated or remote areas, e.g., rural areas, where wired or optical connections are expensive and not economical given the number of customers to be serviced. The invention is also useful in urban areas where wireless services may be preferred as a replacement for wired connections or in addition to wired connections. In the present invention, a CBRS Customer Premise Equipment device (CPE) is located at a customer's premises inside of a house, business or any place where there are CBRS network users. The CBRS CPE device is coupled or connected to at least one CBRS fixed wireless access (FWA) tower base station (e.g., CBSD) over wireless communications links. The CBRS CPE is typically located in a building such as a home and is coupled to one or more antennas or an antenna array through which the CBRS CPE device transmits to and receives from the antenna(s) of the CBRS FWA tower base station (CBSD) wireless signals over the wireless communications link. These wireless communications links being in the 3.5 GHz frequency spectrum band. The CBRS CPE device in some embodiments includes external antennas. In some embodiments, the CBRS CPE device includes one or more internal antennas. In some embodiments, the CBRS CPE device includes one or more internal antennas and one or more antenna ports to which one or more external antennas are connected. The CBRS CPE device is coupled through a wired connection, e.g., a cable to one or more Wireless Fidelity (Wi-Fi) Access Points. The CBRS CPE device also referred to herein as CPE device or CPE serves the subscribers or users located in its coverage area, e.g., in the house, building, or on the customer's premises. The one or more Wi-Fi access points provide Wi-Fi services to the one or more end point devices or user equipment devices located at the customer premises. The one or more Wi-Fi access points are connected over a cable or wired communications to the CBRS CPE device through which backhaul is provided.

The wireless base station in the exemplary embodiment is a CBRS FWA tower base station which is a CBSD device and as such its transmission power levels and spectrum bandwidth are allocated or assigned to it via a Spectrum Access System of the CBRS network. The CBRS network includes multiple CBSD devices though only a single wireless base station, CBSD, is shown in the exemplary system 100 illustrated in FIG. 1.

Each wireless base station, e.g., CBRS FWA tower base station/CBSD, is coupled to and registered with a CBRS network Spectrum Access System (SAS) of the CBRS network. The CBRS network Spectrum Access System manages the allocation of CBRS network spectrum and transmission power levels. The SAS is responsible for assigning/allocating spectrum to the CBRS FWA tower base stations. The CBRS FWA tower base station manages the downlink and uplink resource assignments/grants to be utilized by the wireless devices, e.g., wireless terminal devices, e.g., CPE devices and user equipment devices, connected and/or attached to the wireless base station.

The CBRS CPE device antenna(s) are typically located at an elevated position such as for example on the top of a roof of a building or on a pole outside the building in which the CBRS CPE device is located. In some embodiments, the CBRS CPE device includes one or more internal antennas and/or one or more antenna ports for connecting the device via a wire to external antennas mounted outside of the building.

The transmission power levels allocated for the wireless base stations, e.g., CBRS FWA tower base stations/CBSDs, are high in comparison to the transmission power level of the CPE devices, e.g., CBRS CPE devices. For example, a CBRS FWA tower base station coverage area can include hundreds of customer premises while the CBRS CPE device has a much smaller coverage area. Each CBRS CPE located at a customer's premises provides services to subscriber's user equipment devices such as computers, laptops, tablets, smart devices (e.g., appliances, watches, smartTVs), streaming devices, WiFi devices, CBRS enabled devices (e.g., CBRS phones), via one or more Wi-Fi Access Points. The CPE device includes at least one wireless interface for communicating with wireless base station, e.g., CBRS FWA tower base station. The CPE device also includes one or more wired and/or optical interfaces so that it can be coupled to and communicate with WiFi access points or base stations and/or other devices with wired and/or optical interfaces such as internet telephony systems, cable network devices, internet media streaming devices, e.g., over wired or optical networks (e.g., local area networks or wide area networks) at the customer's premises. The CPE device provides bridging and/or protocol converter and/or router functionality as the CPE device converts wireless signals received in a first protocol format, e.g., 5G wireless signal, CBRS wireless signal or a cellular wireless signal, to a format that is understood by the Wi-Fi access points.

Figure 1:
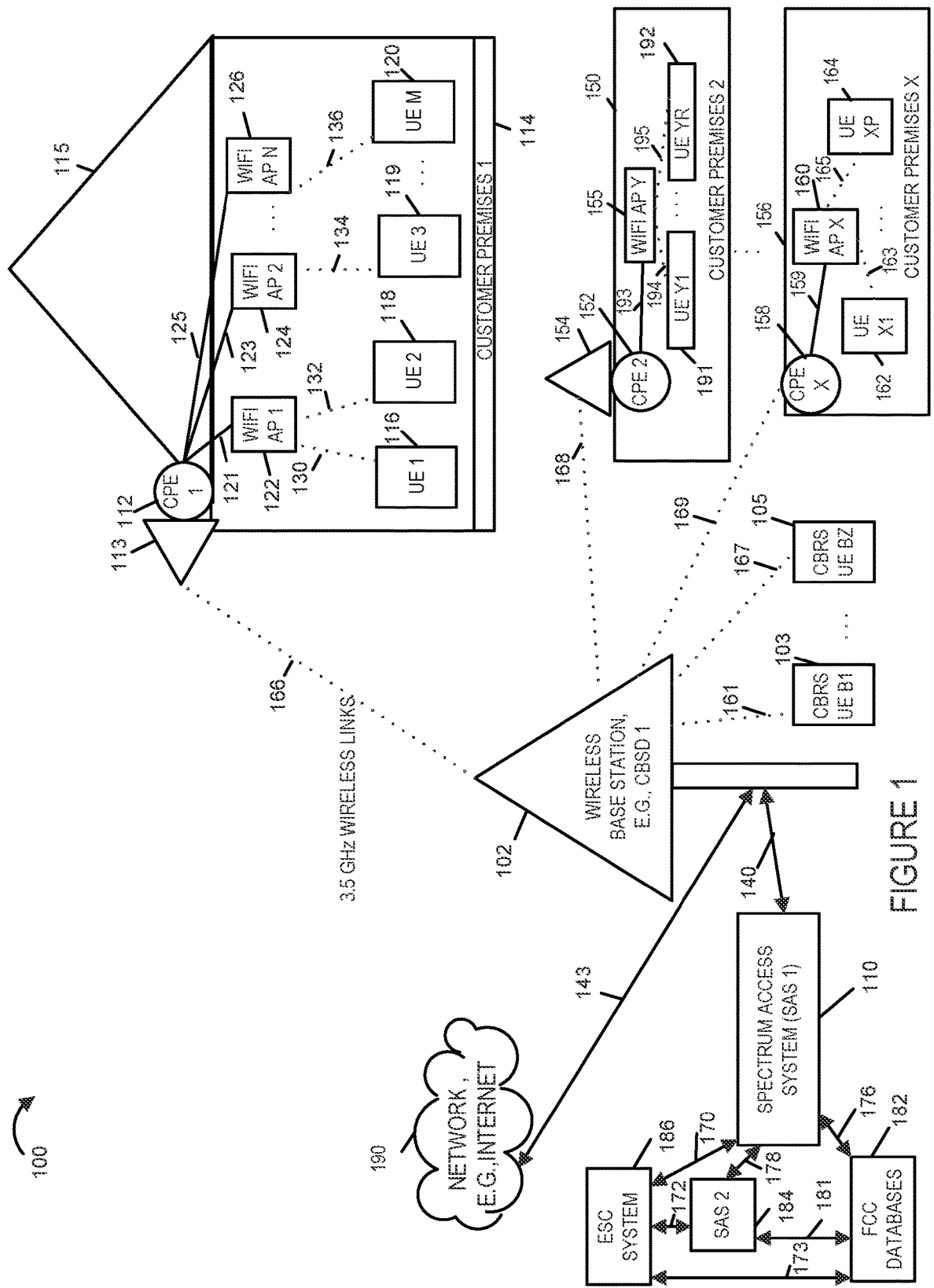
FIG. 1 illustrates an exemplary wireless communications system shown as a Citizens Broadband Radio Service network system 100 that provides wireless communications services in accordance with one embodiment of the present invention.

FIG. 1 illustrates an exemplary wireless communications system 100 illustrated as a CBRS network communications system, having an architecture implemented in accordance with an embodiment of the present invention and being coupled to a network 190 (e.g., the internet). The communications system 100 also referred to as the CBRS communications network system 100 includes at least one wireless base station 1 102 illustrated as a Citizens Broadband Radio Service Fixed Wireless Assess (FWA) tower base station (CBSD) (e.g., CBSD 1), a plurality of Spectrum Access System devices (SAS 1 110, SAS 2 184), a plurality of customer premises (customer premises 1 114, customer premises 2 150, . . . , customer premises X 156, X being an integer greater than 2), a plurality of CBRS Customer Premises Equipment devices (CBRS CPE device 1 112, CBRS CPE device 2 152, . . . , CBRS CPE device X 158, X being integer greater than 2), a plurality of Wi-Fi Access Points or base stations (Wi-Fi AP 1 122, Wi-Fi AP 2 124, . . . , Wi-Fi AP N 126, Wi-Fi AP Y 155, Wi-Fi AP X 160) an ESC system 186, a FCC Database System 182, and a plurality of communications links 121, 123, . . . , 125, 130, 132, 134, . . . , 136, 140, 143, 159, 163, 165, 166, 168, 169, 170, 172, 173, 176, 178, and 181. The CBRS system 100 is coupled to a network 190, e.g., the Internet, through which various services can be provided such as for example voice over internet call services, video on demand services, video conferencing services. In some embodiments, the network is a part of the 5G/CBRS network and the services are provided from CBRS network service providers. In the example system shown in FIG. 1 the wireless base station 102, e.g., CBRS FWA tower base station 1 or CBSD 1 is illustrated as being coupled or connected to the network 190 via communications link 143 which may be a wired, wireless or an optical link. Though not shown the CBRS network typically includes other wireless base stations, e.g., CBRS tower base stations or CBSDs, which are also typically coupled or connected to the network 190 via communications links. In some embodiments, the wireless base stations, e.g., CBRS tower base stations or CBSDs, are coupled to a packet gateway system which is part of and located in the network 190.

CPE device 1 (CPE 1) 112, e.g., CBRS CPE device, includes an antenna system 113, e.g., one or more antenna or an antenna array mounted on a roof of a building 115, e.g., home or office building, located in customer premises 1 114 for communicating with the wireless base station 102, e.g., CBRS tower base station 1 102. The antenna being coupled to a portion of the CPE device 1 which is located inside the house 115 and which also includes separate interfaces for communicating with Wi-Fi Access Points located at the customer premises or within its coverage range. Wi-Fi Access Points 122, 124, and 126 are coupled to or connected to the CPE device 1 112 via wires or cables 121, 123, and 125 respectively in the exemplary embodiment.

CPE device 2 (CPE 2) 152, e.g., CBRS CPE device 2, is located at the customer premises 2 150 and includes an antenna system 154 located at an elevated position (e.g., mounted on a pole or roof of a building located at the customer premises 2 150) for communicating with the wireless base stations e.g., wireless base station 102, e.g., CBRS tower base station 1 102. The elevation of the antenna system allows for less obstruction of wireless signals do to other structures and hence provides for a larger geographical area within which it can exchange wireless signals with wireless base stations, e.g., CBRS tower base stations. CPE 2 152 also includes a separate interface for communicating with a Wi-Fi Access Point located at the customer premises or within its coverage range. Wi-Fi Access Point Y 155 is coupled to or connected to the CPE device 2 152 via a wire or cable 193 in the exemplary embodiment. While only a single Wi-Fi AP Y 155 is shown as receiving services from the CPE device 2 152 at customer premises 2 150, in various embodiments more than one Wi-Fi Access Point may be implemented and coupled and/or connected to CPE device 2 152 and receive services via the CPE device 2 152.

CPE device X (CBRS CPE X) 158 is located at the customer premises X 156 and includes an internal antenna and/or antenna array within the device for communicating with wireless base stations, e.g., CBRS tower base station 1 102 also referred to as CBSD 1.

Customer premises 1 114 includes Wi-Fi Access Point 1 (Wi-Fi AP 1) 122, Wi-Fi AP 2 124, . . . , Wi-Fi AP N 126 (N being an integer greater than 2) which provide Wi-Fi services to the user equipment devices at the customer premises 1 114 which include UE 1 116, UE 2 118, UE 3 119, . . . , UE M 120, where M is an integer greater than 3.

Customer premises 2 150 similarly includes one or more Wi-Fi access points and UE devices though only a single Wi-Fi Access Point Y 155 and user equipment devices UE Y1 191, . . . , UE YR 192 are shown for the sake of simplicity. UE Y1 191, . . . , UE YR 192 being coupled to the Wi-Fi Access Point Y 155 via wireless communications links 194, . . . , 195. The Wi-Fi AP Y 155 being coupled or connected to the CPE 2 152 via a communications link 193 such as for example a wire or cable connection.

Customer premises X 156 includes CPE device X 158, Wi-Fi Access Point X 160 and endpoint or user equipment devices UE X1 162, . . . , UE XP 164, where P is an integer greater than 1. The user equipment devices UE X1 162, . . . , UE XP 164 being coupled or connected to the Wi-Fi AP X 160 via Wi-Fi communications links 163 and 165. The Wi-Fi AP X 160 being coupled or connected to the CPE X via a communications link 159 such as for example a wire or cable connection.

In the exemplary embodiment, the user equipment devices UE 1 116, UE 2 118, UE 3 119, . . . , UE M 120, UE Y1 191, . . . , UE YR 192, and UE X1 162, . . . , UE XP 164 are enabled to wirelessly communicate using a wireless protocol which in this example is a Wi-Fi protocol which is different than the wireless protocol used to communicate between the CPE devices and the wireless base stations which use a 5G protocol such as the CBRS wireless protocol.

In some embodiments, the Wi-Fi Access Points are Wi-Fi routers and the UE devices at the customer premises may be, and in some embodiments are, coupled or connected to the Wi-Fi Access Points or routers via cables or wires.

In some embodiments, the wireless base station 102, e.g., CBSD 1 102 also supports optional CBRS mobile user equipment devices CBRS UE B1 103, . . . , CBRS UE BZ 105 which communicate with the CBSD 1 102 using a 5G or CBRS wireless protocol via 3.5 GHz wireless links 161 and 167 respectively.

The SAS 1 110 is coupled to SAS 2 184 via communications link 178. SAS 1 110 is coupled to FCC Databases 182 via communications link 176. SAS 2 184 is coupled to FCC Databases 182 via communications link 181. ESC system 186 is coupled to SAS 1 110 and SAS 2 184 via communications links 170 and 172 respectively. The ESC System 186 is coupled to the FCC Databases 182 via communications link 173. The ESC system 186 is used to detect and/or sense Navy radar operations in CBRS operation within 3550-3650 MHz near the coasts and provide notifications over the communications links to SAS 1 110 and SAS 2 184. SAS 1 110 manages the CBRS tower base station 1 102 spectrum allocation and transmission power to limit interference in the CBRS network. SAS 2 184 manages CBSDs including other CBRS tower base stations in the CBRS network which are not shown in FIG. 1. SAS 1 110 and SAS 2 184 communicate and share information regarding the CBRS network coverage of the CBSDs including CBRS tower base stations each respectively manage and coordinate management of the allocation of spectrum and transmission power levels of CBSDs including CBRS tower base stations throughout the CBRS network. While only two SAS devices are shown in FIG. 1, it should be understood that additional SAS devices are typically used in the CBRS network. In some embodiments, one or more of the CBRS tower base stations of the CBRS network are also coupled or connected to each other either through wired and/or wireless communications links so that they can communicate and exchange information.

In the exemplary embodiment, the communications links 161, 166, 167, 168, 169 are wireless communications links in the 3.5 GHz frequency spectrum band. The communications link 166 couples or connects the wireless base station 102, e.g., CBRS tower 1 base station 102, to CPE device 1 112. The communications link 168 is also a wireless communications link in the 3.5 GHz frequency spectrum band that couples or connects wireless base station 102 to CPE device 2 152. The communications link 169 is a wireless communications link in the 3.5 GHz frequency spectrum band that couples or connects wireless base station 102 to CPE device X 158. Communications links 161 and 167 are wireless communications links in the 3.5 GHz frequency spectrum band that couples or connects wireless base station 102 to CBRS user equipment devices UE B1 103, . . . , UE BZ 105 respectively.

The CPE devices are fixed or non-mobile devices located at customer premises. In some embodiments the wireless base station 102 only provides wireless services to users via CPE devices and does not support CBRS mobile wireless user equipment devices such as the optional CBRS UE B1 103, . . . , CBRS UE BZ 105 devices.

Communications links 140, 143, 170, 172, 173, 176, 178, 181 are typically wired communications links or fiber optical cables. Communications links 140 couples or connect SAS 1 110 to wireless base station, e.g., CBSD 1 102.

The communications links 130, 132, 134, . . . , 136 are Wi-Fi wireless communications links which couple or connect user equipment device 1 (UE 1) 116, user equipment device 2 (UE 2) 118, user equipment device 3 (UE 3) 119, . . . , user equipment device M 120 to Wi-Fi Access Points as shown in FIG. 1.

The communications links 194 and 195 are Wi-Fi wireless communications links which couple or connect user equipment device UE Y1 191 and user equipment device UE YR 192 to Wi-Fi Access Point Y 155 as shown in FIG. 1.

The communications links 163 and 165 are Wi-Fi wireless communications links which couple or connect user equipment device UE X1 162 and user equipment device UE XP 164 to Wi-Fi Access Point X 160 as shown in FIG. 1.

In the exemplary system 100, one or more of the customer premises do not have wired or optical communications links that provide broadband services to the user devices located at the customer premises instead broadband services are provided by the wireless network, e.g., CBRS network by the wireless communications links coupling the wireless base station 102, e.g., CBRS tower base station 1 102, to the user devices located at the customer premises via the indirect wireless connections via the CPE device and Wi-Fi Access Points located at the customer premises. Exemplary customer premises include campuses (e.g., college campuses), buildings such as for example homes, hospitals, libraries, office buildings, warehouses, parks, etc. and as such have varying diverse demands for the number of user equipment devices and loading that the wireless base station needs to support. In some embodiments, the wireless base station is located in a rural area where cable links are not economical and the wireless base station provides the broadband services to the users located at the customer premises within its cell coverage via the CPE devices. The CPE devices communicate with the wireless base stations through interfaces that operate as CBRS user equipment devices and not as CBSD base stations.

In some embodiments, the CPE devices located at the customer premises include Wi-Fi routers or router circuitry and directly communicate with the Wi-Fi devices within their coverage area without requiring separate Wi-Fi Access Points.

It is to be understood that the communication links shown in system 100 are only exemplary and other network configurations and communications links may be employed that couple together the devices, base stations, access points, nodes, entities, and databases of the system 100. Elements or steps with the same reference numbers used in different figures are the same or similar and those elements or steps will not be described in detail again.

While for the sake of simplicity in explaining the invention system 100 only illustrates a single wireless base station shown as CBRS tower base station device (CBSD), two SAS devices and a few customer premises with a single CPE device located therein servicing a few UE devices through one or more Wi-Fi Access Points, it will be appreciated that system 100 typically includes a large plurality of wireless base stations, e.g., CBRS tower base stations or CBSDs, with a large number, e.g., hundreds, of customer premises within each of the wireless base station's, e.g., CBRS tower base station's, coverage range including a CPE device which is supporting a plurality of Wi-Fi Access Points and a plurality of UE devices at the customer premises with the wireless base stations being managed by a plurality of SAS devices which are in communication with one another.

Figure 3:
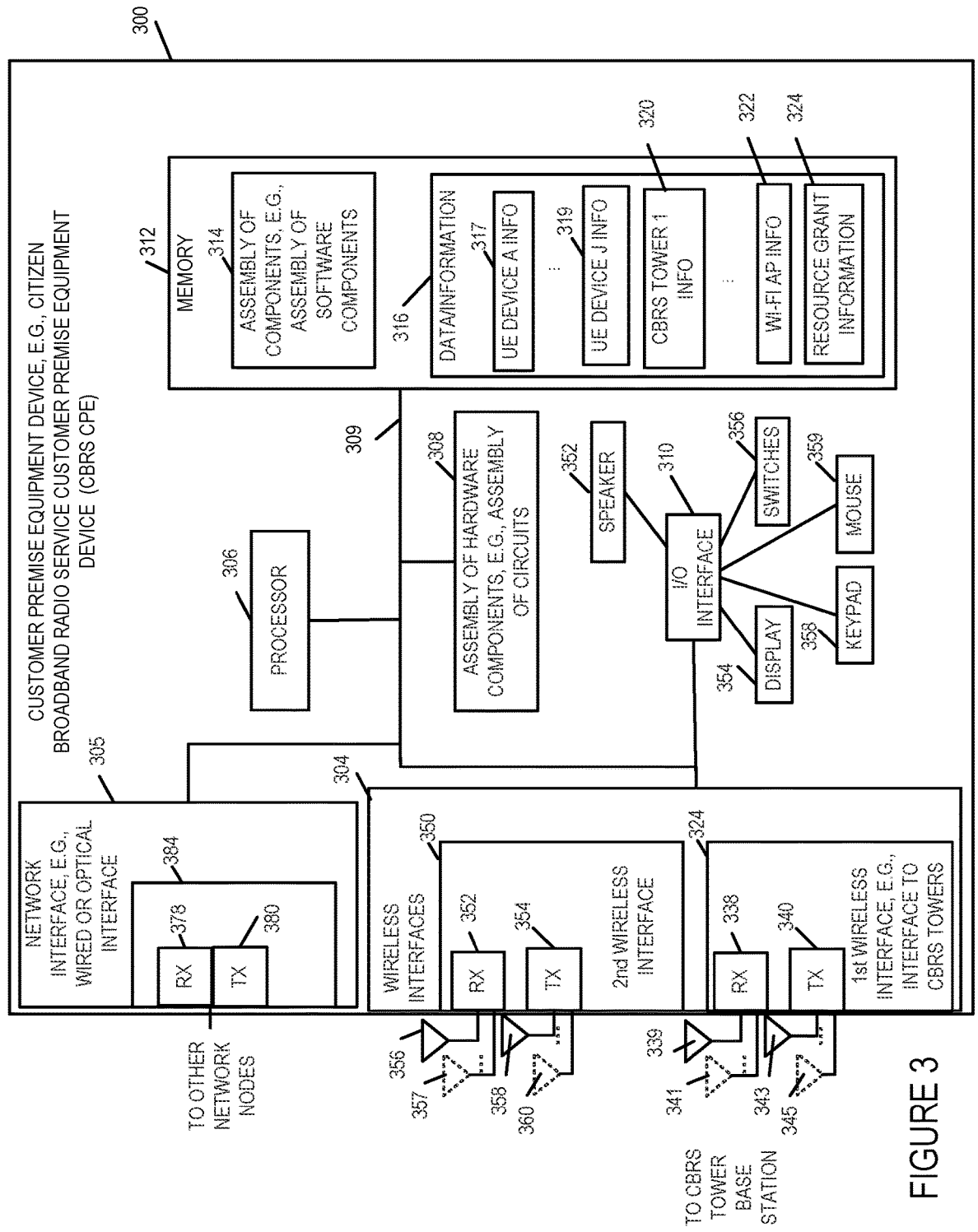
FIG. 3 illustrates details of an exemplary Customer Premises Equipment device, e.g., a Citizens Broadband Radio Service Customer Premise Equipment (CBRS CPE) device, in accordance with one embodiment of the present invention.

FIG. 3 is a drawing of an exemplary CPE device 300, e.g., a Citizens Broadband Radio Service Customer Premise Equipment device 300, in accordance with an exemplary embodiment. Exemplary CPE device 300 includes wireless interfaces 304, a network interface 305, e.g., a wired or optical interface, a processor 306, e.g., a CPU, an assembly of hardware components 308, e.g., an assembly of circuits, and I/O interface 310 and memory 312 coupled together via a bus 309 over which the various elements may interchange data and information. CPE device 300 further includes a speaker 352, a display 354, switches 356, keypad 358 and mouse 359 coupled to I/O interface 310, via which the various I/O devices (352, 354, 356, 358, 359) may communicate with other elements (304, 305, 306, 308, 312) of the CPE device 300. Network interface 305 includes a receiver 378 and a transmitter 380. In some embodiments, receiver 378 and transmitter 380 are part of a transceiver 384. Wireless interfaces 304 include a plurality of wireless interfaces including first wireless interface 324 and a second wireless interface 350. The first wireless interface 324 is used to communicate with the wireless base station, e.g., CBRS tower base station. The second wireless interface is optional and can be used to communicate with a different wireless base station than the first wireless interface for example to obtain additional backhaul capability. The first wireless interface 324 includes wireless receiver 338 and a wireless transmitter 340. In some embodiments, receiver 338 and transmitter 340 are part of a transceiver. In various embodiments, the first wireless interface 324 includes a plurality of wireless receivers and a plurality of wireless transmitters. Wireless receiver 338 is coupled to a plurality of receive antennas (receive antenna 1 339, . . . , receive antenna M 341), via which CPE device 300 can receive wireless signals from other wireless communications devices including a second wireless communications device, e.g., a wireless base station, e.g., CBRS tower base station or CBSD. Wireless transmitter 340 is coupled to a plurality of wireless transmit antennas (transmit antenna 1 343, . . . , transmit antenna N 345) via which the CPE device 300 can transmit signals to other wireless communications devices including a second wireless communications device, e.g., wireless base station such as a CBRS tower base station. The antennas 339, . . . , 341 and 343, . . . , 345 are typically mounted on the roof of the building in which the CPE device is located or on a poll at an elevated height with the other elements of the CPE device being connected to the antennas via a wired or fiber optic connection. In some embodiments the various antennas form an antenna array with the antennas pointing in different directions. In some embodiments, one or more of the antennas are included inside the housing of the CPE device and the CPE device includes one or more connections to which exterior antennas may be connected.

The second optional wireless interface 350 includes wireless receiver 352 and a wireless transmitter 354. In some embodiments, receiver 352 and transmitter 354 are part of a transceiver. In various embodiments, the second wireless interface 350 includes a plurality of wireless receivers and a plurality of wireless transmitters. Wireless receiver 352 is coupled to one or more receive antennas (receive antenna 1 356, . . . , receive antenna M 357), via which CPE device 300 can receive wireless signals from other wireless communications devices including a second wireless communications device, e.g., a second wireless base station using the same or a different wireless protocol than the first wireless interface. Wireless transmitter 354 is coupled to one or more wireless transmit antennas (transmit antenna 1 358, . . . , transmit antenna N 360) via which the CPE device 300 can transmit signals to other wireless communications devices including a second wireless communications device. In some embodiments, the second wireless interfaces 350 are Wi-Fi interfaces so that the CPE device can communication over Wi-Fi wireless links to user equipment devices. In some such embodiments, the CPE device includes one or more hardware and/or software components that provide wireless routing services for the Wi-Fi interfaces and the CPE device also acts as a Wi-Fi router.

The CPE device network interface 305 may be coupled to Wi-Fi Access Points, LAN networks, WANs, routers, e.g., WiFi routers or Access Points, so that various devices in the home without wireless interfaces can also be serviced via wired or optical links by the CPE device 300.

Memory 312 includes an assembly of components 314, e.g., an assembly of software components, and data/information 316. Data/information 316 includes UE device information corresponding to a plurality of user equipment devices (UE device A information 317, . . . , UE device J information 319 where A to M are the UE devices being serviced by the CPE device) and wireless device base station information (e.g., CBRS tower base station 1 information 320) and Wi-Fi Access Point Information 322 which includes information about the Wi-Fi Access Points connected to the CPE device, Resource Grant information 324 including information on uplink resources granted and/or assigned to the CPE device for use by CPE device to transmit data to the wireless base station e.g., CBRS Tower 1 (CBSD 1) e.g., in connection with services provided via the wireless network, e.g., voice and/or video calls, uploading of sensor data, etc. In some embodiments, one or more of the CPE devices shown and/or discussed in connection with the Figures and methods discussed herein including one or more of CPE device 1 112, CPE device 2 152, . . . , CPE device X 158 are implemented in accordance with CPE device 300.

Figure 4:
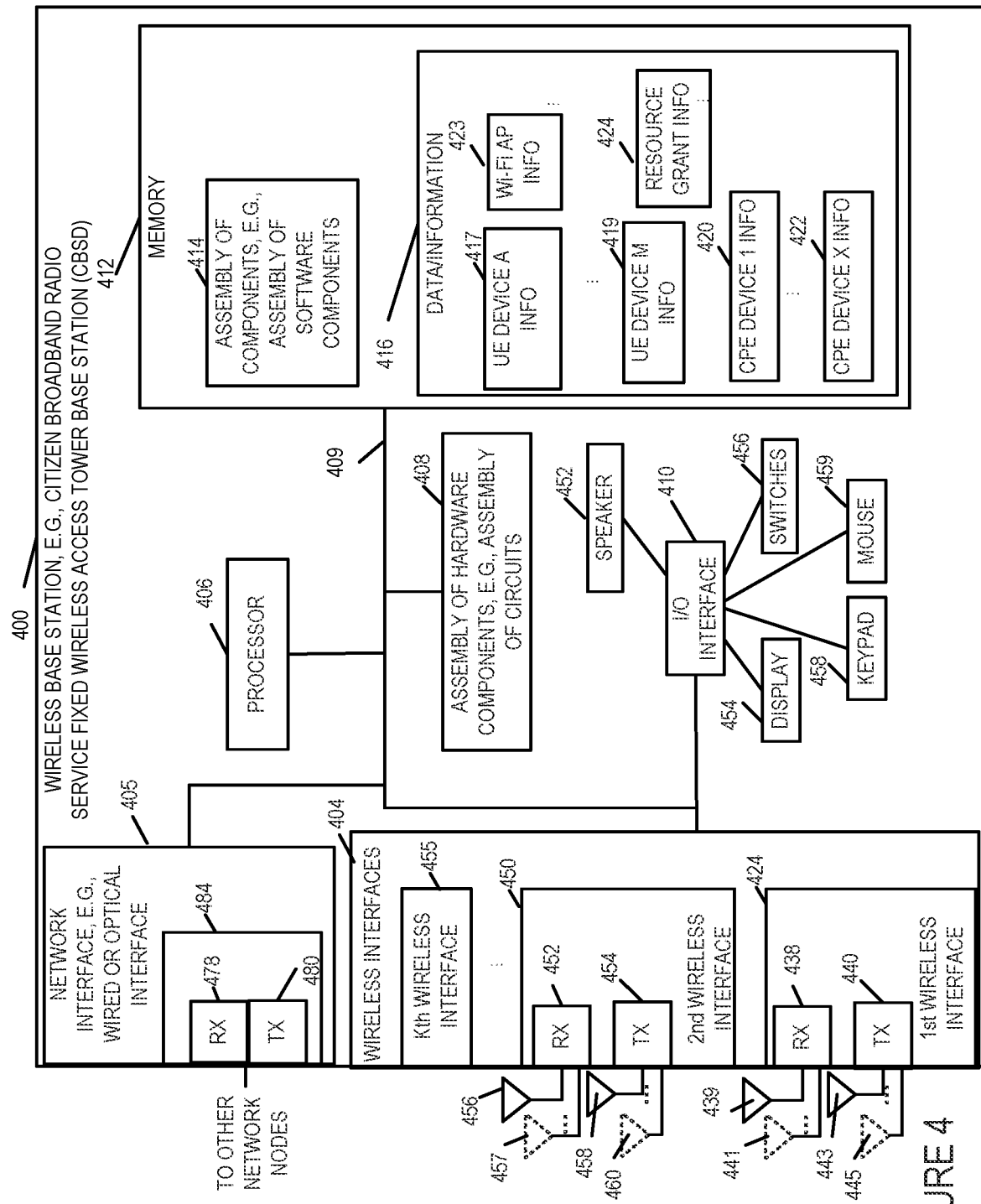
FIG. 4 illustrates details of an exemplary wireless base station, e.g., a Citizens Broadband Radio Service tower base station also referred to as Citizens Broadband Radio Service Device, in accordance with one embodiment of the present invention.

FIG. 4 is a drawing of an exemplary wireless base station 400, e.g., a Citizens Broadband Radio Service Fixed Wireless Access Tower Base Station (CBSD) 400, in accordance with an exemplary embodiment. Exemplary wireless base station 400, e.g., CBRS tower base station 400, includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. The wireless interfaces are used to communicate with the CPE devices and CBRS UE devices. The first wireless interface 424 is used for example to communicate with a CPE device, e.g., CPE 1 112. The second wireless interface can be used to communicate with a CBRS enabled user equipment device, e.g., CBRS UE B1 103. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a CPE device or a CBRS user equipment device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., CPE device or a CBRS user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., a CPE device or CBRS UE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled to a SAS system, other networks, e.g., internet, or other wireless base stations.

Memory 412 includes an assembly of components 414, e.g., an assembly of software components, and data/information 416. Data/information 416 includes CBRS UE device information corresponding to a plurality of CBRS user equipment devices (UE device A information 417, . . . , UE device M information 419 where A to M are the CBRS UE devices being serviced by the wireless base station such as for example CBRS UE B1 103, . . . CBRS UE BZ), CPE device information (CPE device 1 information 420, . . . , CPE device X information 422), Wi-Fi Access Point information 423. and resource grant information 424. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example hundreds of CPE devices and thousands of user equipment devices. The CPE device information includes CPE device profile record(s), information on the uplink data transmission resource grants assigned to the CPE device, the uplink resource utilization of the CPE device, the CPE device ID and/or signature used to identify/decode communications from the CPE device. The resource grant information includes information on the uplink data transmission resource grants assigned to each CPE device and UE device supported and/or connected to the wireless base station, an indication of which resources/resource grants are being shared, the number of collisions on a shared resources, statistics on the utilization of resources by the CPE devices, the set of resource blocks included in each resource grant, the number of skipped uplink data transmission opportunities for each resource grant and each CPE device, the amount of resource blocks in a set of resource blocks utilized during each uplink data transmission, statistics on the resource blocks and/or resource grants being fully utilized and/or amount of utilization of the resource blocks and/or resource grants. In some embodiments, one or more of the wireless base stations discussed and/or shown in the Figures and/or in connection with the methods discussed herein including wireless base station 102 are implemented in accordance with the wireless base station 400.

Figure 5:
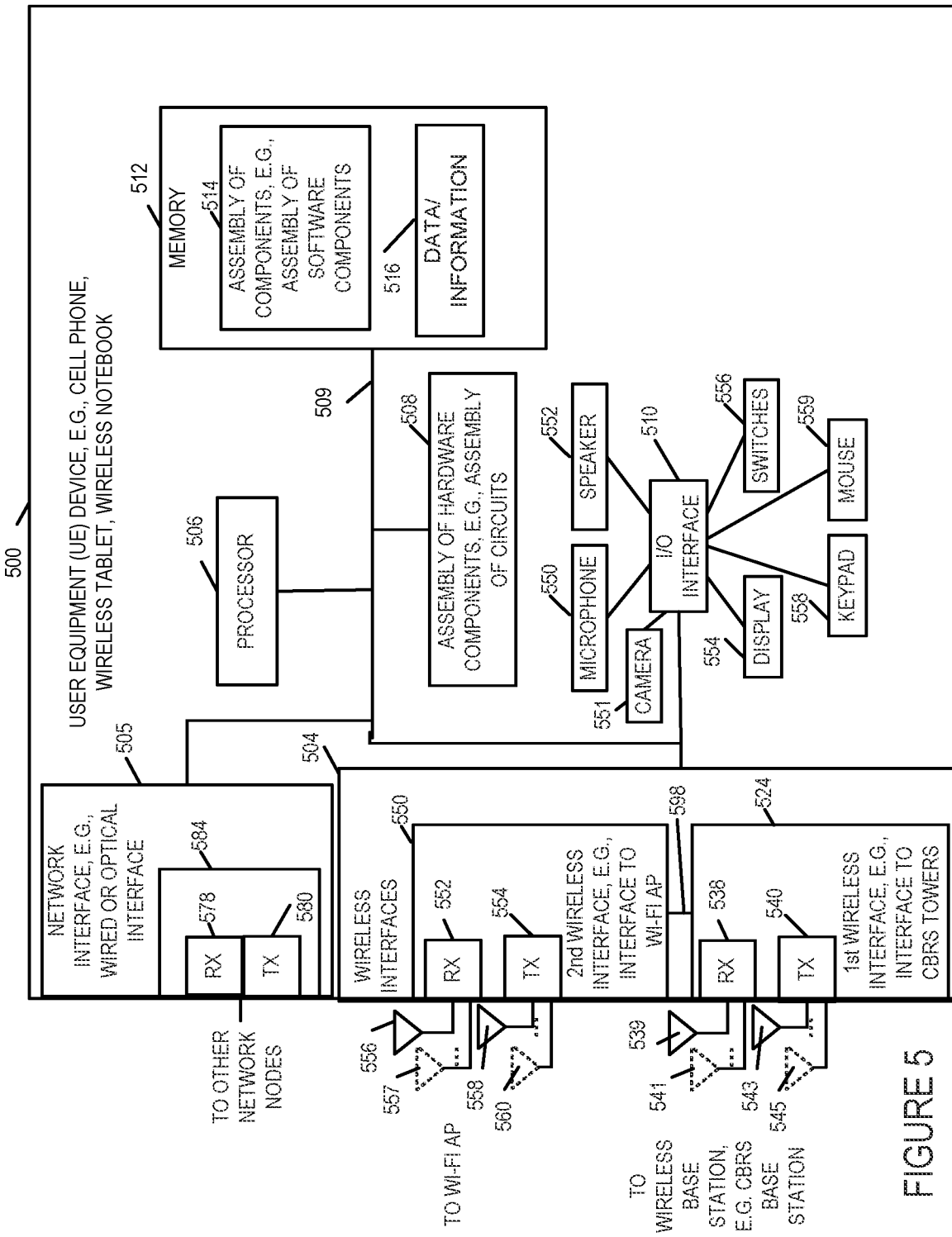
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a computer, a mobile device such as a cell phone, a smart phone, wireless tablet or wireless notebook, a smartTV, internet cable box, internet enabled device, WiFi device. UE device 500 includes WiFi device capabilities. UE device 500 in addition to having Wi-Fi device capabilities is also optionally enabled to communicate using at least one other wireless protocol, e.g., 5G wireless protocol, CBRS wireless protocol or cellular wireless protocol. The UE device 500 in some embodiments is a CBRS user equipment device operating at the 3.5 GHz band which also has Wi-Fi capabilities and can be operated to work in dual mode where it is capable of receiving packets via two different paths or two different wireless protocol connections. For example the first path or wireless protocol connection being a Wi-Fi protocol connection or channel and a second path or wireless protocol connection being via a 5G wireless protocol connection or channel, CBRS wireless protocol connection or channel or a cellular protocol connection or channel. Exemplary UE device 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584.

Wireless interfaces 504 include a plurality of wireless interfaces including first wireless interface 524 and a second wireless interface 550. The first wireless interface 524 is used to communicate with the wireless base station, e.g., CBRS tower base station. The second wireless interface is used to communicate with a Wi-Fi Access Point. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., wireless base station 102, e.g., CBRS tower base station or CBSD for example using 3.5 GHz bandwidth spectrum. Wireless transmitter 540 is coupled to a plurality of wireless transmit antennas (transmit antenna 1 543, . . . , transmit antenna N 545) via which the user equipment device 500 can transmit signals to other wireless communications devices including a second wireless communications device, e.g., wireless base station such as a CBRS tower base station. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, . . . , transmit antenna N 560) via which the user equipment device 500 can transmit signals to other wireless communications devices including a second wireless communications device. The user equipment device network interface 505 may be coupled to LAN or WAN networks or routers so that the user equipment device can also obtain services via a hardwired connection in addition to through the wireless interfaces. In the exemplary embodiment the second wireless interface is a Wi-Fi wireless interface. The first wireless interface is connected or coupled to the second wireless interface via wire 598 so that the two interfaces can exchange information.

Memory 512 includes an assembly of components 514, e.g., an assembly of software components, and data/information 516.

In some embodiments, one or more of the user equipment devices shown in the figures or discussed herein for example in connection with the methods described including for example UE devices UE 1 116, UE 2 118, UE 3 119, . . . , UE M 120, UE X1 162, . . . , UE XP 164, UE Y1 191, . . . , UE YR 192, CBRS UE B1 103, . . . , CBRS UE BZ 105 are implemented in accordance with exemplary user equipment device 500. While the UE device 500 has been illustrated as a dual mode device that has two wireless interfaces 550 and 524, the UE device 500 may, and in some embodiments, is not a dual mode device but instead is a single mode operation device with a single wireless interface either wireless interface 1 524 which is enable to communicate with a wireless base station using a first wireless protocol, e.g., a 5G protocol, 4G protocol, LTE protocol or CBRS wireless protocol, or wireless interface 2 550 which is a Wi-Fi interface which is enabled to communicate with a Wi-Fi Access Point or router. For example, CBRS UE B1 103, . . . , CBRS UE BZ 105 in some embodiments include the first wireless interface 524 through which they communicate with the wireless base station 102 and do not include the second wireless interface 550 which is a Wi-Fi wireless interface. Similarly, in many embodiments, UE devices UE 1 116, UE 2 118, UE 3 119, . . . , UE M 120, UE X1 162, . . . , UE XP 164, UE Y1 191, . . . , UE YR 192 include a single wireless interface, wireless interface 550 through which they communicate with a Wi-Fi access point or router located at the customer premises at which the UE device is located.

Figure 6:
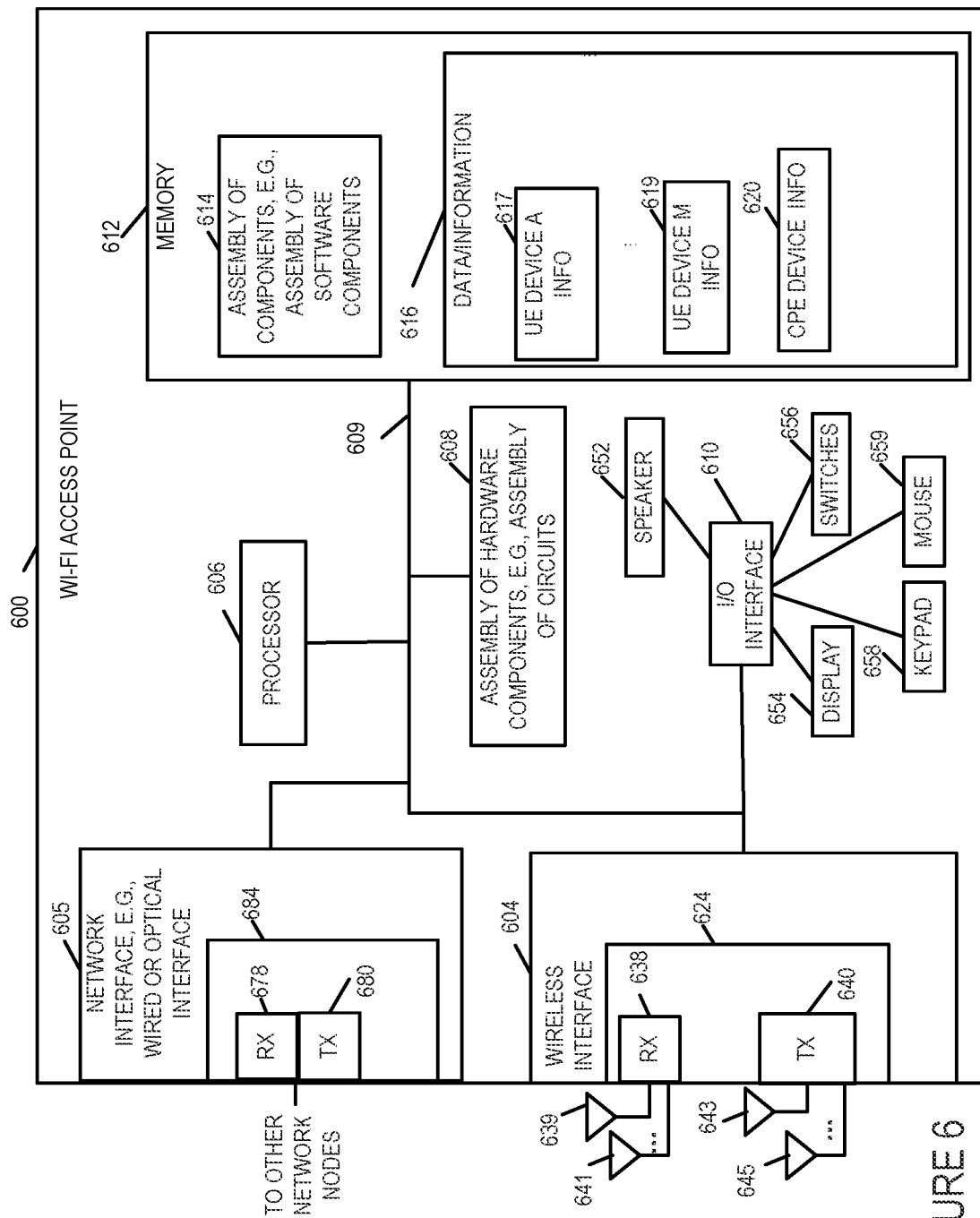
FIG. 6 illustrates details of an exemplary Wi-Fi Access Point in accordance with one embodiment of the present invention.

FIG. 6 is a drawing of an exemplary Wi-Fi Access Point 600 in accordance with an exemplary embodiment. Exemplary Wi-Fi Access Point 600 includes a wireless interface 604, e.g., a Wi-Fi interface for transmitting, receiving and processing Wi-Fi messages/packets, a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. Wi-Fi Access Point 600 further includes a speaker 652, a display 654, switches 656, keypad 658 and mouse 659 coupled to I/O interface 610, via which the various I/O devices (652, 654, 656, 658, 659) may communicate with other elements (604, 605, 606, 608, 612) of the Wi-Fi Access Point 600. Network interface 605 includes a receiver 678 and a transmitter 680. The network interface 605 is typically connected or coupled to a wired or optical communications link or network which in turn is coupled or connected to a CPE device. In some embodiments, receiver 678 and transmitter 680 are part of a transceiver 684. Wireless interface 604 includes a wireless receiver 638 and a wireless transmitter 640. In some embodiments, receiver 638 and transmitter 640 are part of a transceiver 624. In various embodiments, wireless interface 604 includes a plurality of wireless receivers and a plurality of wireless transmitters. Wireless receiver 638 is coupled to a plurality of receive antennas (receive antenna 1 639, . . . , receive antenna M 641), via which Wi-Fi Access Point 600 can receive wireless signals from other wireless communications devices including a second wireless communications device, e.g., a UE device. Wireless transmitter 640 is coupled to a plurality of wireless transmit antennas (transmit antenna 1 643, . . . , transmit antenna N 645) via which the Wi-Fi Access Point 600 can transmit signals to other wireless communications devices e.g., a UE device.

Memory 612 includes an assembly of components 614, e.g., an assembly of software components, and data/information 616. Data/information 616 includes UE device information corresponding to a plurality of user equipment devices (UE device A information 617, . . . , UE device M information 619 where A to M are the UE devices being serviced by the Wi-Fi Access Point) and CPE device information (e.g., CPE device 1 information, CPE device 1 being the CPE device to which the Wi-Fi AP is connected to) 620. The Wi-Fi Access Point includes in some embodiments multiple wireless interfaces or a wireless interface with multiple receivers and transmitters so that it can provides wireless services to a plurality of user equipment devices. In some embodiments, one or more of Wi-Fi Access Points discussed and/or shown in the Figures and/or in connection with the methods discussed herein including Wi-Fi Access Points 122, 124, . . . , 126, 155, and 160 are implemented in accordance with the Wi-Fi Access Point 600.

Figure 7:
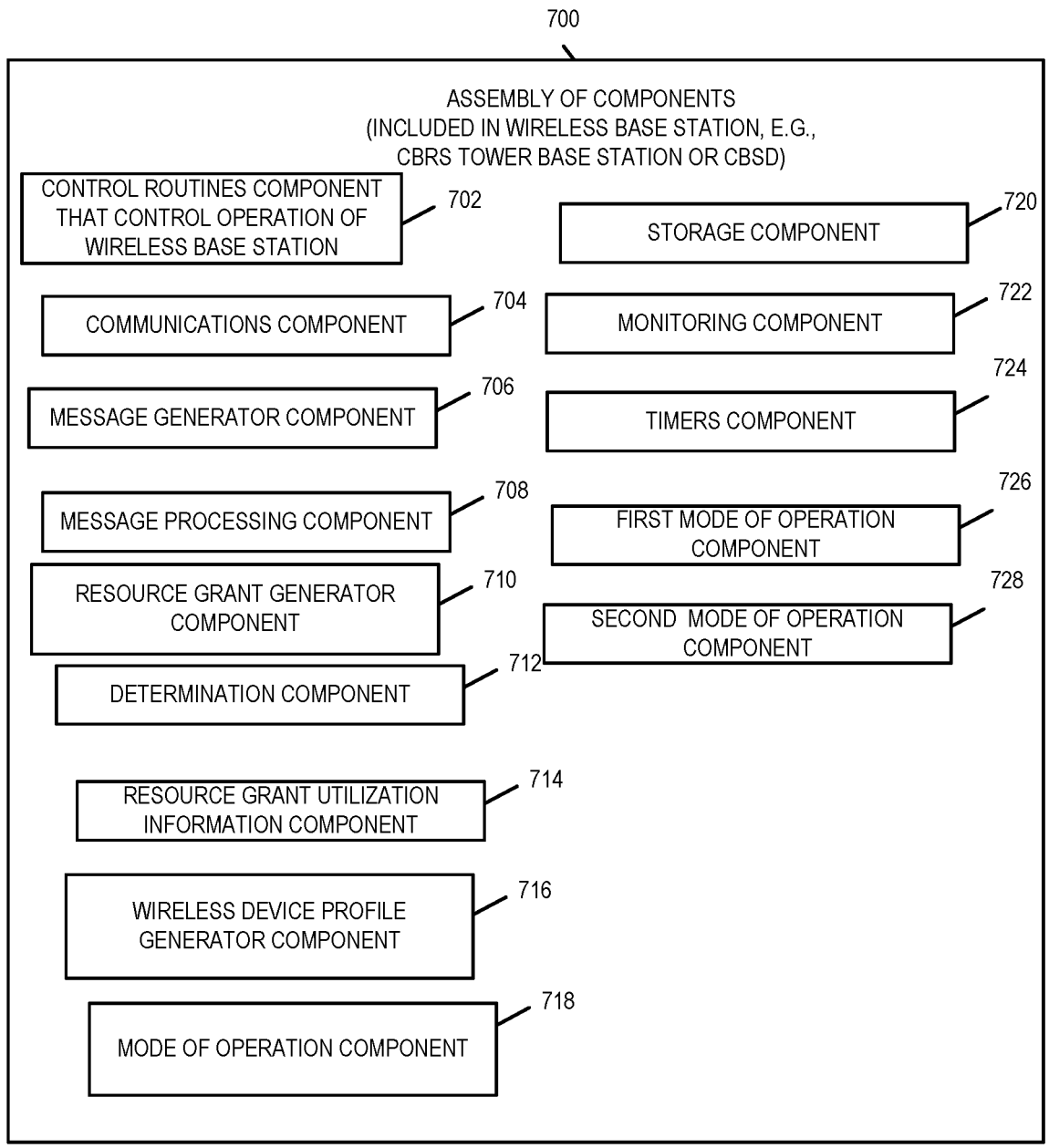
FIG. 7 illustrates an exemplary assembly of components for a wireless base station, e.g., CBRS tower base station or CBSD, in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a resource grant generator component 710, a determination component 712, an resource grant utilization component 714, a wireless device profile generator component 716, a mode of operation component 718, a storage component 720, a monitoring component 722, a timers component 724, a CPE device grouping or set assignment component 726.

The control routines component 702 is configured to control operation of the wireless base station. The communications component 704 is configured to handle communications, e.g., transmission and reception of messages, sending of ACK and NACK messages, and protocol signaling for the wireless base station. The message generator component 706 is configured to generate messages for transmission to other devices. The message processing component 708 is configured to process received messages and is sometimes a sub-component of communications component 704.

The determination component 712 makes various determinations for the wireless base station including for example, determining uplink resource grant schedules, uplink data transmission resource grant schedules for CPE devices and CBRS UE devices, determining which resource blocks are to be included in which uplink resource grants, determining statistics based on historically measured or monitored utilization of resources, determining resource utilization information (e.g., uplink data transmission resource utilization per wireless device, determining which CPE device transmitted the data received on resource blocks of an uplink resource grant generated by a wireless device, location of the customer premises equipment device, customer premises equipment device software type, version, and/or release, customer premises equipment device hardware type, version, and/or release, whether a reduction in the wireless base station's transmission power level will result in the downlink control channel coverage area of the wireless base station being less than the uplink control channel coverage area of the wireless base station, determining whether a reduction in the transmission power level of the wireless base station will result in the transmission power level of the wireless base station being less than a first threshold, determining whether an increase in the transmission power level will result in the transmission power level of the wireless base station being greater than or equal to first threshold, determining if resource blocks identified as corresponding to an uplink resource grant schedule communicated to the wireless base station from a wireless device is allocated to a different device than the one which communicated the uplink resource grant schedule information; determining if uplink data transmission received by the wireless base station in uplink resource blocks should be responded to with an ACK message or a NACK message, determining whether the wireless base station should switch from operating in a first mode of operation to operating in a second mode of operation, determining whether the wireless base station should switch from operating in a second mode of operation to operating in a first mode of operation, determining if the uplink control channel coverage area of the wireless base station is greater than, equal to, or less than the downlink control channel coverage area of the wireless base station.

The resource grant generator component 710 is configured to generate resource grants, e.g., pro-active uplink data transmission resource grants for wireless devices, e.g., CPE devices and CBRS UE devices.

The resource utilization component 714 determines the utilization of the uplink resources by wireless devices.

The wireless device equipment profile generator component 716 generates wireless device profiles for example based on a wireless device's characteristics, attributes and/or properties including monitored activity such as uplink resource grant utilization.

The mode of operation component 718 makes decisions on whether the wireless base station should operate in the first mode of operation or the second mode of operation based on current conditions, e.g., whether the wireless base station will be able to communicate uplink resource grant schedule information to all the wireless device connected to the wireless base station after performing a transmission power level increase or reduction operation.

The storage component 720 controls the storage and retrieval of information and data in the memory of the wireless base station.

The monitoring component 722 monitors wireless base station activities, customer premises equipment device activities, and user equipment device activities. The monitoring of wireless base station activities includes monitoring the uplink data transmission resource grant utilization over a period of time and monitoring for transmission power level messages/commands from the resource management system managing the wireless base station.

The timers component 724 measures and tracks periods of time such as a first period of time and a second period of time.

The first mode of operation component 726 controls the wireless base station to perform the operations and/or steps described as being performed by the wireless base station when operating in the first mode of operation in the various embodiments described herein.

The second mode of operation component 726 controls the wireless base station to perform the operations and/or steps described as being performed by the wireless base station when operating in the second mode of operation in the various embodiments described herein.

Figure 8:
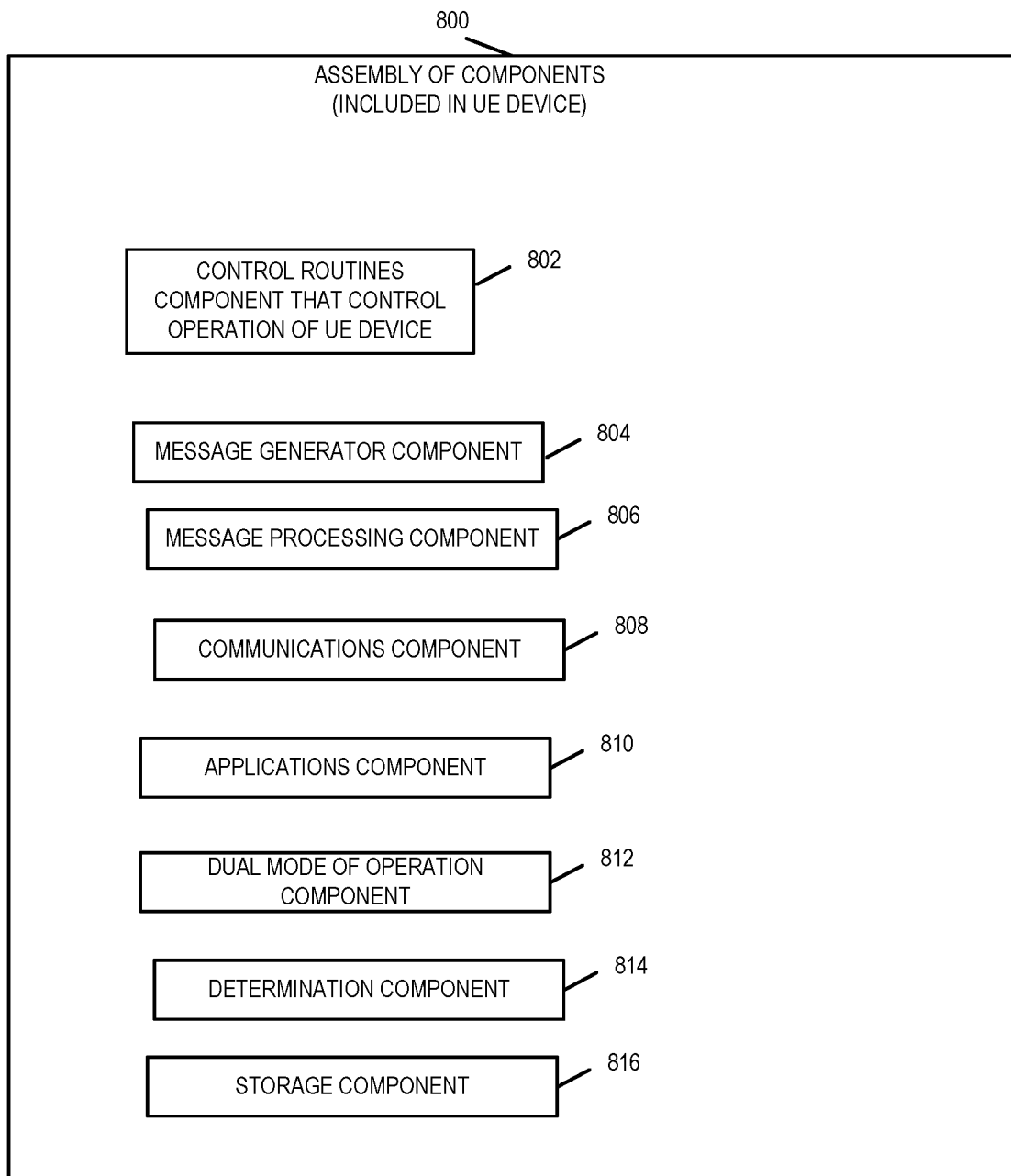
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a message processing component 806, a communications component 808, an applications component 810, an optional dual mode of operation component 812, a determination component 814, a storage component 816.

The control routines component 802 is configured to control operation of the UE. The message generator component 804 is configured to generate messages for transmission to various devices including for example a Wi-Fi Access Point when the UE device is a Wi-Fi device and wireless base station (e.g., CBSD) when the device is a CBRS UE device. In some embodiments in which the UE is a dual mode of operation device it is also configured to generate messages for transmission to both wireless base stations using a first protocol (e.g., CBRS wireless protocol, 4G wireless protocol or 5G wireless protocol and to a Wi-Fi access point using a second wireless protocol, i.e., a Wi-Fi wireless protocol. The message processing component 806 is configured to process messages received from other devices, e.g., a wireless base station or a Wi-Fi Access Point. In some embodiments, the message processing component 806 is a sub-component of the communications component 808. The communications component 808 is configured to handle communications, e.g., receipt and transmission of signals and provide protocol signal processing for one or more protocols for the UE. The applications component 810 is configured to provide various application services for the UE device, e.g., voice over internet protocol calling services, video on demand services, media download services, conferencing services, internet access and web browsing services, etc. The dual mode of operation component 812 is an optional component which is present in dual mode operation devices that operate using two different wireless protocols. The dual mode of operation component 812 is configured to establish different transmission paths for receiving data packets using different wireless protocols (e.g., CBRS or 5G wireless protocol and Wi-Fi protocol) depending on the selection of the mode of operation e.g., The determination component 814 is responsible for making determinations at the user equipment device including for example the selection of the mode of operation (e.g., CBRS or 5G wireless protocol and Wi-Fi protocol). The storage component 816 controls the storage and retrieval of information and data in the memory of user equipment device.

Figure 9:
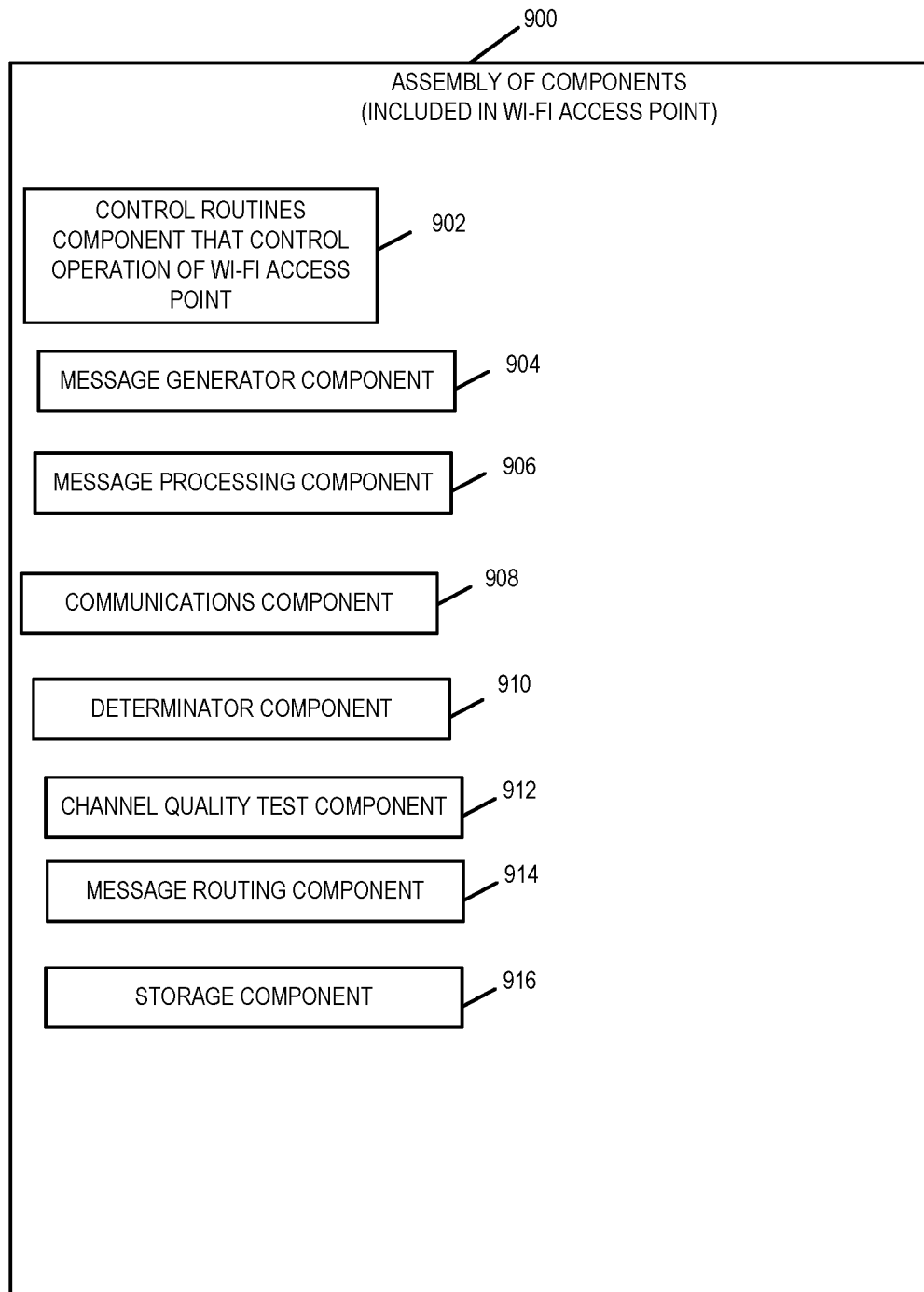
FIG. 9 illustrates an exemplary assembly of components for a Wi-Fi Access Point in accordance with an embodiment of the present invention.

FIG. 9 is a drawing of an exemplary assembly of components 900 which may be included in an exemplary Wi-Fi Access Point, e.g., exemplary Wi-Fi Access Point 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the Wi-Fi Access Point 600, with the components controlling operation of Wi-Fi Access Point 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the Wi-Fi Access Point 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, a message processing component 906, a communications component 908, a determinator component 910, channel quality test component 912, a message routing component 914 and a storage component 916.

The control routines component 902 is configured to control operation of the Wi-Fi Access Point. The message generator component 904 is configured to generate messages for transmission to a CPE device and user equipment devices. The message processing component 906 processes received messages and takes actions based on the processed messages. The communications component 908 is configured to handle communications between the Wi-Fi Access Point and other devices, e.g., CPE device and user equipment devices. The determinator component 910 makes determinations for the Wi-Fi Access Point including which UE devices are to be provided services and which are not. The channel quality test component 912 performs communications channel, e.g., Wi-Fi channels/connections, quality and signaling condition tests. The message routing component 914 routes messages received at the Wi-Fi Access Point toward their intended destinations. The storage component 916 is responsible for the storage and retrieval of data and information in the memory of the Wi-Fi Access Point.

Figure 10:
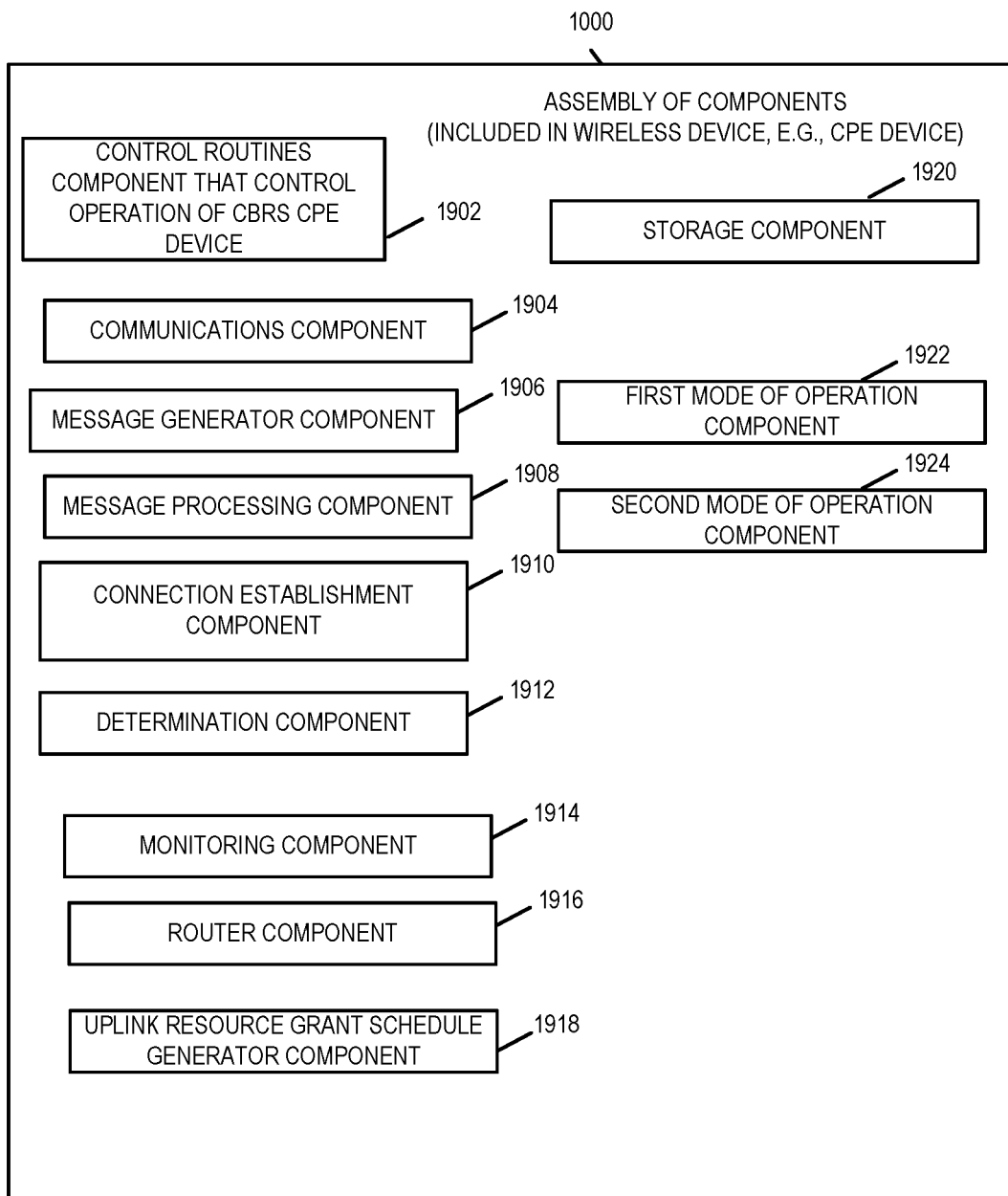
FIG. 10 illustrates an exemplary assembly of components for a wireless device, e.g., a customer premises equipment (CPE) device, e.g., CBRS CPE device, in accordance with an embodiment of the present invention.

FIG. 10 is a drawing of an exemplary assembly of components 1000 which may be included in an exemplary wireless device, e.g., CPE device, e.g., exemplary CPE device 300 of FIG. 3, a CBRS or 5G UE device, e.g., CBRS UE B1 103, in accordance with an exemplary embodiment. The specific components which will be implemented is based on the wireless device implemented and not all devices need to include all components described. For explanatory purposes the components will be described in the context of their usage in a CPE device. The components in the assembly of components 1000 can, and in some embodiments are, implemented fully in hardware within a processor, e.g., processor 306, e.g., as individual circuits. The components in the assembly of components 1000 can, and in some embodiments are, implemented fully in hardware within the assembly of hardware components 308, e.g., as individual circuits corresponding to the different components. In other embodiments some of the components are implemented, e.g., as circuits, within processor 306 with other components being implemented, e.g., as circuits within assembly of components 308, external to and coupled to the processor 306. As should be appreciated the level of integration of components on the processor and/or with some components being external to the processor may be one of design choice. Alternatively, rather than being implemented as circuits, all or some of the components may be implemented in software and stored in the memory 312 of the CPE device 300, with the components controlling operation of CPE device 300 to implement the functions corresponding to the components when the components are executed by a processor e.g., processor 306. In some such embodiments, the assembly of components 1000 is included in the memory 312 as assembly of software components 314. In still other embodiments, various components in assembly of components 1000 are implemented as a combination of hardware and software, e.g., with another circuit external to the processor providing input to the processor which then under software control operates to perform a portion of a component's function.

When implemented in software the components include code, which when executed by a processor, e.g., processor 306, configure the processor to implement the function corresponding to the component. In embodiments where the assembly of components 1000 is stored in the memory 312, the memory 312 is a computer program product comprising a computer readable medium comprising code, e.g., individual code for each component, for causing at least one computer, e.g., processor 306, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 10 control and/or configure the CPE device 300 or elements therein such as the processor 306, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method.

Assembly of components 1000 includes a control routines component 1902, a communications component 1904, message generator component 1906, a message processing component 1908, a connection establishment component 1910, a determination component 1912, a monitoring component 1914, a router component 1916, a random uplink transmission component 1918, and a storage component 1920.

The control routines component 1902 controls the operation of the CPE device. The communications component 1904 performs operations for handling communications with other devices including generation, transmission, receiving, and processing messages, establishing connections, signal processing for different communications protocols. The message generator component 1906 generates messages and signals, e.g., messages/signals to be sent to the Wi-Fi access points, UE devices, wireless base station including access request signals/message, and response/acknowledgement messages. In some embodiments, the message generator component 1906 is a sub-component of communications component 1904. The message processing component 1908 processes received messages and performs operations in response to received messages.

The connection establishment component 1910 handles establishment and termination of communications connections, e.g., device to device communications connections between the wireless base station and the CPE device and the CPE device and the Wi-Fi Access Points. In some embodiments, the connection establishment component 1910 is a sub-component of communications component 1904.

The determination component 1912 makes various determinations for the CPE device including whether the CPE device has any data to transmit in an uplink data transmission opportunity, whether to transmit using an uplink data transmission opportunity or not, whether to generate a new and different uplink resource grant schedule in response to ACK and NACK messages, determining statistics for determining which resource blocks to include when generating an uplink resource grant to minimize collisions or including resource blocks already being used by another wireless device, determining whether to operate in a first mode of operation or a second mode of operation.

The monitoring component 1914 monitors for various conditions e.g., conditions indicative of a collision with another CPE device in an uplink data transmission attempt such as the receipt of a NACK in response to uplink transmission or indicative that the uplink resource grant schedule communicated to the wireless base station is allocated to different wireless device, condition indicative of a successful uplink data transmission such as a ACK message in response to an uplink transmission. A condition indicating that the wireless device is to switch from operating in a first mode of operation to a second mode of operation. A condition indicative of whether resource blocks of the generated and communicated uplink resource grant schedule has been allocated, reserved or blocked for the wireless device or is being used by a different device. The router component 1916 routes received messages to destination devices or to the next hop on the path to the destination. The uplink resource grant schedule generator component 1918 determines an uplink grant schedule to utilize for transmitting uplink data, i.e., the component determines a set of resource blocks to use for sending uplink data to the wireless base station on recurring basis at a specified time interval. In some embodiments, the uplink resource grant schedule generator determines which resource blocks to use for the uplink grant based on monitoring of signals in uplink resource blocks indicating which resource blocks are or most likely are being used by another wireless device. The storage component 1920 is responsible for the management of the storage and retrieval of data and information in the memory of the CPE device. The first mode of operation component 1922 controls the wireless device to operate in a first mode of operation. Operating in a first mode of operation includes not managing its own uplink resource grant schedule but instead receiving it from the wireless base station to which it is connecting. Operating in the first mode of operation also includes monitoring for a message from the wireless base station indicating that the wireless device is to take over management of its uplink resource grant schedule. Upon receiving such a message the wireless device implements a switch from operating in the first mode of operation to operating in a second mode of operation. The second mode of operation component 1924 controls the wireless device to operate in a second mode of operation. Operating in a second mode of operation includes managing the uplink resource grant schedule for the wireless device which includes generating the uplink resource grant schedule for the wireless device and communicating it to the wireless base as well as generating a new and different uplink resource grant schedule when NACKs are received in response to transmitting uplink data using the uplink resource grant schedule communicated to the wireless base station. Operating in the second mode of operation also includes monitoring for a message from the wireless base station including a new uplink resource grant schedule or an indication that the wireless base station is re-taking responsibility for the managing the uplink resource grant schedule of the wireless device. And upon receipt of such a message switching from operating in the second mode of operation to operating in the first mode of operation.

Figure 2A:
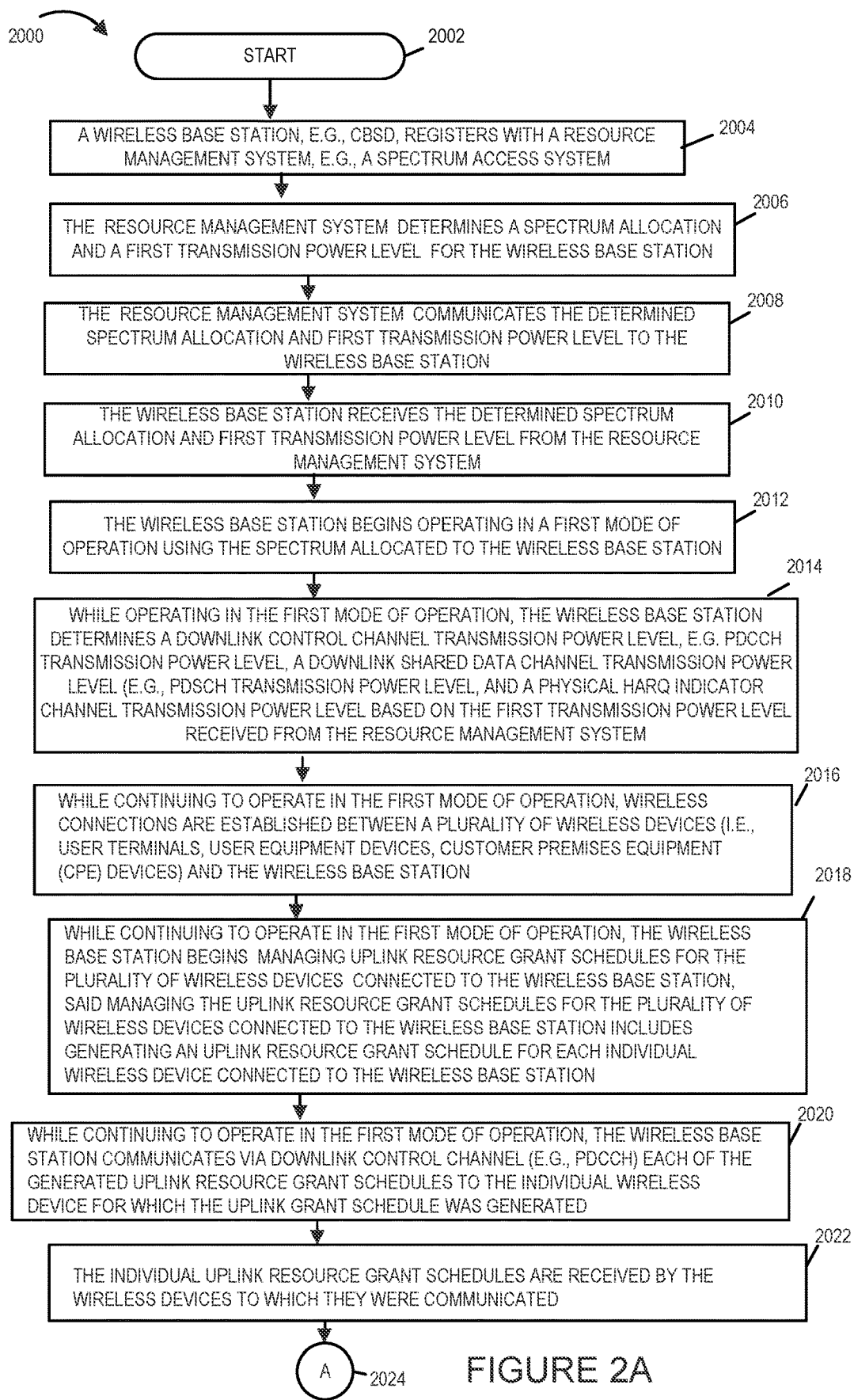
FIG. 2A illustrates the steps of the first part of an exemplary method in accordance with one embodiment of the present invention.
Figure 2C:
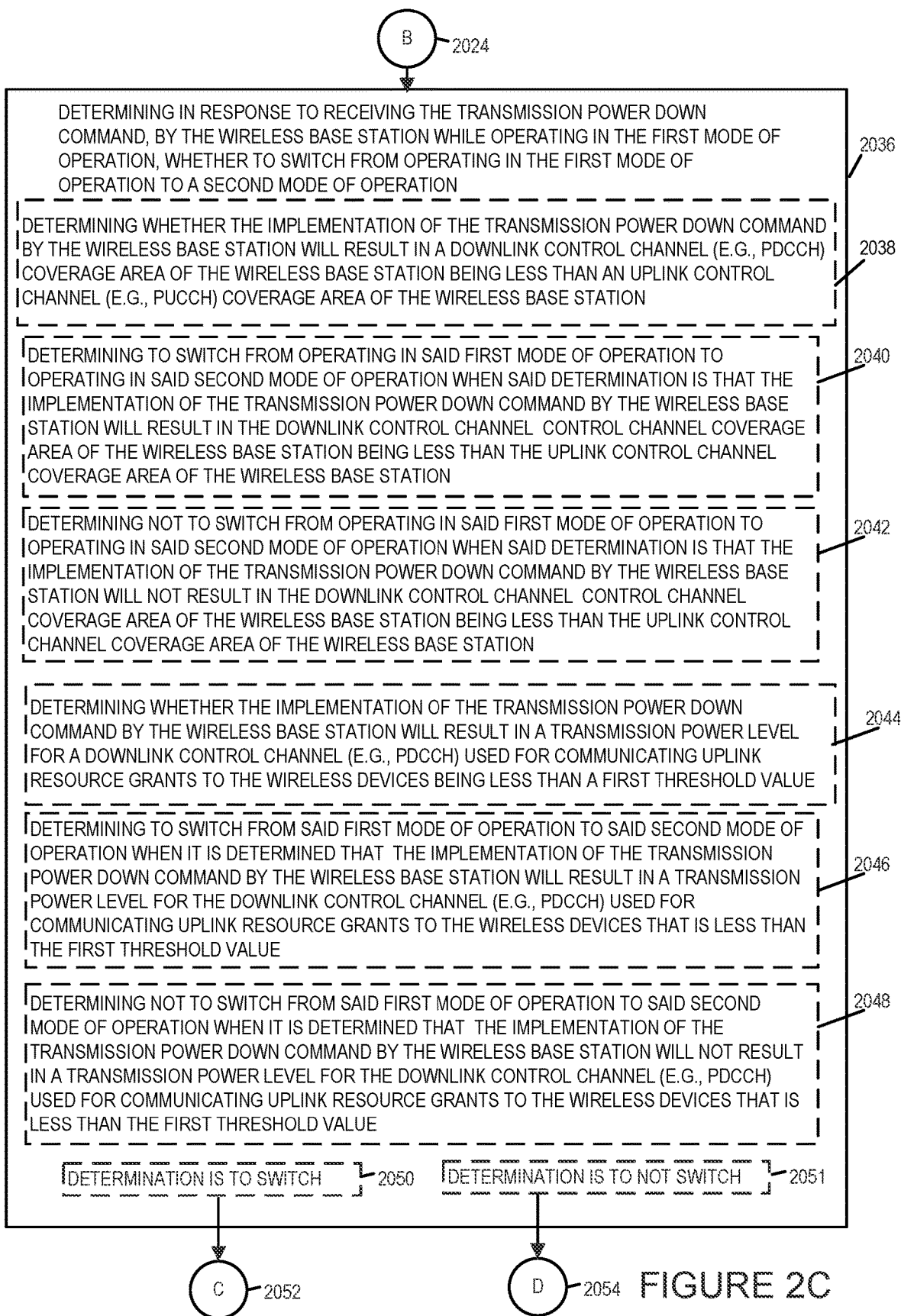
FIG. 2C illustrates the steps of the third part of an exemplary method in accordance with one embodiment of the present invention.
Figure 2D:
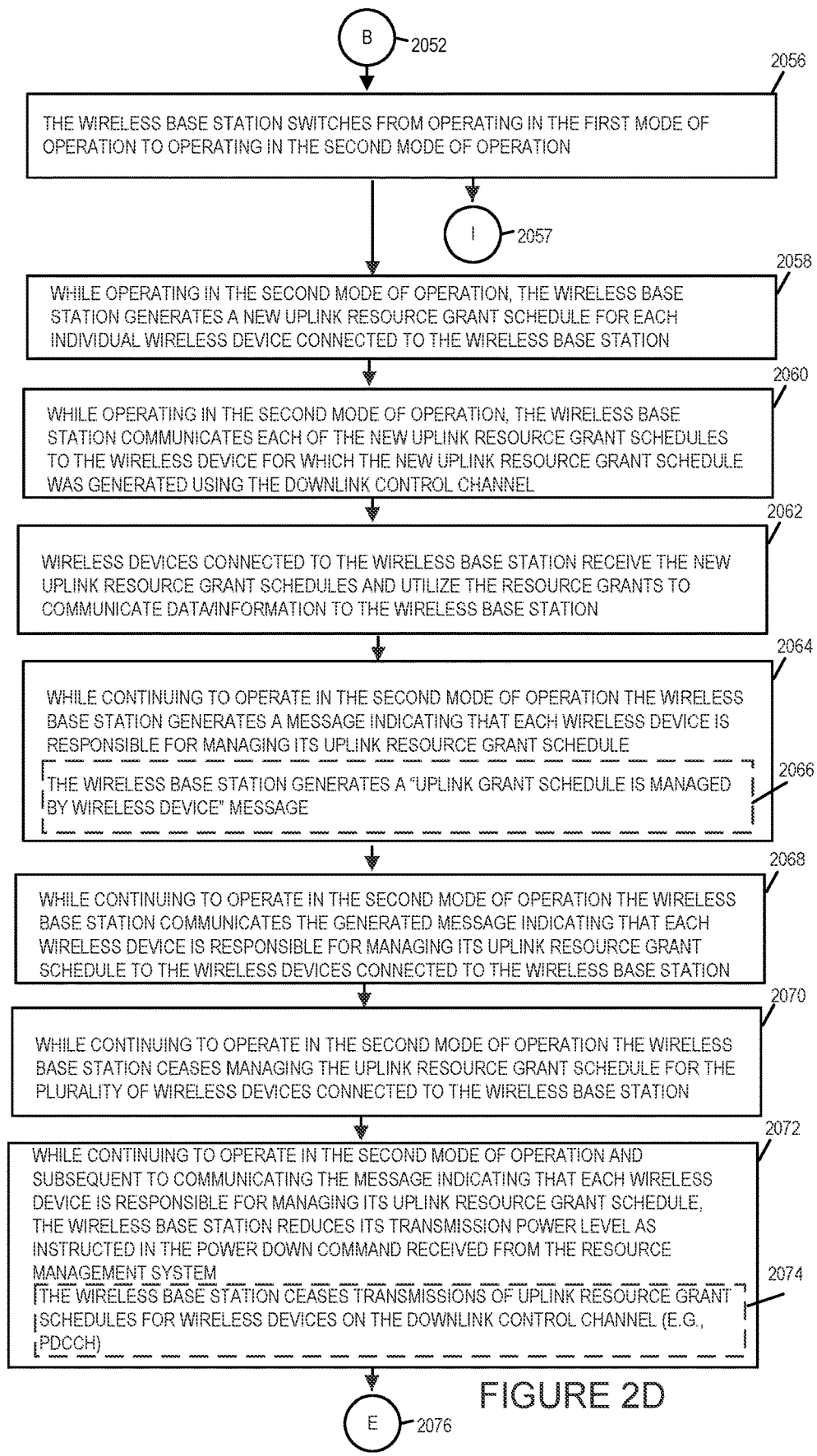
FIG. 2D illustrates the steps of the fourth part of an exemplary method in accordance with one embodiment of the present invention.
Figure 2E:
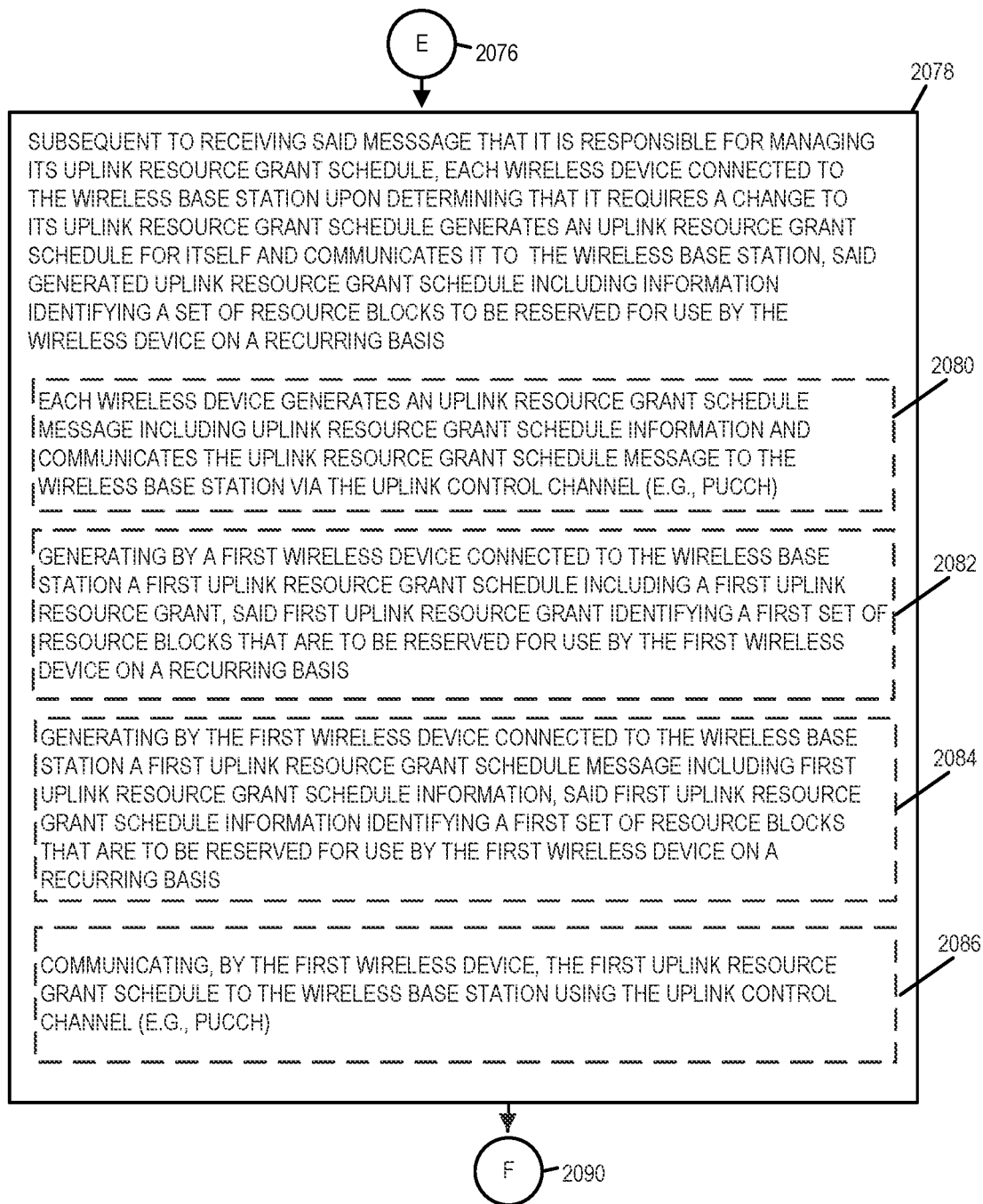
FIG. 2E illustrates the steps of the fifth part of an exemplary method in accordance with one embodiment of the present invention.
Figure 2G:
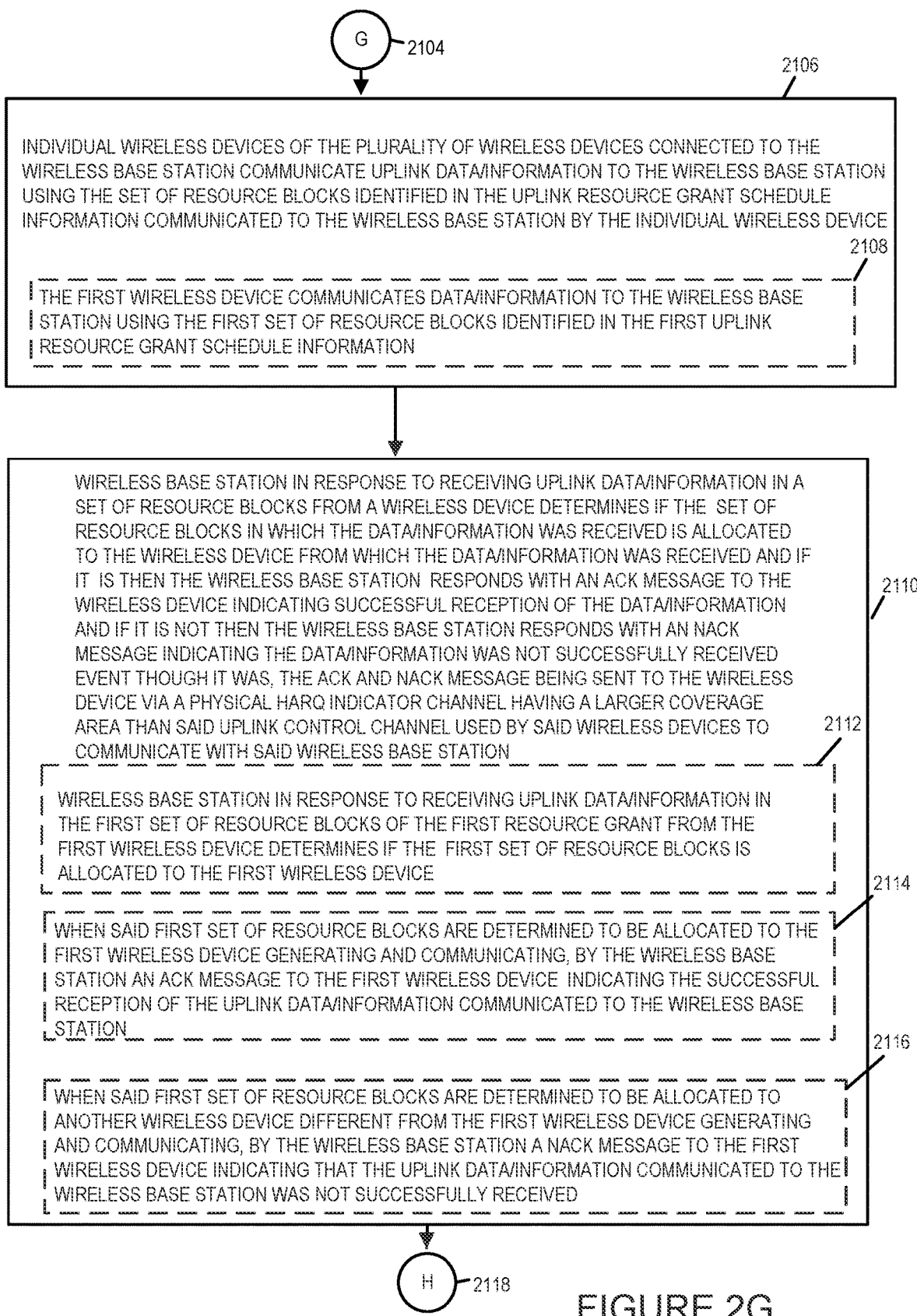
FIG. 2G illustrates the steps of the seventh part of an exemplary method in accordance with one embodiment of the present invention.
Figure 2I:
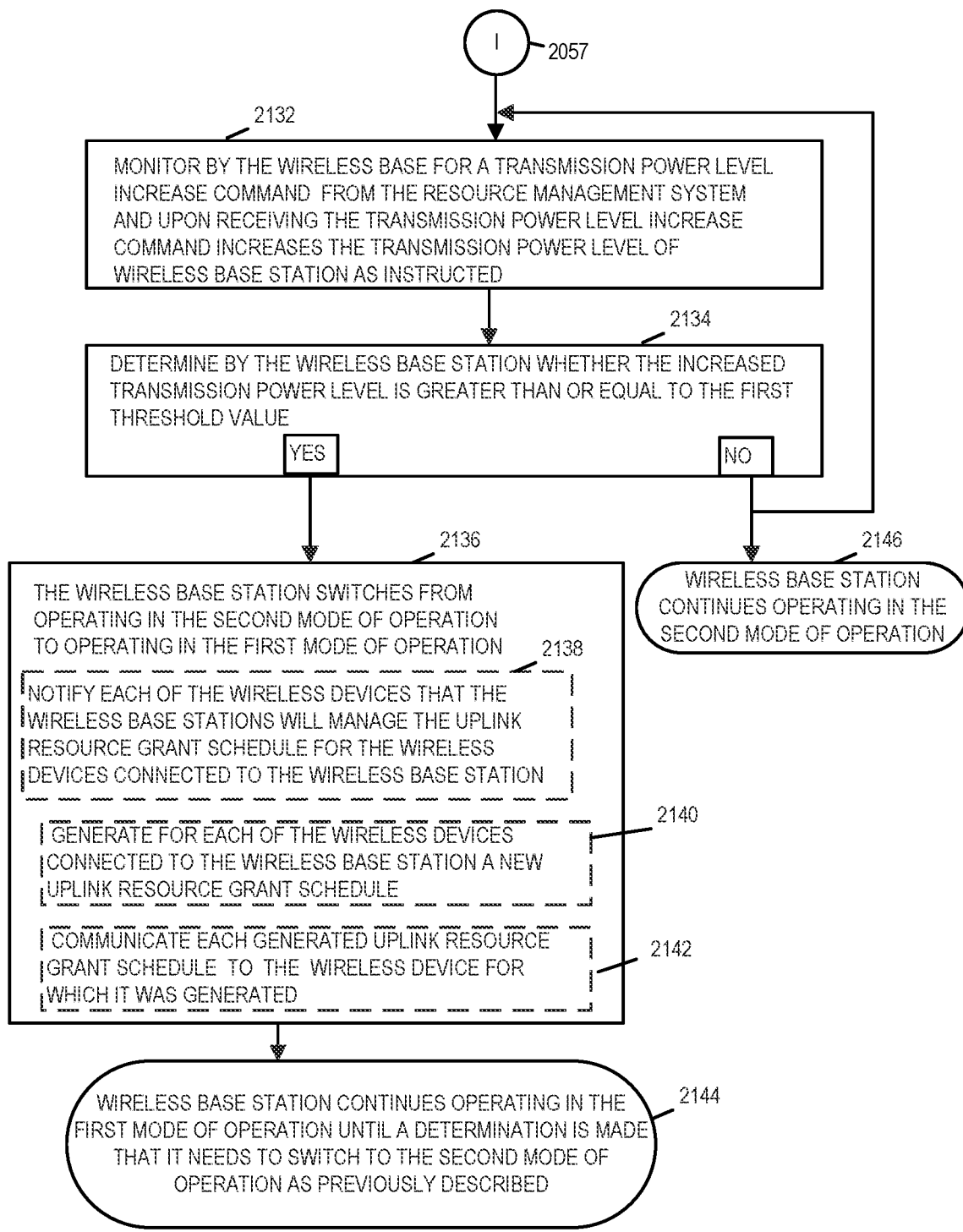
FIG. 2I illustrates the steps of the ninth part of an exemplary method in accordance with one embodiments of the present invention.

FIG. 2, which comprises the combination of FIGS. 2A, 2B, 2C, 2D, 2E, 2F, 2G, 2H, and 2I illustrates an exemplary method 2000. FIG. 2A illustrates the steps of the first part of an exemplary method 2000 in accordance with one embodiment of the present invention. FIG. 2B illustrates the steps of the second part of an exemplary method 2000 in accordance with one embodiment of the present invention. FIG. 2C illustrates the steps of the third part of an exemplary method 2000 in accordance with one embodiment of the present invention. FIG. 2D illustrates the steps of the fourth part of an exemplary method 2000 in accordance with one embodiment of the present invention. FIG. 2E illustrates the steps of the fifth part of an exemplary method 2000 in accordance with one embodiment of the present invention. FIG. 2F illustrates the steps of the sixth part of an exemplary method 2000 in accordance with one embodiment of the present invention. FIG. 2G illustrates the steps of the seventh part of an exemplary method 2000 in accordance with one embodiment of the present invention. FIG. 2H illustrates the steps of the eighth part of an exemplary method 2000 in accordance with one embodiment of the present invention. FIG. 2I illustrates the steps of the eighth part of an exemplary method 2000 in accordance with one embodiment of the present invention.

For explanatory purposes the exemplary method 2000 will be explained in connection with the exemplary communications system 100 illustrated in FIG. 1 although it should be understand that the method may be implemented using other systems and other system configurations then those illustrated in FIG. 1. While it will be readily understood that additional steps and signaling are performed in connection with communicating information, messages, and packets between devices, the method 2000 focuses on and discusses the steps and signaling for understanding the invention.

The method 2000 shown in FIG. 2 will now be discussed in detail. The method starts in start step 2002 shown on FIG. 2A with the devices in system 100 being initialized and becoming operational. Operation proceeds from step 2002 to step 2004.

In step 2004, a wireless base station, e.g., CBSD 1 102 of system 100, registers with a resource management system, e.g., spectrum access system 1 (SAS 1) 110. Operation proceeds from step 2004 to step 2006.

In step 2006, the resource management system determines a spectrum allocation and a first transmission power level for the wireless base station to use for communicating with devices in a first wireless protocol format, e.g., a 5G wireless protocol format, CBRS wireless protocol packet format, or a cellular wireless protocol format. For example, the spectrum allocated may be, and in some embodiments is, frequency spectrum in 3.5 GHz bandwidth. Operation proceeds from step 2006 to step 2008.

In step 2008, the resource management system communicates the determined spectrum allocation and the first transmission power level to the wireless base station. Operation proceeds from step 2008 to step 2010.

In step 2010, the wireless base station receives the determined spectrum allocation and first transmission power level from the resource management system. Operation proceeds from step 2010 to step 2012.

In step 2012, the wireless base station being operating in a first mode of operation using the spectrum allocated to the wireless base station. Operation proceeds from step 2012 to step 2014.

In step 2014, while operating in the first mode of operation, the wireless base station determines a downlink control channel transmission power level, e.g., Physical Downlink Control Channel (PDCCH) transmission power level, a downlink shared data channel transmission power level, e.g., Physical Downlink Shared Channel (PDSCH) transmission power level, and a Physical HARQ Indicator Channel transmission power level, based on the first transmission power level received from the resource management system. Operation proceeds from step 2014 to step 2016.

In step 2016, while the wireless base station continues to operate in the first mode of operation, wireless connections are established between a plurality of wireless devices, e.g., user terminals, customer premises equipment devices (CPE) devices, and user equipment devices and the wireless base station, e.g., CPE device 1 112, CPE device 2 152, . . . , CPE device X 158, CBRS UE B1 103, . . . , CBRS UE BZ 105 establish wireless connections with wireless base station 102 in system 100. Operation proceeds from step 2016 to step 2018.

In step 2018, while still operating in the first mode of operation, the wireless base station begins managing uplink resource grant schedules for the plurality of wireless devices connected to the wireless base station. The managing of the uplink resource grant schedules for the plurality of wireless devices connected to the wireless base includes generating an uplink resource grant schedule for each individual wireless device connected to the wireless base station. In some embodiments, each uplink resource grant schedule includes an uplink resource grant giving a wireless device the right to use a set of resource blocks, e.g., logical or physical resource blocks, on a recurring basis for transmitting uplink data/information to the wireless base station. In some embodiments, the uplink resource grant schedules include semi-permanent grants or pro-active grants which grant the recipient device the right to use the resources granted until a new or revised uplink resource grant is received by the recipient device. In some embodiments, the uplink resource grants are proactive uplink data transmission resource grants that are proactive grants that are fixed and which the wireless device is expected to use for transmitting its own uplink data at the time intervals specified by the grant using the resource blocks assigned or allocated to the wireless device. Operation proceeds from step 2018 to step 2020.

In step 2020, while continuing to operate in the first mode of operation, the wireless base station communicates via the downlink control channel (e.g., PDCCH) each of the generated uplink resource grant schedules to the individual wireless device for which the uplink resource grant schedule was generated. Operation proceeds from step 2020 to step 2022.

In step 2022, the individual uplink resource grant schedules are received by the wireless devices to which they were communicated by the wireless base station. Operation proceeds from step 2022 via connection node A 2024 to step 2036 shown on FIG. 2B.

In step 2026, the wireless devices utilize the uplink resource grant schedules to communicate data/information to the wireless base station. The uplink resources identified by the uplink resource grant schedules are a set of resource blocks in an uplink data channel (e.g., Physical Uplink Shared Channel) used by the wireless devices connected to the wireless base station for communicating data to the wireless base station from wireless devices. Operation proceeds from step 2026 to step 2028.

In step 2028, the resource management system, e.g., SAS 1 110, detects that the wireless base station is creating interference in the wireless network. For example, interference that is negatively impacting cells and communications between the wireless base stations and wireless devices in those cells. Operation proceeds from step 2028 to step 2030.

In step 2030, the resource management system communicates a power down command to the wireless base station. The power down command instructs the wireless base station to reduce its transmission power level to a second transmission power level. This is done by the resource management system to reduce the interference detected by the resource management system. Operation proceeds from step 2030 to step 2032.

In step 2032, while the wireless base station is operating in the first mode of operation, the wireless base station receives the power down command from the resource management system. Operation proceeds from step 2032 via connection node B 2034 to step 2036 shown on FIG. 2C.

In step 2036, while the wireless base station is still operating in the first mode operation, the wireless base station in response to receiving the transmission power down command, determines whether to switch from operating in the first mode of operation to a second mode of operation. In some embodiments, step 2036 includes one or more of the sub-steps 2038, 2040, 2042, 2044, 2046, 2048, 2049, 2050, and 2051.

In sub-step 2038, the wireless base station determines whether the implementation of the transmission power down command will result in a downlink control channel (e.g., PDCCH) coverage area of the wireless base station being less than an uplink control channel (e.g., PUCCH) coverage area of the wireless station. Diagram 1300 of FIG. 13 illustrates an example in which the HARQ Indicator Channel coverage area illustrated by circle 1306 (area within circle 1306) is greater than the Physical Downlink Control Channel (PDCCH) coverage area which is illustrated by the circle 1304 (area within circle 1304) which in turn is greater than the uplink control channel coverage area illustrated by circle 1302 (area within circle 1302) for the wireless base station 102. This is the typical scenario in which the CPE devices 1 112, CPE device 2, . . . , CPE device X 158 and UE B1 103, . . . , UE BZ 105 are able to receive downlink control messages, e.g., uplink resource grant schedule messages, whenever they connect to the wireless base station as the limiting factor is the uplink coverage area. It should be noted that CPE 1 and CPE 2 are illustrated as being on the edge but included within the uplink channel coverage area, e.g., PUCCH coverage area. If a wireless device is outside the uplink coverage area it will not be able communicate to the wireless base station and therefore will not be able to connect to the wireless base station. In diagram 1300 it should also be noted that the HARQ indicator channel coverage area 1306 has the greatest coverage area or range and all wireless devices connected to the wireless base station are within the HARQ indicator channel coverage area.

In sub-step 2040, the wireless base station determines to switch from operating in said first mode of operation to operating in said second mode of operation when said determination is that the implementation of the transmission power down command by the wireless base station will result in the downlink control channel coverage area of the wireless base station being less than the uplink control channel coverage area of the wireless base station.

In sub-step 2042, the wireless base station determines not to switch from operating in said first mode of operation to operating in the second mode of operation when said determination is that the implementation of the transmission power down command by the wireless base station will not result in the downlink control channel coverage area of the wireless base station being less than the uplink control channel coverage area of the wireless base station.

In sub-step 2044, the wireless base station determines whether the implementation of the transmission power down command will result in a transmission power level for a downlink control channel (e.g., PDCCH) being less than a first threshold, wherein the downlink control channel is used for communicating uplink resource grant schedule information, e.g., uplink resource grants and schedules, to the wireless devices connected to the wireless base station.

In sub-step 2046, the wireless base station determines to switch from said first mode of operation to said second mode of operation when it is determined that the implementation of the transmission power down command will result in a transmission power level for the downlink control channel (e.g., PDCCH) that is less than the first threshold value.

In sub-step 2048, the wireless base station determines not switch from operating in said first mode of operation to said second mode of operation when it is determined that the implementation of the transmission power down command will not result in a transmission power level for the downlink control channel (e.g., PDCCH) that is less than the first threshold value.

When the determination in step 2036 is to switch from operating in the first mode of operation to operating in the second mode of operation as shown in sub-step 2050, operation proceeds from step 2036 via connection node C 2052 to step 2056 shown on FIG. 2D.

When the determination in step 2036 is not to switch from operating in the first mode of operation to the operating in the second mode of operation as shown in sub-step 2051, operation proceeds from step 2036 via connection node D 2054 to step 2055 shown on FIG. 2B.

In step 2055 the wireless base station continues to operate in the first mode of operation and continues to manage the uplink resource grant schedules for the wireless devices connected to the wireless base station using the downlink control channel (e.g., PDCCH) to communicate uplink resource grant schedules to the wireless devices. Operation proceeds from step 2055 via connection node A to step 2026 where the steps of the method continue to be implemented as previously described.

Returning to step 2056 shown on FIG. 2D, in this step the wireless base station switches from operating in the first mode of operation to operating in the second mode of operation. Operation proceeds from step 2056 in parallel to steps 2058 and via connection node I 2057 to step 2132 shown on FIG. 2I.

In step 2058, while operating in the second mode of operation, the wireless base station generates a new uplink resource grant schedule for each individual wireless device connected to the wireless base station. In some embodiments, each new uplink resource grant schedule includes at least one uplink resource grant so that each wireless device connected to the wireless base station can communicate data to the wireless base station. In some embodiments, the uplink resource grant schedule allocated uplink resources based on the past historical usage and/or wireless device type and/or version. For example, wireless devices which have historically used more uplink resources are granted more uplink resources than the wireless devices that have historically used less uplink resources. In some embodiments, a wireless device which is CPE device type is granted more uplink resources than a wireless device which is a user device type. In such instances for example, the CPE device is typically providing services for a plurality of users while the user equipment device is typically providing services for a single user. Operation proceeds from step 2058 to step 2060.

In step 2060, while operating in the second mode of operation, the wireless base station communicates each of the new uplink resource grant schedules to the wireless device for which the new uplink resource grant schedule was generated using the downlink control channel (e.g., PDCCH). Operation proceeds from step 2060 to step 2062.

In step 2062, wireless devices connected to the wireless base station receive the new uplink resource grant schedules and utilize the resource grants to communicate data/information to the wireless base station. Operation proceeds from step 2062 to step 2064.

In step 2064, while continuing to operate in the second mode of operation, the wireless base station generates a message indicating that each wireless device is responsible for managing its own uplink resource grant schedule. In some embodiments, step 2064 includes sub-step 2066. In sub-step 2066, the wireless base station generates an "uplink grant schedule is managed by wireless device" message. Operation proceeds from step 2064 to step 2068.

In step 2068, while continuing to operate in the second mode of operation, the wireless base station communicates the generated message indicating that each wireless base station is for managing its own uplink resource grant schedule to the wireless devices connected to the wireless base station. Operation proceeds from step 2068 to step 2070.

In step 2070, while continuing to operate in the second mode of operation, the wireless base station ceases managing the uplink resource grant schedule for the plurality of wireless devices connected to the wireless base station. Operation proceeds from step 2070 to step 2072.

In step 2072, while continuing to operate in the second mode of operation and subsequent to communicating the message indicating that each wireless device is responsible for managing its own uplink resource grant schedule, the wireless base station reduces its transmission power level as instructed in the power down command received from the resource management system. In some embodiments, step 2072 includes sub-step 2074. In sub-step 2074, the wireless base station ceases transmission of uplink resource grant schedules for wireless devices on the downlink control channel (e.g., PDCCH). This results in a reduction of the transmission power level for the wireless base station. In some embodiments, the wireless base station also reduces the average transmission power used in transmitting data to the wireless base stations. The reduction in the transmission power level of the wireless base station results in the downlink control channel coverage area, e.g., PDCCH coverage area, being smaller than the uplink control channel coverage area, e.g., PUCCH coverage area. An example of such a situation is shown in diagram 1300' of FIG. 14. Diagram 1300' illustrated in FIG. 14 shows the same system as diagram 1300 of FIG. 13 but in this example the downlink control channel (PDCCH) coverage area 1304' (i.e., area within circle 1304') is less than the uplink control channel (PUCCH) coverage area 1302' (i.e., area within circle 1302'). In the situation shown in diagram 1300' of FIG. 14, while the wireless base station 102 can receive uplink control messages from each of the wireless devices connected to it (CPE 1 112, CPE 2 152, . . . , CPE X 159, UE B1 103, . . . , UE BZ 167, the wireless base station can not communicate control messages to various wireless devices connected to it (e.g., CPE device 1 112, CPE 2 152, UE B1 103) because the wireless devices are outside the PDCCH coverage area 1304'. However, as HARQ indicator channel coverage area 1306' (area within circle 1306') is greater than the uplink coverage area 1302, the wireless base station 102 can communicate ACK and NACK messages to the wireless devices connected to the wireless base station 102 (i.e., CPE 1 112, CPE 2 152, . . . , CPE X 158, UE B1 103, . . . , UE BZ 105 as they are all within the HARQ indicator channel coverage area 1306'. In this scenario any wireless device that connects to the wireless base station must be within the uplink coverage area so it can communicate with the wireless base station and as the HARQ indicator channel coverage area 1302' encompasses the uplink coverage area, the wireless base station will be able to send ACK and NACK message to the wireless devices connected to the wireless base station even if it is not able to send control messages to the wireless base station.

Operation proceeds from step 2074 via connection node E 2076 to step 2078 shown on FIG. 2E.

In step 2078, subsequent to receiving said message that it is responsible for managing its uplink resource grant schedule, each wireless device connected to the wireless base station, upon determining that it requires a change to its uplink resource grant schedule generates an uplink resource grant schedule for itself and communicates it to the wireless base station. The generated uplink resource grant including information identifying a set of resource blocks to be reserved for use by the wireless device on a recurring basis. That is the set of resource blocks can be repeatedly use to send uplink data to the wireless base station by the wireless device at repeated intervals. In some embodiments, step 2078 includes one or more sub-steps 2080, 2082, 2084, 2086, 2088.

In sub-step 2080, each wireless device generates an uplink grant schedule an uplink resource grant schedule message including uplink resource grant schedule information and communicates the uplink resource grant schedule message to the wireless base station via the uplink control channel (e.g., PUCCH).

In sub-step 2082, a first wireless device which is one of the plurality of wireless devices connected to the wireless base station generates a first uplink resource grant schedule including a first uplink resource grant. The first uplink resource grant identifying a first set of resource blocks that are to be reserved for use by the first wireless device on a recurring basis. The first uplink resource grant schedule indicating the time interval of the recurring basis.

In sub-step 2084, the first wireless device connected to the wireless base station generates a first uplink resource grant schedule message including first uplink resource grant schedule information. The first uplink resource grant schedule information identifying a first set of resource blocks that are to be reserved for use by the first wireless device on a recurring basis. The first uplink resource grant schedule information indicating the time interval of the recurring basis.

In sub-step 2086, the first wireless device connected to the wireless base station communicates the first uplink resource grant schedule and/or first uplink resource grant schedule information and/or the first uplink resource grant schedule message to the wireless base station using the uplink control channel (e.g., PUCCH). Operation proceeds from step 2078 via connection node F 2090 to step 2092 shown on FIG. 2F.

In step 2092, while operating in the second mode of operation and subsequent to communicating said message indicating that each wireless device is responsible for managing its own uplink resource grant schedule to each wireless device connected to the wireless base station, the wireless base station receives from said wireless devices connected to the wireless base station uplink resource grant schedule information for the wireless devices, said uplink resource grant schedule information uplink grant schedules for the wireless devices which communicated them to the wireless base station. In some embodiments, step 2092 includes sub-step 2094. In sub-step 2094, subsequent to communicating said message indicating that each wireless device is responsible for managing its uplink resource grant schedule to each wireless device connected to the wireless base station, the wireless base station receives first uplink resource grant information, the first uplink resource grant, and/or the first uplink resource grant message which was communicated from the first wireless device. As previously discussed, the first uplink resource grant information includes information from which the first uplink resource grant that the first wireless device will be using for communicating uplink data to the wireless base station can be determined or derived. The first uplink resource grant identifying a first set of resource blocks that is to be reserved for use by the first wireless device on a recurring basis. Operation proceeds from step 2092 to step 2096.

In step 2096, while operating in the second mode of operation, the wireless base station in response to receiving uplink resource grant schedule information, e.g., an uplink grant schedule message, from a wireless device connected to the wireless base station stores in memory an indication that the set of resource blocks identified in the uplink grant schedule information is reserved, blocked or allocated for the wireless device from which the uplink resource grant schedule information was received unless one or more of the resource blocks are already reserved, blocked or allocated for another device. In some embodiments, the uplink resource grant information is stored in memory. In some embodiments, the uplink resource grant is determined from the uplink resource grant schedule information and is stored in memory. In some embodiments, step 2096 includes one or more sub-steps 2098, 2100, and 2102.

In sub-step 2098, in response to receiving the first uplink resource grant schedule information from said first wireless device, the wireless base station determines whether the first set of resource blocks of the first uplink grant are currently allocated, blocked or reserved for another wireless device.

In sub-step 2100, when the first set of resource blocks are determined by the wireless base station to not be allocated, blocked or reserved for another wireless device different from the first wireless device, the wireless base station stores in memory an indication that the first set of resource blocks are allocated, blocked, or reserved for the first wireless device and that any transmission, e.g., data/information transmission, successfully received from the first wireless device using the first set of resource blocks in accordance with the first uplink grant schedule information is to be responded to or reported back to the first wireless base station with an ACK message indicating successful receipt of the transmission by thew wireless base station. An indicator channel, e.g., a Physical HARQ Indicator Channel, having a larger coverage area than the uplink control channel used by the wireless devices connected to the wireless base station is used to communicate the ACK message to the first wireless device.

In sub-step 2102, when said first set of resource blocks are determined to be allocated, blocked or reserved for another wireless device different than the first wireless device the wireless base station stores in memory an indication that any transmission received from the first wireless device using the first set of resource blocks is to responded to or reported back to the first wireless base station with a NACK message indicating a failure of the transmission, e.g., data/information transmission. An indicator channel, e.g., a Physical HARQ Indicator Channel, having a larger coverage area than the uplink control channel used by the wireless devices connected to the wireless base station is used to communicate the NACK message to the first wireless device. The same indicator channel is typically used for communicating the ACK and NACK messages.

In various embodiments, the data/information included in resource blocks of an uplink message from a wireless device are signed by the wireless device transmitting the data/information to the wireless base station. The wireless base station uses the wireless device's signature to decode and/or decrypt the signed data/information. This signature allows the wireless base station to determine which wireless device transmitted the data/information to the wireless base station when two wireless devices are attempting to use the same set of resource blocks such as in the case described above wherein the first resource block has generated its own resource grant schedule but the resource blocks in it are already allocated, blocked or reserved for another different wireless device.

Operation proceeds from step 2096 via connection node G 2104 to step 2106 shown on FIG. 2G.

In step 2106, the individual wireless devices of the plurality of wireless devices connected to the wireless base station communicate uplink data/information to the wireless base station using the set of uplink resource blocks identified in the uplink resource grant schedule information communicated to the wireless base station by the individual wireless device. In some embodiments, step 2106 includes sub-step 2108. In sub-step 2108, the first wireless device communicates data/information to the wireless base station using the first set of resource blocks identified in the first uplink resource grant schedule information. Operation proceeds from step 2106 to step 2110.

In step 2110 the wireless base station while operating in the second mode of operation in response to receiving uplink data/information in a set of resource blocks from a wireless device determines if the set of resource blocks from which the data/information was received is allocated, blocked or reserved for the wireless device from which the data/information was received and (i) if it is then the wireless base station responds with an ACK message to the wireless device indicating successful reception of the data/information; and (ii) if it is not then the wireless base station responds with a NACK message to the wireless device indicating that the data/information was not successfully received even though it was. The ACK and NACK message are typically sent to the wireless device via the indicator channel as previously discussed, e.g., a Physical HARQ Indicator Channel, having a larger coverage area than the uplink control channel used by the wireless devices to communicate with the wireless base station. In some embodiments, step 2110 includes one or more sub-steps 2112, 2114 and 2116. While ACKs/NACKs have been discussed as being communicated using a Physical HARQ indicator channel, this is for exemplary purposes and other channels and/or techniques may be, and sometimes are, used for communicating ACKs/NACKs and/or HARQ information from the wireless base station to wireless devices, e.g., user equipment devices, connected to the wireless base station. Accordingly, reference to a Physical HARQ indicator channel is exemplary and the name of the channel is not intended to be limiting.

In sub-step 2112, the wireless base station in response to receiving uplink data/information in the first set of resource blocks of the first resource grant from the first wireless device determines if the first set of resource blocks is allocated, blocked or reserved for the first wireless device.

In sub-step 2114, when the first set of resource blocks are determine by the wireless base station to be allocated, blocked or reserved for the first wireless device, the wireless base station generates and communicates an ACK message to the first wireless device indicating the successful reception of the uplink data/information communicated to the wireless base station. The ACK message as previously discussed is communicated to the first wireless device using an indicator channel.

In sub-step 2116, when the first set of resource blocks are determined to be allocated, block or reserved for the another wireless device different from the first wireless device, the wireless base station generates and communicates a NACK message to the first wireless device indicating the data/information communicated was not successfully received even it may have been. The NACK message as previously discussed is communicated to the first wireless device using an indicator channel.

Operation proceed from step 2110 via connection node H 2118 to step 2120 shown on FIG. 2H.

In step 2120, each individual wireless device checks if there are NACKs and/or ACKs reported and/or received for uplink data/information transmitted in the set of resource blocks of the uplink resource grant schedule communicated to the wireless base station from the individual wireless device.

When the an ACK is reported or received in response to a transmitted uplink data/information transmission, the wireless device determines that the set of resource blocks of the uplink resource grant schedule has been allocated, reserved, and/or blocked for the wireless device's usage and the wireless device continues to use the set of resource blocks of the uplink resource grant for communicating uplink data/information to the wireless base station.

When there are threshold number of NACKs reported or received in response to the transmitted uplink data/information, the wireless device selects or determines another uplink resource grant schedule with a different set of resource blocks than the set of resource blocks in the uplink grant schedule previously communicated to the wireless base station from the individual wireless device. The selected/generated another uplink resource grant schedule is communicated to the wireless base station and data is transmitted using the another uplink resource grant. Step 2120 is then repeated with checks being made by the wireless device for ACKs and/or NACKs. The process is repeated until an ACK is received for a selected/granted uplink resource grant schedule. That is NACKs are not received in response to a transmission of data using the uplink grant schedule.

In some embodiments, this step includes a sub-step in which the wireless device determines that the uplink resource grant schedule communicated to the wireless base station was being used by another different wireless device and was not reserved, blocked or allocated to the first wireless base station for use by the wireless base station upon receiving greater than a threshold number of NACKs after transmitting data/information using an uplink resource grant schedule generated and transmitted to the wireless base station. The threshold number of NACKs may be based on the probability of collision with another wireless device or the quality of the uplink data channel on which on the data/information is transmitted. The threshold number of NACKs may be for example two consecutive NACKs in response to the first two transmission using the uplink resource grant schedule.

In some embodiments, step 2120 includes one or more sub-steps 2124, 2126, and 2128.

In sub-step 2124, when said first wireless device receives an ACK message in response to an uplink data transmission transmitted using the first set of resource blocks in the first uplink resource grant schedule, the first wireless device determines that the first uplink grant schedule has been allocated, blocked or reserved for the first wireless device and the first wireless device continues to use the first uplink resource grant schedule to transmit data/information to the wireless base station until the first wireless device's uplink resource needs change at which time it generates and communicates a new uplink resource grant schedule to the wireless base station.

In sub-step 2126, when the first wireless device receives a threshold number of NACK messages in response to uplink data transmitted using the first set of resource blocks in the first uplink grant schedule, the first wireless device determines that the first uplink grant schedule has not been allocated, blocked or reserved for the first wireless device.

In sub-step 2128, in response to determining that the first uplink resource grant schedule has not been allocated, blocked or reserved for the first wireless device, the first wireless device determines or selects another uplink resource grant schedule including another set of resource blocks and communicates another uplink resource grant schedule information to the wireless base station, e.g., an uplink grant schedule message. The set of another resource blocks being different than the first set of resource blocks. Operation proceeds from step 2128 to step 2130.

In step 2130, each individual wireless device continues to manage its uplink resource grant schedule until it receives a message from the wireless base station including an uplink resource grant schedule for the wireless device or a message indicating the uplink resource grant schedule is to be managed by the wireless base station.

Returning to step 2132 shown on FIG. 2I, in step 2132 the wireless base station monitors for a transmission power level increase command from the resource management system and upon receiving the transmission power level increase command increases the transmission power level of the wireless base station by the amount authorized in the transmission power level increase command. Operation proceeds from step 2132 to step 2134.

In step 2134, the wireless base station determines whether the increased transmission power level is greater than or equal to the first threshold value. In this example, the when the transmission power level is greater than or equal to the first threshold value the scenario shown in diagram 1300 of FIG. 13 occurs that is the downlink coverage area encompasses the uplink coverage area and the wireless base station can communicate control messages, e.g., uplink resource grant schedules, to all wireless devices connected to the wireless base station. When the determination is that the increased transmission power level is greater than or equal to the first threshold value operation proceeds from step 2134 to step 2136.

When the determination is that increased transmission power level is not greater than or equal to the first threshold value operation proceeds from step 2134 to steps 2146 and back to step 2132. In step 2146, the wireless base station continues to operate in the second mode of operation. In step 2132, the wireless base station continues to implement the steps of the method 2000 as previously described.

In step 2136, the wireless base station switches from operating in the second mode of operation to operating in the first mode of operation. In some embodiments, step 2136 includes one or more sub-steps 2138, 2140, and 2142. In sub-step 2138, the wireless base station notifies, e.g., via sending a message, each of the wireless devices that the wireless base station will resume management of the uplink resource grant schedule for the wireless devices connected to the wireless base station.

In sub-step 2140, the wireless base station will generate for each of the wireless devices connected to the wireless base station a new uplink resource grant schedule.

In sub-step 2142, the wireless base station will communicate each of the generated uplink resource grant schedules to the wireless device for which it was generated.

Operation proceeds from step 2136 to step 2144. In step 2144, the wireless base station continues operating in the first mode of operation until a determination is made that it needs to switch to the second mode of operation as previously described.

In various embodiments, the wireless devices have a first and second mode of operation. In the first mode of operation, a wireless device does not generate an uplink resource grant schedule but instead receives an uplink resource grant schedule from the wireless base station to which it is connected. In the second mode of operation the wireless device generates its own uplink resource grant schedule and sends it to the wireless base station to which it is connected. The wireless device then determine whether the generated uplink resource grant schedule conflicts with another wireless device's uplink grant schedule based on whether or not they receive an ACK message or a NACK message in response to transmitting data to the wireless base station using the generated uplink grant schedule. When an ACK message is received, the wireless device determines that there is not a conflict with another wireless device's uplink grant schedule. When an NACK is received, the wireless device determines that a conflict does exist with another wireless device. In response to determining a conflict exists, the wireless device generates a new uplink grant schedule and repeats the process until it determines that there is no longer a conflict. In such embodiments, the wireless device switches from the first mode of operation to the second mode of operation when it receives a message from the wireless base station to which it is connected which indicates that the wireless device is responsible for managing its own uplink resource grant schedule. The wireless device switches from the second mode of operation to the first mode of operation when it receives a message from the wireless base station including an uplink resource grant schedule or an indication that the wireless base station is responsible for managing the wireless device's uplink resource grant schedule.

Figure 11:
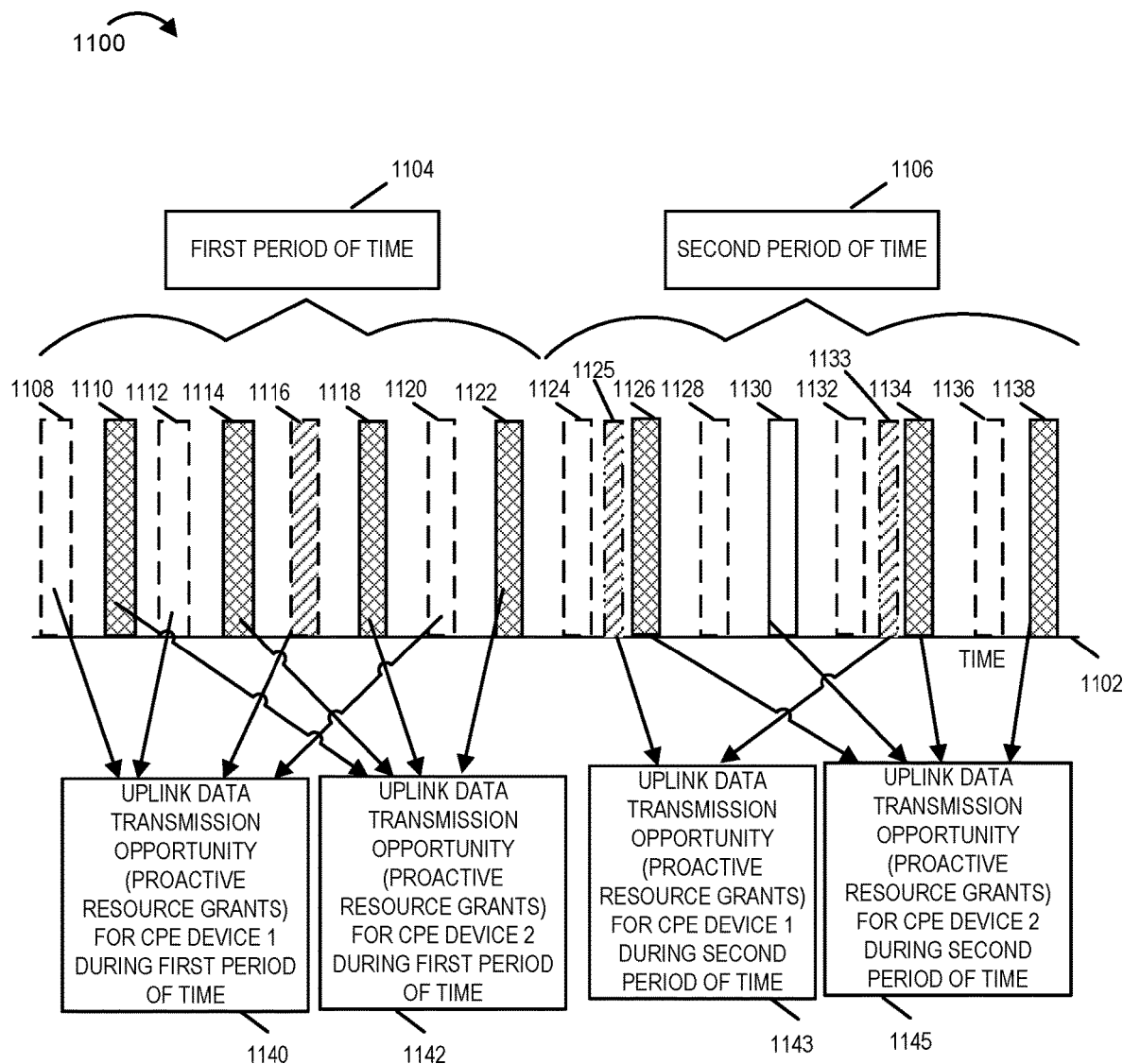
FIG. 11 illustrates the assignment and usage of uplink data transmission resource grants for wireless devices, e.g., CPE devices for a first and second period of time.

Diagram 1100 of FIG. 11 illustrates the uplink data transmission resource grant and usages for a first wireless device, i.e., CPE device 1 and a second wireless device, i.e., CPE device 2, during a first period of time 1104 and a second period of time 1106.

Diagram 1100 of FIG. 11, illustrates the uplink data transmission resource grant determined by a wireless base station for a first wireless device, i.e., CPE device 1 for the first period of time 1104 as including a first set of resource blocks represented as 1108. The first set of resource blocks recur as shown on the time line 1102 as resource blocks 1112, 1116, and 1120 during the first time period 1104. Each of the recurring first set of resource blocks 1108, 1112, 1116, and 1120 provide an opportunity for the CPE device 1 to transmit uplink data from the CPE device 1 to the wireless base station. Each recurrence of the first set of resource blocks (1108, 1112, 1116, and 1120) are referred to as an uplink data transmission opportunity as they are an opportunity to transmit uplink data from the CPE device 1 to the wireless base station over the uplink channel at the time of each recurrence using the resource blocks of the CPE device 1 uplink data transmission resource grant as described in the label box 1140. While only a single rectangle is shown, each rectangle represents a set of one or more resource blocks. Typically, a plurality of resource blocks are included in the set.

Diagram 1100 of FIG. 11, also illustrates the uplink data transmission resource grant determined by a wireless base station for a second wireless device, i.e., CPE device 2, for the first period of time 1104 as including a second set of resource blocks represented as 1110. The second set of resource blocks recur as shown on the time line 1102 as resource blocks 1114, 1118, and 1122 during the first time period 1104. Each of the recurring second set of resource blocks 1110, 1114, 1118, and 1122 provide an opportunity for the CPE device 2 to transmit uplink data from the CPE device 2 to the wireless base station. Each recurrence of the second set of resource blocks (1110, 1114, 1118, and 1122) are referred to as an uplink data transmission opportunity as they are an opportunity to transmit uplink data from the CPE device 2 to the wireless base station over the uplink channel at the time of each recurrence using the resource blocks of the CPE device 2 uplink data transmission resource grant as described in the label box 1140. While only a single rectangle is shown, each rectangle represents a set of one or more resource blocks. Typically, a plurality of resource blocks are included in the set.

After the CPE device 1 and CPE device 2 receive the uplink data transmission resource grants, the CPE device 1 and CPE device 2 begin to use their respective uplink data transmission resource grants to transmit data to the wireless base station.

The CPE device 1 determines before the first uplink data transmission opportunity for the CPE device 1 in the first period of time whether it has uplink data to be transmitted to the wireless base station. The CPE device 1 in the example shown in diagram 1100 determines that it does not have data to be transmitted during the first uplink data transmission opportunity for the CPE device 1 in the first period of time and as shown in the FIG. 11 skips and does not use the first set of resources blocks 1108 to transmit uplink data to the wireless base station. The CPE device 1 determines before the second uplink data transmission opportunity for the CPE device 1 in the first period of time whether it has uplink data to be transmitted to the wireless base station. The CPE device 1 in the example shown in diagram 1100 determines that it does not have data to be transmitted during the second uplink data transmission opportunity for the CPE device 1 in the first period of time and as shown in the FIG. 11 skips and does not use the first set of resources blocks 1112 to transmit uplink data to the wireless base station. The CPE device 1 in the example shown in diagram 1100 determines that it has data to be transmitted during the third uplink data transmission opportunity for the CPE device 1 in the first period of time and as shown in the FIG. 11 fully utilizes the first set of resources blocks 1116 to transmit uplink data to the wireless base station. The CPE device 1 in the example shown in diagram 1100 determines that it does not have data to be transmitted during the fourth uplink data transmission opportunity for the CPE device 1 in the first period of time and as shown in the FIG. 11 skips and does not utilize the first set of resources blocks 1120 to transmit uplink data to the wireless base station.

The CPE device 2 determines before the first uplink data transmission opportunity for the CPE device 2 in the first period of time whether it has uplink data to be transmitted to the wireless base station. The CPE device 2 in the example shown in diagram 1100 determines that it has data to be transmitted during the first uplink data transmission opportunity for the CPE device 2 in the first period of time and as shown in FIG. 11 fully utilizes the second set of resources blocks 1110 to transmit uplink data to the wireless base station. The CPE device 2 determines before the second uplink data transmission opportunity for the CPE device 2 in the first period of time whether it has uplink data to be transmitted to the wireless base station. The CPE device 2 in the example shown in diagram 1100 determines that it has data to be transmitted during the second uplink data transmission opportunity for the CPE device 2 in the first period of time and as shown in the FIG. 11 fully utilizes the second set of resources blocks 1114 to transmit uplink data to the wireless base station. The CPE device 2 in the example shown in diagram 1100 determines that it has data to be transmitted during the third uplink data transmission opportunity for the CPE device 2 in the first period of time and as shown in the FIG. 11 fully utilizes the second set of resources blocks 1118 to transmit uplink data to the wireless base station. The CPE device 2 in the example shown in diagram 1100 determines that it has data to be transmitted during the four uplink data transmission opportunities for the CPE device 2 in the first period of time and as shown in the FIG. 11 fully utilizes the second set of resources blocks 1122 to transmit uplink data to the wireless base station.

In the second period of time, the wireless base station has received a transmission power down command from the resource management system and switched from operating in the first mode of operation to operating in a second mode of operation during which it does not manage the CPE device 1 and CPE device 2 uplink resource grant schedule. Instead, CPE device 1 and CPE device 2 manage their own uplink resource grant schedules including generating their uplink resource grant schedule, communicating it the wireless base station and generating a new different uplink resource grant schedule when NACKs, e.g., a threshold number of NACKs, are received in response to uplink data transmission using the resource blocks identified in the uplink resource grant schedule communicated to the wireless base station.

CPE device 1 in the second time period has generated an uplink resource grant schedule which is different that than uplink resource grant schedule previously assigned by the wireless base station to CPE device 1 during the first period of time. It includes different resource blocks and a different interval of recurrence than the uplink resource grant during the first period of time. The uplink resource grant opportunities 1124, 1128, 1132, and 1136 represent the recurring uplink resource grant and first set of resource blocks which would match the uplink resource grant schedule assigned to CPE device 1 during the first period of time as it would recur in the second period of time. As can be seen these uplink data transmission opportunities are unused and left empty. Instead the uplink data transmission opportunities 1125 and 1133 show the uplink resource grant schedule generated and utilized by CPE device 1 during the second period of time. It recurs at a different interval and uses a third set of resource blocks which is different than the first set of resource blocks included in the uplink data transmission opportunities 1124, 1128, 1132, and 1136. Each recurrence of the third set of resource blocks (1125, 1133) are referred to as an uplink data transmission opportunity as they are an opportunity to transmit uplink data from the CPE device 1 to the wireless base station over the uplink channel at the time of each recurrence using the resource blocks of the CPE device 2 uplink data transmission resource grant as described in the label box 1143. While only a single rectangle is shown, each rectangle represents a set of one or more resource blocks. Typically, a plurality of resource blocks are included in the set.

CPE device 2 in the second time period has generated an uplink resource grant schedule which is the same as the uplink resource grant schedule previously assigned by the wireless base station to CPE device 2 during the first period of time. It includes the same resource blocks as in the previously uplink resource grant. It also includes uplink resource grant opportunities 1126, 1130, 1134, and 1138 the same as the uplink resource grant schedule in the first period of time. Furthermore, the CPE device 2 has utilized uplink resource grant opportunities 1126, 1134 and 1138 in connection with but did not use opportunity 1130. Each recurrence of the second set of resource blocks (1126, 1130, 1134 and 1138) are referred to as an uplink data transmission opportunity as they are an opportunity to transmit uplink data from the CPE device 2 to the wireless base station over the uplink channel at the time of each recurrence using the resource blocks of the CPE device 2 uplink data transmission resource grant as described in the label box 1145. While only a single rectangle is shown, each rectangle represents a set of one or more resource blocks. Typically, a plurality of resource blocks are included in the set.

Legend Box 1144 includes boxes 1146, 1148, 1150, 1152, 1154, and 1156 which are used to describe the uplink resource grant and there usage in diagram 1100. Box 1146 indicates a first set of resource blocks which make up a first uplink resource grant which is assigned to CPE device 1 during the first period of time but were not used by CPE device 1. Box 1148 indicates a first set of resource blocks which make up a first uplink resource grant which is assigned to CPE device 1 during the first period of time and which was used by CPE device 1 to communicate uplink data to the wireless base station. Box 1150 indicates a second set of resource blocks which make up a second uplink resource grant which is assigned to CPE device 2 by the wireless base station during the first period of time and which was generated by the CPE device 2 for its use during the second period of time but was not used by CPE device 2. Box 1152 indicates a second set of resource blocks which make up a second uplink resource grant which is assigned to CPE device 2 by the wireless base station during the first period of time and which was generated by the CPE device 2 for its use during the second period of time and was used by CPE device 2 to communicate uplink data to the wireless base station. Box 1154 indicates a third set of resource blocks which make up an uplink resource grant which is generated by the CPE device 1 during the second period of time but were not used by CPE device 1. Box 1156 indicates a third set of resource blocks which make up a uplink resource grant which is generated by CPE device 1 during the second period of time and which was used by CPE device 1 to communicate uplink data to the wireless base station.

Figure 12:
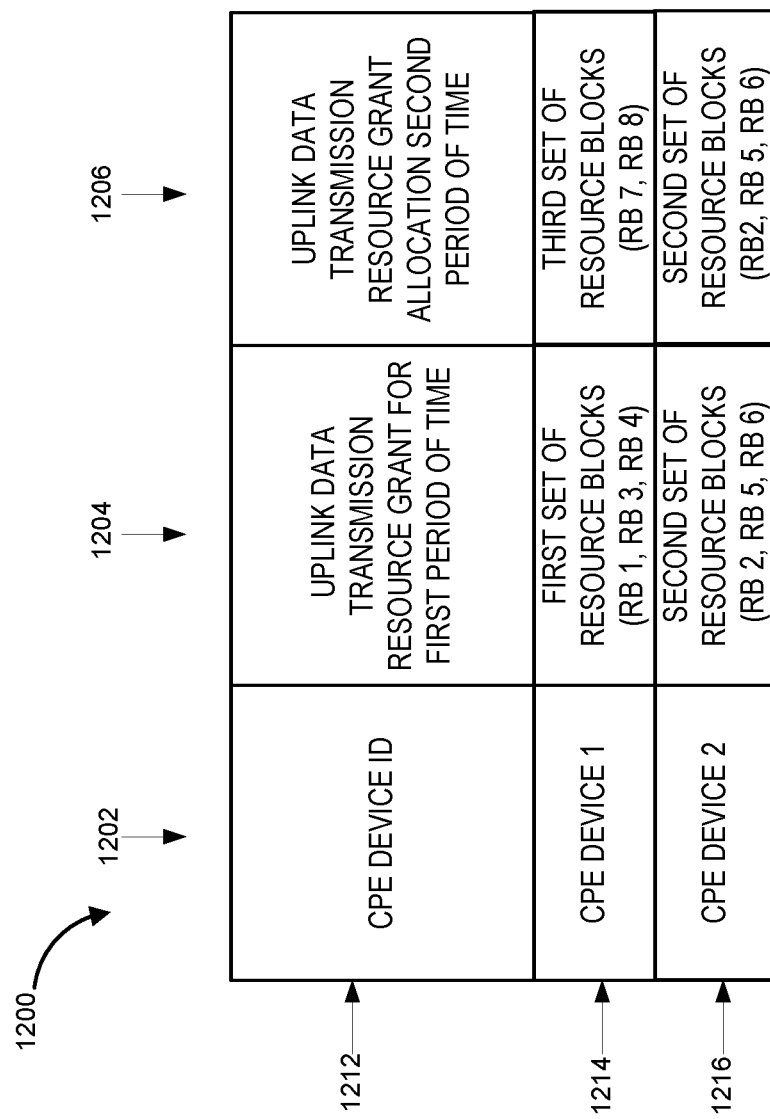
FIG. 12 illustrates an exemplary table including CPE device information, uplink data transmission resource grant information for a first and second period of time.

FIG. 12 illustrates an exemplary table 1200 which may be, and in some embodiments is, stored in memory or a storage device by the wireless base station. The table 1200 includes information about two wireless devices, CPE device 1 and CPE device 2 connected to the wireless base station during the first period of time and second period of time. The first period of time being while the wireless base station was operating in a first mode of operation and the second time period being while the wireless base station was operating in a second mode of operation.

Table 1200 includes columns 1202, 1204, 1206, and rows 1212, 1214, and 1216. The first row 1212 includes labels identifying the information contained in the each of the columns. The entry (column 1202, row 1212) indicates that the entries in column 1202 includes CPE device IDs for CPE devices connected to the wireless base station. The entries in column 1204 identify the uplink data transmission resource grant for the first time period (col. 1204, row 1212 entry) for the CPE device identified in the same row. The entries in column 1206 identify the uplink data transmission resource grant for the second time period (col. 1206, row 1212 entry) for the CPE device identified in the same row.

Row 1214 includes information for the CPE device 1 (col. 1202, row 1214 entry) that indicates: (i) the CPE device 1 was assigned the first set of resource blocks which included resource block (RB) 1, RB 3 and RB4 for its uplink data transmission resource grant for the first period of time (col. 1204, row 1214 entry) by the wireless base station, (ii) the CPE device 1 generated the uplink data transmission resource grant including the third set of resource blocks RB 7 and RB 8 which when communicated to the wireless base station were reserved, blocked, and/or allocated to CPE device 1 (col. 1206, row 1214 entry).

Row 1216 includes information for the CPE device 2 (col. 1202, row 1216 entry) that indicates: (i) the CPE device 2 was assigned the second set of resource blocks which included resource block (RB) 2, RB 5 and RB6 for its uplink data transmission resource grant for the first period of time by the wireless base station (col. 1204, row 1216 entry) and (ii) the CPE device 2 generated the uplink data transmission resource grant including the second set of resource blocks RB 2, RB 5 and RB 6 which when communicated to the wireless base station were reserved, blocked, and/or allocated to CPE device 2 (col. 1206, row 1216 entry). If a CPE device 3 which is connected to the wireless base station during the second period of time generates a uplink resource grant schedule that has overlapping resources blocks with the first set of resource blocks and/or the third set of resource blocks (e.g., RB 1 and/or RB 7), the wireless base station will consult the table 1200 and determine that the overlapping resource blocks have already been allocated. When CPE device 3 transmits data to wireless base station using the overlapping resource blocks (e.g., RB 1 and/or RB 7) the wireless base station will respond to the data transmission with a NACK even if the data transmission was successfully received as the overlapping resource blocks have been allocated to a different wireless device than CPE device 3. In this way, CPE device 3 will be able to determine that it needs to generate and/or select a new uplink resource grant schedule with a different set of resource blocks. In some embodiments, the wireless devices chose from a set of uplink resource grants having a predetermined set of resource blocks and predetermined recurring time interval. In such embodiments, all resource blocks will overlap when two different wireless devices select the same uplink resource grant for use from the set of uplink resource grants.

The various methods and apparatus described above including the method 2000 provide technological solutions of how a wireless base station can effectively and efficiently manage uplink data transmission grants, e.g., proactive grants, to wireless devices, e.g., CPE devices, in a wireless network. The various embodiments described in connection with method 2000 also provide new and novel methods for managing uplink data transmission resource grants, e.g., proactive grants, in 5G/CBRS fixed wireless access systems including customer premises equipment devices which support a number of subscribers, user equipment devices and/or user terminals. The methods and apparatus discussed above also provides new and/or improved methods for managing uplink resource grant schedules when the uplink control channel coverage range or area is greater than the downlink control channel coverage range or area of the wireless base station.

In some embodiments, the information in the table 1200 is stored in the memory of the wireless base station, e.g., non-volatile memory so that the information is not lost upon a power failure or a reset of the wireless base station.

Various exemplary numbered embodiments illustrating different features of the present invention will now be discussed.

List of Exemplary Numbered Method Embodiments:

Method Embodiment 1. A wireless communications method comprising: operating a first wireless base station in a first mode of operation, said first mode of operation including managing uplink resource grant schedules for a plurality of wireless devices connected to the first wireless base station; receiving, by the first wireless base station operating in said first mode of operation, a transmission power down command from a resource management system; determining in response to receiving said transmission power down command, by the first wireless base station, whether to switch from operating in said first mode of operation to operating in a second mode of operation, said operating in said second mode of operation including ceasing managing uplink resource grant schedules for said plurality of wireless devices connected to the first wireless base station.

Method Embodiment 1A. The communications method of Method Embodiment 1, wherein each of said wireless devices is a user equipment device or a customer premises equipment device.

Method Embodiment 1AA. The communications method of Method Embodiment 1 further comprising: prior to receiving the transmission power down command, registering the first wireless base station (e.g., CBSD) with the resource management system, said resource management system managing transmission power levels of a plurality of wireless base stations in a first wireless network, said first wireless base station being one of said plurality of wireless base stations.

Method Embodiment 1AAA. The communications method of Method Embodiment 1 further comprising: establishing a plurality of wireless connections between the first wireless base station and said plurality of wireless devices.

Method Embodiment 1B. The communications method of Method Embodiment 1, wherein said wireless devices are user terminals.

Method Embodiment 1B1. The communications method of Method Embodiment 1B, wherein each of said user terminals is a user equipment device or a customer premises equipment device.

Method Embodiment 1C. The communications method of Method Embodiment 1, wherein said first wireless base station is part of a new radio 5G wireless network.

Method Embodiment 2. The communications method of Method Embodiment 1, wherein determining whether to switch from operating in said first mode of operation to operating in a second mode of operation includes determining whether the implementation of the transmission power down command by the first wireless base station will result in a downlink control channel coverage area of the first wireless base station being less than an uplink control channel coverage area of the first wireless base station.

Method Embodiment 3. The communications method of Method Embodiment 2 further comprising: determining to switch from operating in said first mode of operation to operating in said second mode of operation when said determination is that the implementation of the transmission power down command by the first wireless base station will result in the downlink control channel coverage area of the first wireless base station being less than the uplink control channel coverage area of the first wireless base station.

Method Embodiment 3B. The method of Method Embodiment 2 further comprising: determining not to switch from operating in said first mode of operation to operating in said second mode of operation when said determination is that the implementation of the transmission power down command by the first wireless base station will not result in the downlink control channel coverage area of the first wireless base station being less than the uplink control channel coverage area of the first wireless base station.

Method Embodiment 4. The method of Method Embodiment 1, wherein said determining whether to switch from operating in said first mode of operation to operating in a second mode of operation includes determining whether the implementation of the transmission power down command by the first wireless base station will result in an transmission power level for a downlink control channel used for communicating uplink resource grants to the wireless devices being less than a first threshold value.

Method Embodiment 4A. The method of Method Embodiment 4, wherein the first threshold value is 23 dBm.

Method Embodiment 5. The method of Method Embodiment 4, wherein said first threshold value is a power transmission level value equal to or based on the maximum power transmission level of a wireless device connected to the first wireless base station.

Method Embodiment 6. The method of Method Embodiment 5, wherein the maximum power transmission level of a wireless device is a maximum uplink channel power transmission level of a wireless device connected to the first wireless base station.

Method Embodiment 7. The method of Method Embodiment 1, wherein the first wireless base station is a Citizens Broadband Radio Service Device (CBSD); wherein the first wireless base station is part of a Citizen Broadband Radio Service (CBRS) network; wherein each of said wireless devices connected to the first wireless base station is a CBRS user equipment device, CBRS Customer Premises Equipment (CPE) device, or a device emulating a CBRS user equipment device or CBRS CPE device.

Method Embodiment 7A. The method of Method Embodiment 1, wherein the first wireless base station is a Citizens Broadband Radio Service Device (CBSD); wherein the first wireless base station is part of a Citizen Broadband Radio Service (CBRS) network; and wherein said wireless devices connected to the first wireless base station include at least one CBRS Customer Premises Equipment device.

Method Embodiment 8. The method of Method Embodiment 1, wherein managing uplink resource grant schedules for said plurality of wireless devices connected to the first wireless base station includes generating an uplink resource grant schedule for each individual wireless device connected to the first wireless base station.

Method Embodiment 8A. The method of Method Embodiment 8, wherein each uplink resource grant schedule includes an uplink resource grant giving a wireless device the right to use a set of resource blocks on a recurring basis.

Method Embodiment 9. The method of Method Embodiment 8, wherein said operating said first wireless base station in a first mode of operation further includes communicating each of said generated uplink resource grant schedules to the individual wireless device for which the uplink grant schedule was generated.

Method Embodiment 10. The method of Method Embodiment 1, wherein operating said first wireless base station in said second mode of operation includes communicating a message to each wireless device connected to the first wireless base station prior to ceasing managing said uplink grant schedule for said plurality of wireless devices, said message indicating that each wireless device is responsible for managing its uplink resource grant schedule.

Method Embodiment 11. The method of Method Embodiment 10, further comprising: subsequent to communicating said message indicating that each wireless device is responsible for managing its uplink resource grant schedule to each wireless device connected to the first wireless base station, reducing said transmission power level as instructed in the transmission power down command received from the resource management system.

Method Embodiment 11A. The method of Method Embodiment 11, wherein reducing said transmission power level as instructed in the transmission power down command received from the resource management system includes ceasing transmissions of uplink resource grant schedules for wireless devices on the downlink control channel (e.g., PDCCH).

Method Embodiment 12. The method of Method Embodiment 11, further comprising: subsequent to communicating said message indicating that each wireless device is responsible for managing its uplink resource grant schedule to each wireless device connected to the first wireless base station, receiving first uplink resource grant schedule information from a first wireless device connected to the first wireless base station, said first uplink resource grant schedule information including a first uplink resource grant that the first wireless device will be using for communicating uplink data to the first wireless base station, the uplink resource grant identifying a first set of resource blocks that will be reserved for use by the first wireless device on a recurring basis and timing information identifying when the first set of resource blocks will recur.

Method Embodiment 12A. The method of Method Embodiment 12, wherein the first uplink resource grant schedule information is received by the first wireless base station from the first wireless device via an uplink control channel (e.g., PUCCH).

Method Embodiment 13. The method of Method Embodiment 12, further comprising: in response to receiving said uplink resource grant schedule information from said first wireless device, determining if said first set of resource blocks are currently allocated to another wireless device; and when said first set of resource blocks are determined not be allocated to another wireless device storing in memory an indication that the first set of resource blocks are allocated to the first wireless device and that any transmission successfully received from the first wireless device using the first set of resource blocks in accordance with the first uplink grant schedule information is to be responded to with a ACK message indicating successful receipt of the transmission by the first wireless base station; and when said first set of resource blocks are determined to be allocated to another wireless device storing in memory an indication that any transmission received from the first wireless device using the first set of resource blocks is to be responded to with a NACK message indicating the failure of the transmission.

Method Embodiment 14. The method of Method Embodiment 13, further comprising: when said first wireless device receives a threshold number of NACK messages in response to uplink data transmission using the first uplink resource grant schedule the first wireless device will determine that first uplink resource grant schedule has not been allocated to the first wireless device; and in response to determining the first wireless device has not been allocated the first uplink resource grant schedule determining a second uplink resource grant schedule including a second set of resource blocks and communicating second uplink resource grant schedule information to the first wireless base station, said second set of resource blocks being different than said first set of resource blocks.

Method Embodiment 15. The method of Method Embodiment 13, wherein a Physical HARQ Indicator Channel is used to communicate said ACK and NACK message from said first wireless base station to said first wireless device, said Physical HARQ Indicator Channel having a larger coverage area than said uplink control channel used by said wireless devices to communicate with said base station.

Method Embodiment 16. The method of Method Embodiment 1, wherein said plurality of wireless devices includes a first wireless device and a second wireless device; wherein said operating in said second mode of operation includes prior to ceasing managing said uplink resource grant schedules for said plurality of wireless devices connected to the first wireless base station: (i) communicating a first message to said first wireless device indicating that said first wireless device is responsible for managing its uplink resource grant schedule, and (ii) communicating a second message to the second wireless device indicating that the second wireless is responsible for managing its uplink resource grant schedule.

List of Exemplary Numbered System Embodiments:

System Embodiment 1. A wireless communications system comprising: a first wireless base station, said first wireless base station including: a memory; and a processor, said processor controlling the first wireless base station to perform the following operations: operate in a first mode of operation, operating in said first mode of operation including managing uplink resource grant schedules for a plurality of wireless devices connected to the first wireless base station; receive, by the first wireless base station operating in said first mode of operation, a transmission power down command from a resource management system; determine in response to receiving said transmission power down command, by the first wireless base station, whether to switch from operating in said first mode of operation to operating in a second mode of operation, said operating in said second mode of operation including ceasing managing uplink resource grant schedules for said plurality of wireless devices connected to the first wireless base station.

System Embodiment 1A. The wireless communications system of System Embodiment 1, wherein each of said wireless devices is a user equipment device or a customer premises equipment device.

System Embodiment 1AA. The wireless communications system of System Embodiment 1, wherein said processor prior to receiving the transmission power down command at the first wireless base station further controls the first wireless base station to register the first wireless base station (e.g., CBSD) with the resource management system, said resource management system managing transmission power levels of a plurality of wireless base stations in a first wireless network, said first wireless base station being one of said plurality of wireless base stations.

System Embodiment 1AAA. The wireless communications system of System Embodiment 1 wherein said processor further controls the first wireless base station to establish a plurality of wireless connections between the first wireless base station and said plurality of wireless devices.

System Embodiment 1B. The wireless communications system of System Embodiment 1, wherein said wireless devices are user terminals.

System Embodiment 1B1. The wireless communications system of System Embodiment 1B, wherein each of said user terminals is a user equipment device or a customer premises equipment device.

System Embodiment 1C. The wireless communications system of System Embodiment 1AA, wherein said first wireless network is a new radio 5G wireless network.

System Embodiment 2. The wireless communications system of System Embodiment 1, wherein said operation of determining whether to switch from operating in said first mode of operation to operating in a second mode of operation includes determining whether the implementation of the transmission power down command by the first wireless base station will result in a downlink control channel coverage area of the first wireless base station being less than an uplink control channel coverage area of the first wireless base station.

System Embodiment 3. The wireless communications system of System Embodiment 2 wherein said processor further controls the first wireless base station to determine to switch from operating in said first mode of operation to operating in said second mode of operation when said determination is that the implementation of the transmission power down command by the first wireless base station will result in the downlink control channel coverage area of the first wireless base station being less than the uplink control channel coverage area of the first wireless base station.

System Embodiment 3B. The wireless communications system of System Embodiment 2 wherein said processor further controls the first wireless base station to determine not to switch from operating in said first mode of operation to operating in said second mode of operation when said determination is that the implementation of the transmission power down command by the first wireless base station will not result in the downlink control channel coverage area of the first wireless base station being less than the uplink control channel coverage area of the first wireless base station.

System Embodiment 4. The wireless communications system of System Embodiment 1, wherein said operation of determining whether to switch from operating in said first mode of operation to operating in a second mode of operation includes determining whether the implementation of the transmission power down command by the first wireless base station will result in an transmission power level for a downlink control channel used for communicating uplink resource grants to the wireless devices being less than a first threshold value.

System Embodiment 4A. The wireless communications system of System Embodiment 4, wherein the first threshold value is 23 dBm.

System Embodiment 5. The wireless communications system of System Embodiment 4, wherein said first threshold value is a power transmission level value equal to or based on the maximum power transmission level of a wireless device connected to the first wireless base station.

System Embodiment 6. The wireless communications system of System Embodiment 5, wherein the maximum power transmission level of a wireless device is a maximum uplink channel power transmission level of a wireless device connected to the first wireless base station.

System Embodiment 7. The wireless communications system of System Embodiment 1, wherein the first wireless base station is a Citizens Broadband Radio Service Device (CBSD); wherein the wireless communications system includes a first wireless network, said first wireless network being a Citizen Broadband Radio Service (CBRS) network; wherein each of said wireless devices connected to the first wireless base station is a CBRS user equipment device, CBRS Customer Premises Equipment (CPE) device, or a device emulating a CBRS user equipment device or CBRS CPE device.

System Embodiment 7A. The wireless communication system of System Embodiment 1, wherein the first wireless base station is a Citizens Broadband Radio Service Device (CBSD); wherein the wireless communications system includes a first wireless network, said first wireless network being a Citizen Broadband Radio Service (CBRS) network; wherein said wireless devices connected to the first wireless base station include at least one CBRS Customer Premises Equipment device.

System Embodiment 8. The wireless communications system of System Embodiment 1, wherein managing uplink resource grant schedules for said plurality of wireless devices connected to the first wireless base station includes generating an uplink resource grant schedule for each individual wireless device connected to the first wireless base station.

System Embodiment 8A. The wireless communications system of System Embodiment 8, wherein each uplink resource grant schedule includes an uplink resource grant giving a wireless device the right to use a set of resource blocks on a recurring basis.

System Embodiment 9. The wireless communications system of System Embodiment 8, wherein said operating said first wireless base station in a first mode of operation further includes communicating each of said generated uplink resource grant schedules to the individual wireless device for which the uplink grant schedule was generated.

System Embodiment 10. The wireless communications system of System Embodiment 1, wherein said operating in said second mode of operation includes communicating a message to each wireless device connected to the first wireless base station prior to ceasing managing said uplink grant schedule for said plurality of wireless devices, said message indicating that each wireless device is responsible for managing its uplink resource grant schedule.

System Embodiment 11. The wireless communications system of System Embodiment 10, wherein the processor further controls the first wireless base station to perform the operation of: subsequent to communicating said message indicating that each wireless device is responsible for managing its uplink resource grant schedule to each wireless device connected to the first wireless base station, reducing said transmission power level as instructed in the transmission power down command received from the resource management system.

System Embodiment 11A. The wireless communications system of System Embodiment 11, wherein reducing said transmission power level as instructed in the transmission power down command received from the resource management system includes ceasing transmissions of uplink resource grant schedules for wireless devices on the downlink control channel (e.g., PDCCH).

System Embodiment 12. The communications system of System Embodiment 11, wherein said processor further controls the first wireless base station to perform the following operation: subsequent to communicating said message indicating that each wireless device is responsible for managing its uplink resource grant schedule to each wireless device connected to the first wireless base station, receiving first uplink resource grant schedule information from a first wireless device connected to the first wireless base station, said first uplink resource grant schedule information including a first uplink resource grant that the first wireless device will be using for communicating uplink data to the first wireless base station, the uplink resource grant identifying a first set of resource blocks that will be reserved for use by the first wireless device on a recurring basis and timing information identifying when the first set of resource blocks will recur.

System Embodiment 12A. The wireless communications system of System Embodiment 12, wherein the first uplink resource grant schedule information is received by the first wireless base station from the first wireless device via an uplink control channel (e.g., PUCCH).

System Embodiment 13. The wireless communications system of System Embodiment 12, wherein the processor further controls the first wireless base station to perform the following operations: in response to receiving said uplink resource grant schedule information from said first wireless device, determining if said first set of resource blocks are currently allocated to another wireless device; and when said first set of resource blocks are determined not be allocated to another wireless device storing in memory an indication that the first set of resource blocks are allocated to the first wireless device and that any transmission successfully received from the first wireless device using the first set of resource blocks in accordance with the first uplink grant schedule information is to be responded to with a ACK message indicating successful receipt of the transmission by the first wireless base station; and when said first set of resource blocks are determined to be allocated to another wireless device storing in memory an indication that any transmission received from the first wireless device using the first set of resource blocks is to be responded to with a NACK message indicating the failure of the transmission.

System Embodiment 14. The wireless communications system of System Embodiment 13, wherein the first wireless device includes a first wireless device processor, the first wireless device processor controls the first wireless device to: determine that the first uplink resource grant schedule has not been allocated to the first wireless device when said first wireless device receives a threshold number of NACK messages in response to uplink data transmission using the first uplink resource grant schedule; and in response to determining the first wireless device has not been allocated the first uplink resource grant schedule determining a second uplink resource grant schedule including a second set of resource blocks and communicating second uplink resource grant schedule information to the first wireless base station, said second set of resource blocks being different than said first set of resource blocks.

System Embodiment 15. The communications system of System Embodiment 13, wherein a Physical HARQ Indicator Channel is used to communicate said ACK and NACK message from said first wireless base station to said first wireless device, said Physical HARQ Indicator Channel having a larger coverage area than said uplink control channel used by said wireless devices to communicate with said base station.

System Embodiment 15A. The communications system of System Embodiment 13, wherein the ACK and NACK messages are Hybrid Automatic Repeat reQuest (HARQ) messages.

System Embodiment 15B. The communications system of System Embodiment 13, wherein the ACK and NACK messages are communicated using a stop and wait (SAW) protocol.

System Embodiment 15C. The communications system of System Embodiment 13, wherein the ACK and NACK messages are sent using a HARQ protocol.

System Embodiment 15D. The communications system of System Embodiment 13, wherein the ACK and NACK messages are sent by the first wireless base station using a protocol, e.g., a HARQ protocol, which allows the ACK and NACK messages to be successfully received and processed by UEs at a greater distance from the first wireless base station than downlink control channel messages, e.g., uplink grant schedule messages communicated from the first wireless base station.

System Embodiment 16. The wireless communications system of System Embodiment 1, wherein said plurality of wireless devices includes a first wireless device and a second wireless device; wherein said operating in said second mode of operation includes prior to ceasing managing said uplink resource grant schedules for said plurality of wireless devices connected to the first wireless base station: (i) communicating a first message to said first wireless device indicating that said first wireless device is responsible for managing its uplink resource grant schedule, and (ii) communicating a second message to the second wireless device indicating that the second wireless is responsible for managing its uplink resource grant schedule.

List of Exemplary Numbered Non-transitory Computer Readable Medium Embodiments:

Non-transitory Computer Readable Medium Embodiment 1. A non-transitory computer readable medium including a first set of computer executable instructions which when executed by a processor of a first wireless base station cause the first wireless base station to perform the steps of: operating in a first mode of operation, said first mode of operation including managing uplink resource grant schedules for a plurality of wireless devices connected to the first wireless base station; receiving, by the first wireless base station operating in said first mode of operation, a transmission power down command from a resource management system; determining in response to receiving said transmission power down command, by the first wireless base station, whether to switch from operating in said first mode of operation to operating in a second mode of operation, said operating in said second mode of operation including ceasing managing uplink resource grant schedules for said plurality of wireless devices connected to the first wireless base station.

Non-transitory Computer Readable Medium Embodiment 2. The non-transitory computer readable medium of Non-transitory Computer Readable Medium Embodiment 1, wherein determining whether to switch from operating in said first mode of operation to operating in a second mode of operation includes determining whether the implementation of the transmission power down command by the first wireless base station will result in a downlink control channel coverage area of the first wireless base station being less than an uplink control channel coverage area of the first wireless base station.

Non-transitory Computer Readable Medium Embodiment 3. The non-transitory computer readable medium of Non-transitory Computer Readable Medium Embodiment 2 wherein said first set of computer executable instructions which when executed by the processor of the first wireless base station further cause the first wireless base station to perform the step of: determining to switch from operating in said first mode of operation to operating in said second mode of operation when said determination is that the implementation of the transmission power down command by the first wireless base station will result in the downlink control channel coverage area of the first wireless base station being less than the uplink control channel coverage area of the first wireless base station.

The techniques of various embodiments may be implemented using software, hardware and/or a combination of software and hardware. Various embodiments are directed to apparatus, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to methods, e.g., method of controlling and/or operating wireless base stations, user equipment devices, Wi-Fi Access Points, CPE devices, CBSDs, CBRS tower base stations, CBRS CPE devices, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, wireless base stations, user equipment devices, Wi-Fi Access Points, CPE devices, CBSDs, CBRS tower base stations, CBRS CPE devices, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements are configured to perform the steps of the methods described as being performed by the wireless base stations, user equipment devices, Wi-Fi Access Points, CPE devices, CBSDs, CBRS tower base stations, CBRS CPE devices, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or elements, with a processor which includes a component corresponding to each of the steps of the various described methods performed by the device in which the processor is included. In some but not all embodiments a device, e.g., wireless base stations, user equipment devices, Wi-Fi Access Points, CPE devices, CBSDs, CBRS tower base stations, CBRS CPE devices, SAS devices, user devices, subscriber devices, servers, nodes and/or element, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a wireless base stations, user equipment devices, Wi-Fi Access Points, CPE devices, CBSDs, CBRS tower base stations, CBRS CPE devices, SAS devices, user devices, subscriber devices, servers, nodes and/or element. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, user equipment devices, Wi-Fi Access Points, CPE devices, CBSDs, CBRS tower base stations, CBRS CPE devices, SAS devices, user devices, subscriber devices, servers, nodes and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first wireless base station comprising:
   receiving, by the first wireless base station, a transmission power down command from a resource management system;
   in response to receiving said transmission power down command, communicating, by the first wireless base station, a first message to a first wireless device connected to the first wireless base station, said first message indicating that the first wireless device is responsible for managing an uplink resource grant schedule for the first wireless device; and
   ceasing, by the first wireless base station, management of the uplink resource grant schedule for the first wireless device.

2. The method of claim 1 further comprising:
   prior to communicating, by the first wireless base station, the first message to the first wireless device connected to the first wireless base station, determining, by the first wireless base station, that implementation of the transmission power down command by the first wireless base station will result in a downlink control channel coverage area of the first wireless base station being less than an uplink control channel coverage area of the first wireless base station.

3. The method of claim 1, further comprising:
   prior to communicating, by the first wireless base station, the first message to the first wireless device connected to the first wireless base station, determining, by the first wireless base station, that implementation of the transmission power down command by the first wireless base station will result in a transmission power level for a downlink control channel used for communicating uplink resource grants to wireless devices connected to the first wireless base station being less than a first threshold value.

4. The method of claim 3, wherein said first threshold value is a power transmission level value equal to or based on a maximum power transmission level of a wireless device connected to the first wireless base station.

5. The method of claim 4, wherein the maximum power transmission level of a wireless device is a maximum uplink channel power transmission level of a wireless device connected to the first wireless base station.

6. The method of claim 1, wherein the first wireless base station is a Citizens Broadband Radio Service Device (CBSD);
   wherein the first wireless base station is part of a Citizens Broadband Radio Service (CBRS) network; and
   wherein the first wireless device connected to the first wireless base station is a CBRS user equipment device, a CBRS Customer Premises Equipment (CPE) device, or a device emulating a CBRS user equipment device or a CBRS CPE device.

7. The method of claim 1, further comprising:
   subsequent to communicating said first message to the first wireless device connected to the first wireless base station, reducing, by said first wireless base station, a transmission power level as instructed in the transmission power down command received from the resource management system.

8. The method of claim 7, wherein said reducing said transmission power level as instructed in the transmission power down command received from the resource management system includes ceasing transmissions of uplink resource grant schedules for wireless devices on a downlink control channel.

9. The method of claim 7, further comprising:
   subsequent to communicating said first message to the first wireless device connected to the first wireless base station, receiving, by the first wireless base station, first uplink resource grant schedule information from the first wireless device, said first uplink resource grant schedule information including a first uplink resource grant that the first wireless device will be using for communicating uplink data to the first wireless base station, the first uplink resource grant identifying a first set of resource blocks that will be used by the first wireless device on a recurring basis and timing information identifying when the first set of resource blocks will recur.

10. The method of claim 9, further comprising:
    in response to receiving said first uplink resource grant schedule information from said first wireless device, determining, by the first wireless base station, if said first set of resource blocks are currently allocated to another wireless device; and
    when said first set of resource blocks are determined not be allocated to another wireless device storing in memory an indication that the first set of resource blocks are allocated to the first wireless device and that any transmission successfully received from the first wireless device using the first set of resource blocks in accordance with the first uplink grant schedule information is to be responded to with an ACK message indicating successful receipt of the transmission by the first wireless base station; and
    when said first set of resource blocks are determined to be allocated to another wireless device storing in memory an indication that any transmission received from the first wireless device using the first set of resource blocks is to be responded to with a NACK message indicating the failure of the transmission.

11. A wireless communications system comprising:
    a first wireless base station, said first wireless base station including:
      a memory; and
      a processor, said processor controlling the first wireless base station to perform the following operations:
        receiving a transmission power down command from a resource management system;
        in response to receiving said transmission power down command, communicating a first message to a first wireless device connected to the first wireless base station, said first message indicating that the first wireless device is responsible for managing an uplink resource grant schedule for the first wireless device; and
        ceasing management of the uplink resource grant schedule for the first wireless device.

12. The wireless communications system of claim 11, wherein said processor further controls the first wireless base station prior to communicating the first message to the first wireless device connected to the first wireless base station to: make a determination that implementation of the transmission power down command by the first wireless base station will result in a downlink control channel coverage area of the first wireless base station being less than an uplink control channel coverage area of the first wireless base station.

13. The wireless communications system of claim 11, wherein said processor further controls the first wireless base station prior to communicating the first message to the first wireless device connected to the first wireless base station to: make a determination that implementation of the transmission power down command by the first wireless base station will result in a transmission power level for a downlink control channel used for communicating uplink resource grants to wireless devices connected to the first wireless base station being less than a first threshold value.

14. The wireless communications system of claim 13, wherein said first threshold value is a power transmission level value equal to or based on a maximum power transmission level of a wireless device connected to the first wireless base station.

15. The wireless communications system of claim 14, wherein the maximum power transmission level of a wireless device is a maximum uplink channel power transmission level of a wireless device connected to the first wireless base station.

16. The wireless communications system of claim 11, wherein the first wireless base station is a Citizens Broadband Radio Service Device (CBSD);
wherein the first wireless base station is part of a Citizens Broadband Radio Service (CBRS) network; and
wherein the first wireless device connected to the first wireless base station is a CBRS user equipment device, a CBRS Customer Premises Equipment (CPE) device, or a device emulating a CBRS user equipment device or a CBRS CPE device.

17. The wireless communications system of claim 11, wherein said processor further controls the first wireless base station subsequent to communicating said first message to the first wireless device connected to the first wireless base station to: reduce a transmission power level as instructed in the transmission power down command received from the resource management system.

18. The wireless communications system of claim 17, wherein to reduce said transmission power level as instructed in the transmission power down command received from the resource management system includes ceasing transmissions of uplink resource grant schedules for wireless devices on a downlink control channel.

19. The wireless communications system of claim 17,
wherein said processor further controls the first wireless base station subsequent to communicating said first message to the first wireless device connected to the first wireless base station to: receive first uplink resource grant schedule information from the first wireless device, said first uplink resource grant schedule information including a first uplink resource grant that the first wireless device will be using for communicating uplink data to the first wireless base station, the first uplink resource grant identifying a first set of resource blocks that will be reserved for use by the first wireless device on a recurring basis and timing information identifying when the first set of resource blocks will recur.

20. A non-transitory computer readable medium including a first set of computer executable instructions which when executed by a processor of a first wireless base station cause the first wireless base station to perform the steps of:
receiving a transmission power down command from a resource management system;
in response to receiving said transmission power down command, communicating a first message to a first wireless device connected to the first wireless base station, said first message indicating that the first wireless device is responsible for managing an uplink resource grant schedule for the first wireless device; and
ceasing management of the uplink resource grant schedule for the first wireless device.

* * * * *